United States Patent [19]
Forbes

[11] Patent Number: 6,112,840
[45] Date of Patent: Sep. 5, 2000

[54] SNOW VEHICLE

[76] Inventor: Vernal D. Forbes, 4146 Marylebone Way, Boise, Id. 83713

[21] Appl. No.: 09/030,639

[22] Filed: Feb. 25, 1998

[51] Int. Cl.[7] .................................................. B62M 27/02
[52] U.S. Cl. ....................... 180/193; 180/191; 280/12.14; 280/217
[58] Field of Search ..................... 280/212, 215, 280/217, 12.1; 180/186, 187, 190, 191, 193

[56] References Cited

U.S. PATENT DOCUMENTS

| | | | |
|---|---|---|---|
| 3,667,562 | 6/1972 | Compton | 180/5 R |
| 3,682,495 | 8/1972 | Zaimi | 280/12.14 |
| 3,719,369 | 3/1973 | Savage | 280/28 |
| 3,787,066 | 1/1974 | Hautier | 280/217 |
| 3,804,455 | 4/1974 | Gorski | 296/28 J |
| 3,822,755 | 7/1974 | Hine | 180/5 R |
| 4,146,101 | 3/1979 | Plourde . | |
| 4,244,436 | 1/1981 | Condon et al. | 180/191 |
| 4,314,618 | 2/1982 | Tamura . | |
| 4,421,193 | 12/1983 | Bissett | 180/192 |
| 4,442,913 | 4/1984 | Grinde . | |
| 4,488,616 | 12/1984 | Harris | 180/185 |
| 4,502,560 | 3/1985 | Hisatomi | 180/190 |
| 4,613,006 | 9/1986 | Moss . | |
| 4,714,125 | 12/1987 | Stacey, Jr. | 180/182 |
| 4,719,983 | 1/1988 | Bruzzone | 180/184 |
| 4,823,903 | 4/1989 | Bibollet . | |
| 4,917,207 | 4/1990 | Yasui et al. | 180/193 |
| 5,102,153 | 4/1992 | Rhode . | |
| 5,109,941 | 5/1992 | Thompson | 180/182 |
| 5,314,034 | 5/1994 | Chittal . | |
| 5,423,559 | 6/1995 | Rhode . | |
| 5,433,466 | 7/1995 | Timmer | 280/288.4 |
| 5,474,146 | 12/1995 | Ohzeki et al. . | |
| 5,586,614 | 12/1996 | Suzuki . | |
| 5,727,643 | 3/1998 | Shizuo et al. . | |
| 5,860,486 | 1/1999 | Bolvin et al. | 180/193 |
| 5,904,216 | 5/1999 | Furusawa | 180/193 |
| 5,904,217 | 5/1999 | Yamamoto et al. | 180/193 |
| 5,947,220 | 9/1999 | Oka et al. | 180/193 |
| 5,967,534 | 10/1999 | Bradley, Jr. | 280/47.371 |
| 6,032,752 | 3/2000 | Karpik et al. | 180/9.52 |

OTHER PUBLICATIONS

<Author Unknown>, "Thrown For A Loop With Honda's Motosled", The Buzz —News & Rumors, SNOWGOER Magazine, Aug. 1997 Issue, p. 17. Ehlert Publishing Group, Inc., Minnetonka, MN 55305–5215, USA.

(List continued on next page.)

*Primary Examiner*—Paul N. Dickson
*Assistant Examiner*—Daniel Yeagley
*Attorney, Agent, or Firm*—Ormiston & McKinney, PLLC

[57] ABSTRACT

A motor driven or pedal powered snow vehicle designed to emulate the steering and balancing characteristics of motorcycles and bicycles. The snow vehicle includes a frame, a swing arm, a track carriage, an endless loop track, a snow compacting ramp, an elongated steering member and a ski. The swing arm pivots upon the frame and angles downward behind the frame. The track circulates a fixed path around the track carriage. The track carriage extends forward from a pivot connection with the rear of the swing arm, and pivots vertically under the swing arm in scissors-fashion. The snow vehicle is suspended upon the track carriage using a single shock absorber and load-distributing bell crank. A snow compacting ramp attached to the track carriage compresses the snow ahead of the track. The steering member is like the front suspension fork of a motorcycle or bicycle, and is connected to the frame so that it rotates about a steering axis. The ski is mounted to the lower portion of the steering member. An optional steering gyroscope is mounted or coupled to the steering member to provide gyroscopic stabilization to aid in balancing and steering the snow vehicle.

36 Claims, 27 Drawing Sheets

OTHER PUBLICATIONS

<Author Unknown>, "Another New Snow Scooter", Snowgoer Digest, SNOWGOER Magazine, Dec. 1997 Issue, p. 30. Ehlert Publishing Group, Inc., Minnetonka, MN 55305–5215, USA.

Yangsheng Xu, "A Single–Wheel Gyroscopically stabliized Robot (GYROVER)", Internet Address: http://www.cs.cmu–edu/afs/ds.cmu.edu/project/space/www/gyrover/gyrover.html.

Dr. Pradeep K. Kholsa, "A Single–Wheeled Gyroscopically-stabilized Robot" Internet Address: http://www.cs.cmu–edu/afs/cs.cmu.edu/project/chimera/www/research/DRS/index.html.

<Author Unknown>, "The Gyrotron —A human sized gyroscope" Internet Address: http://newciv.org/GIB/BI/BI–240.html.

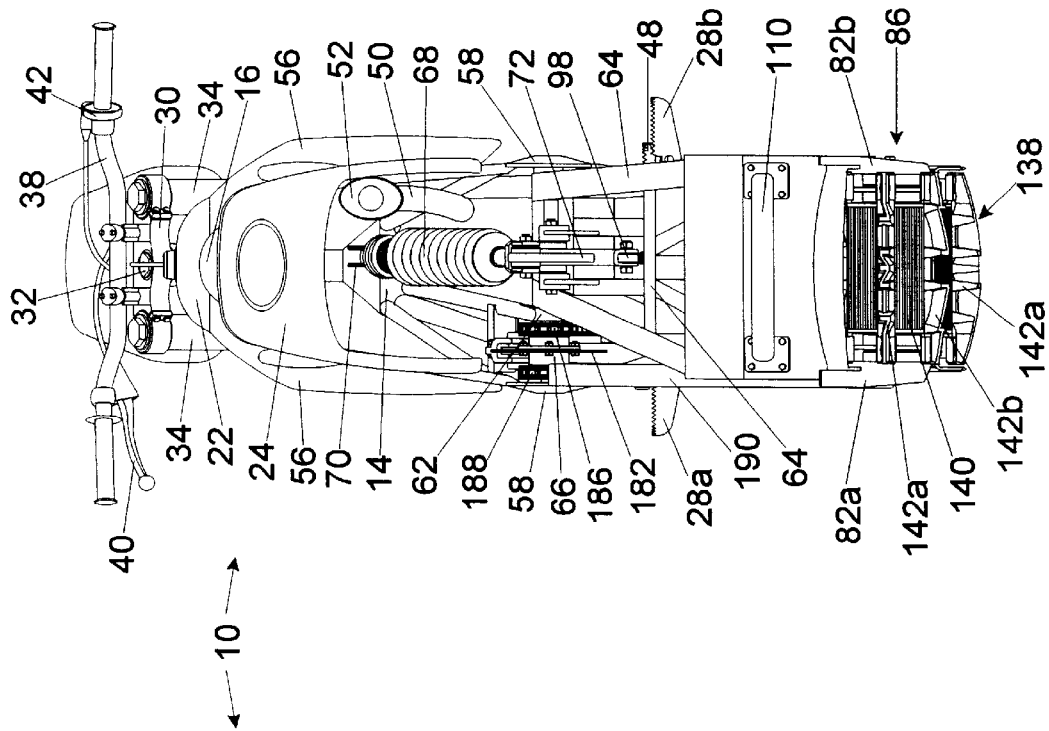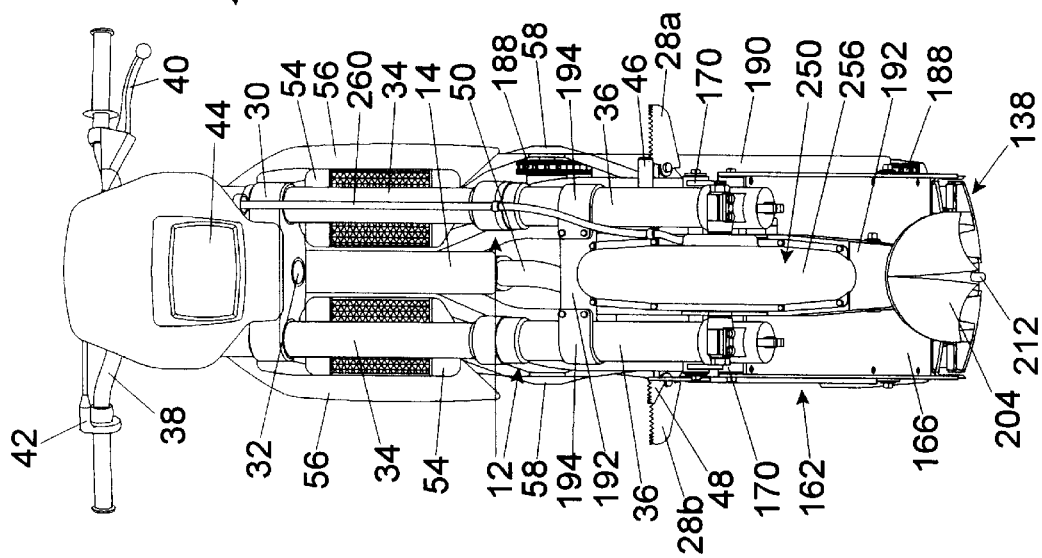

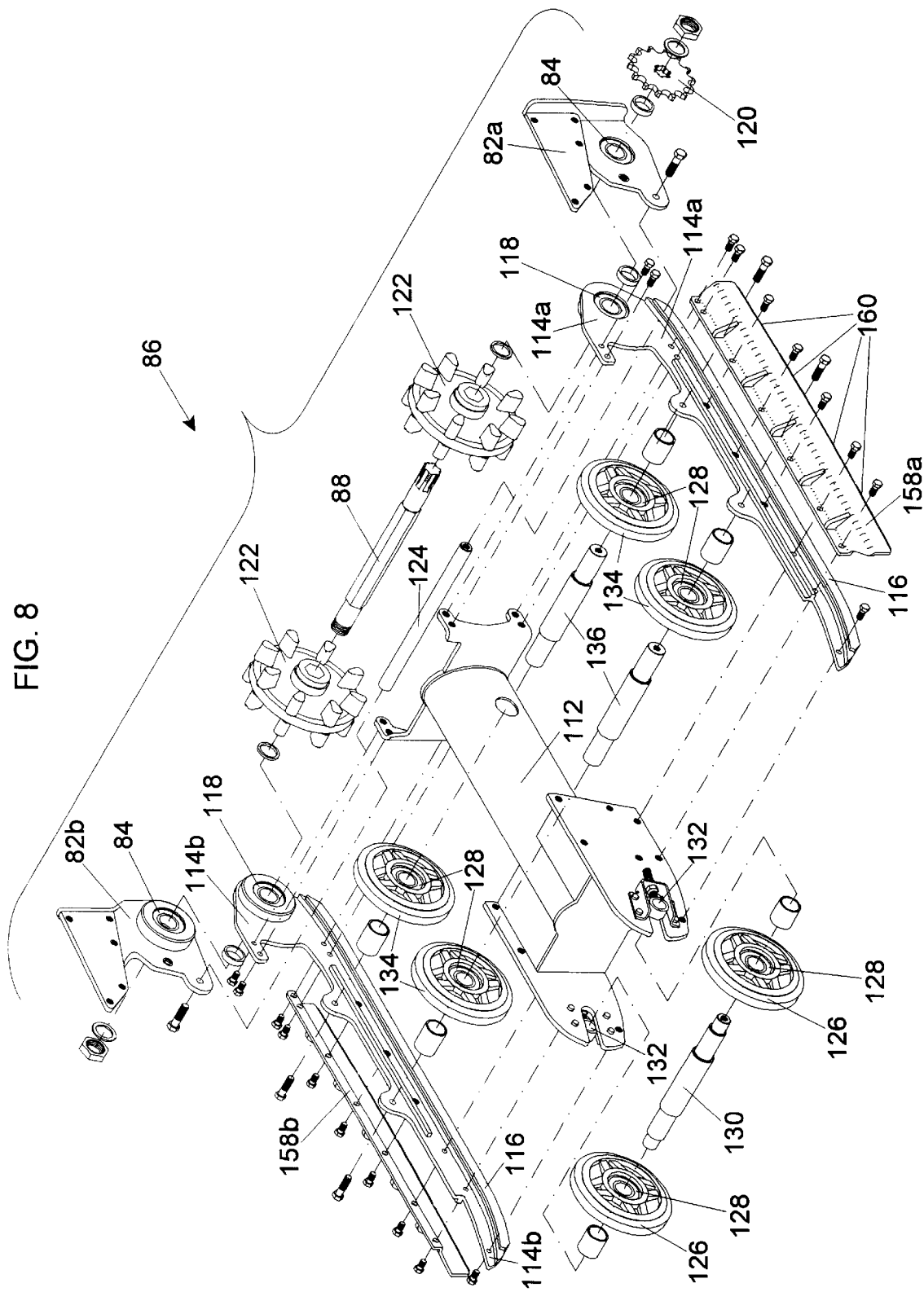

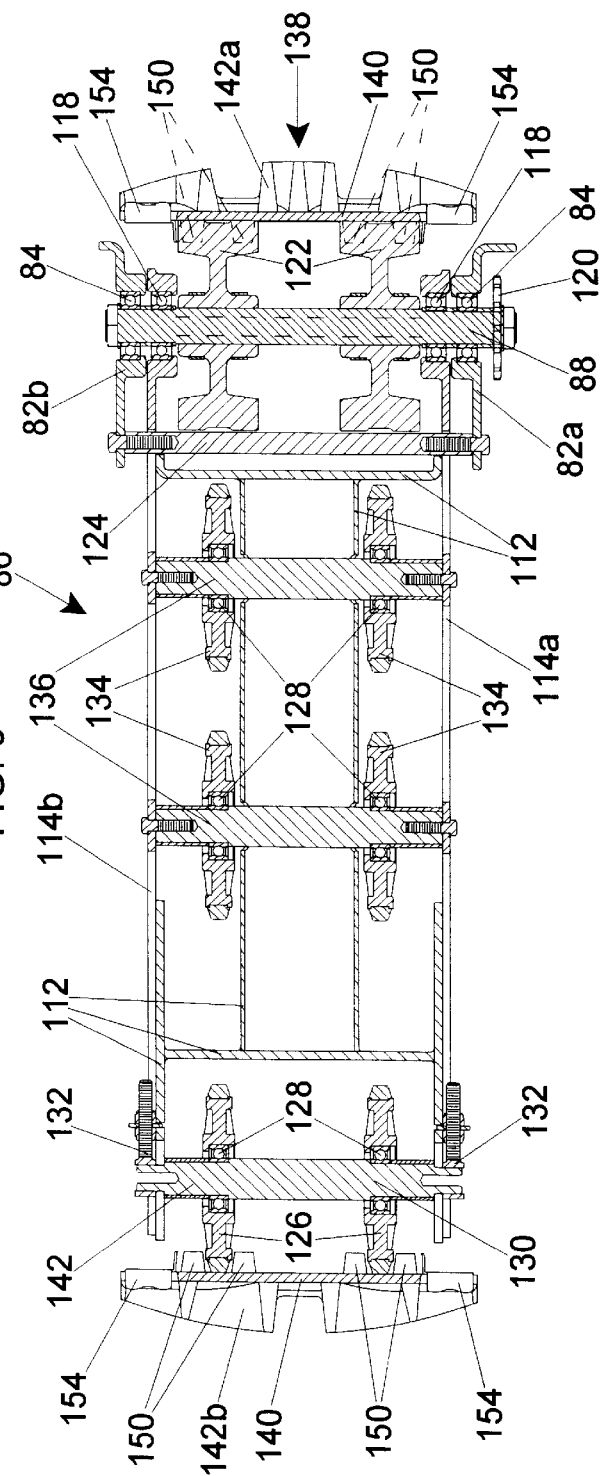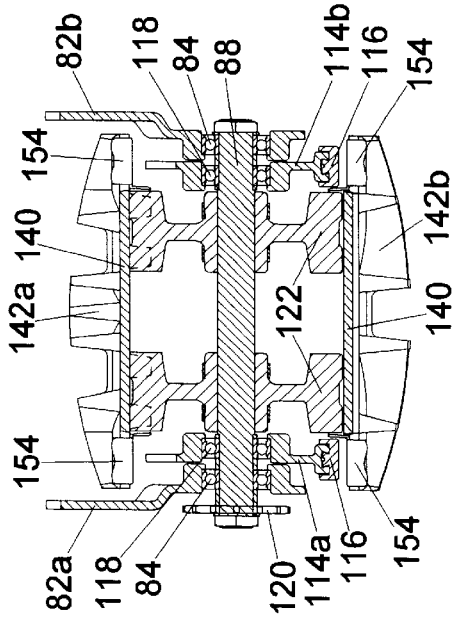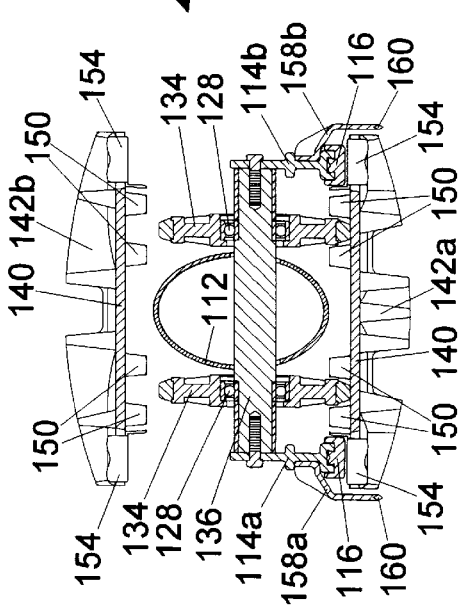

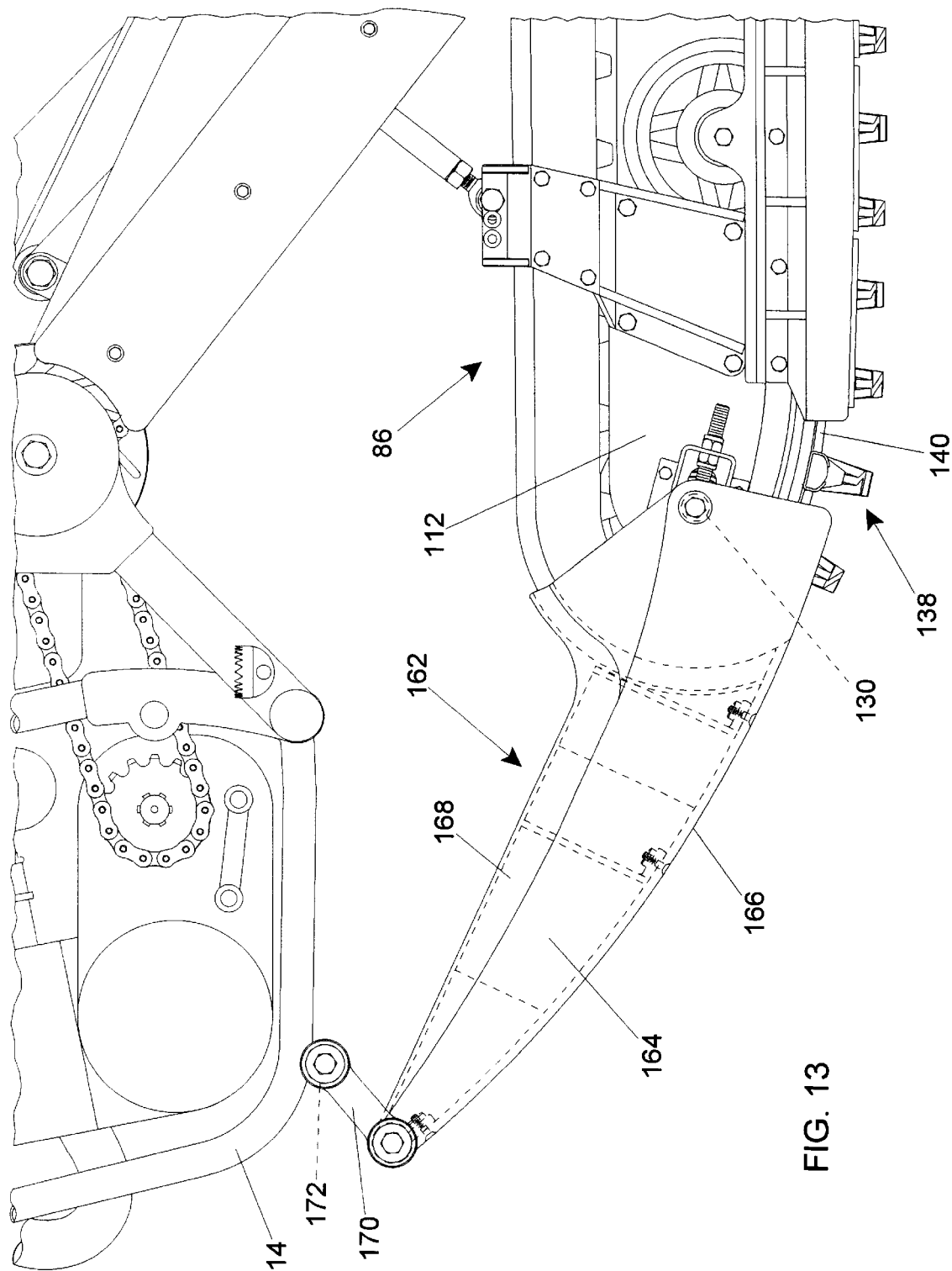

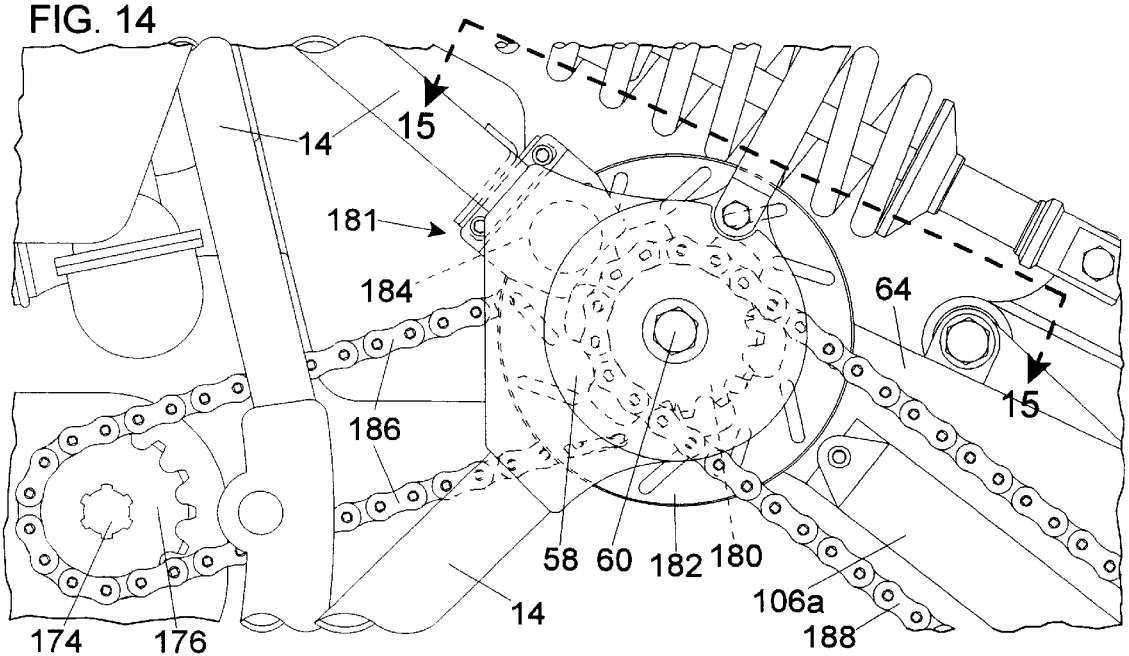
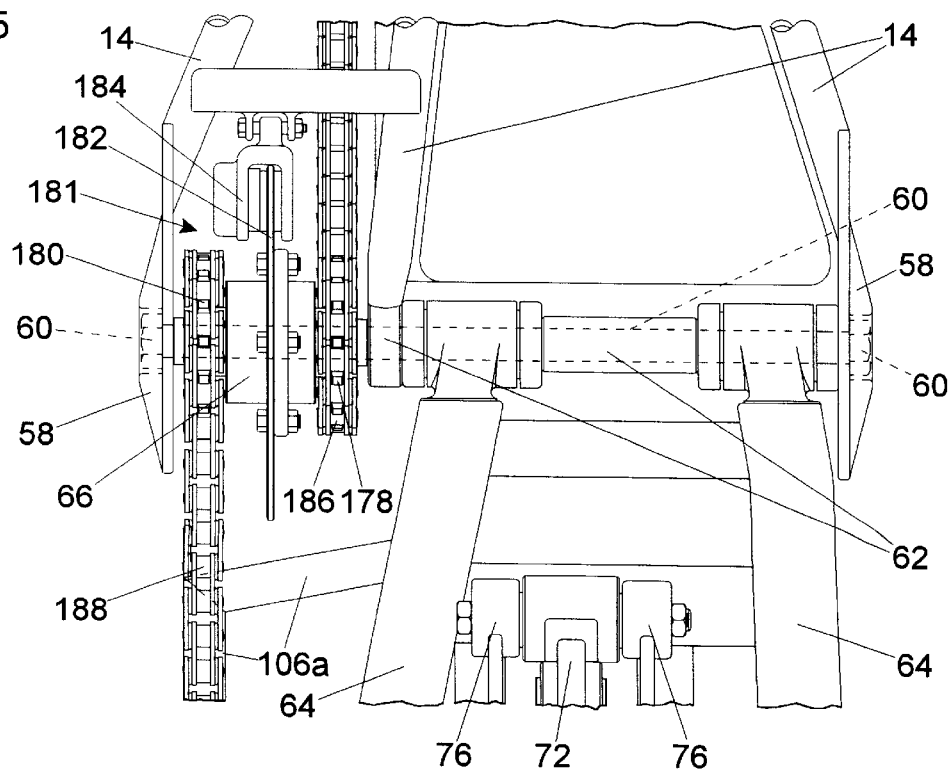

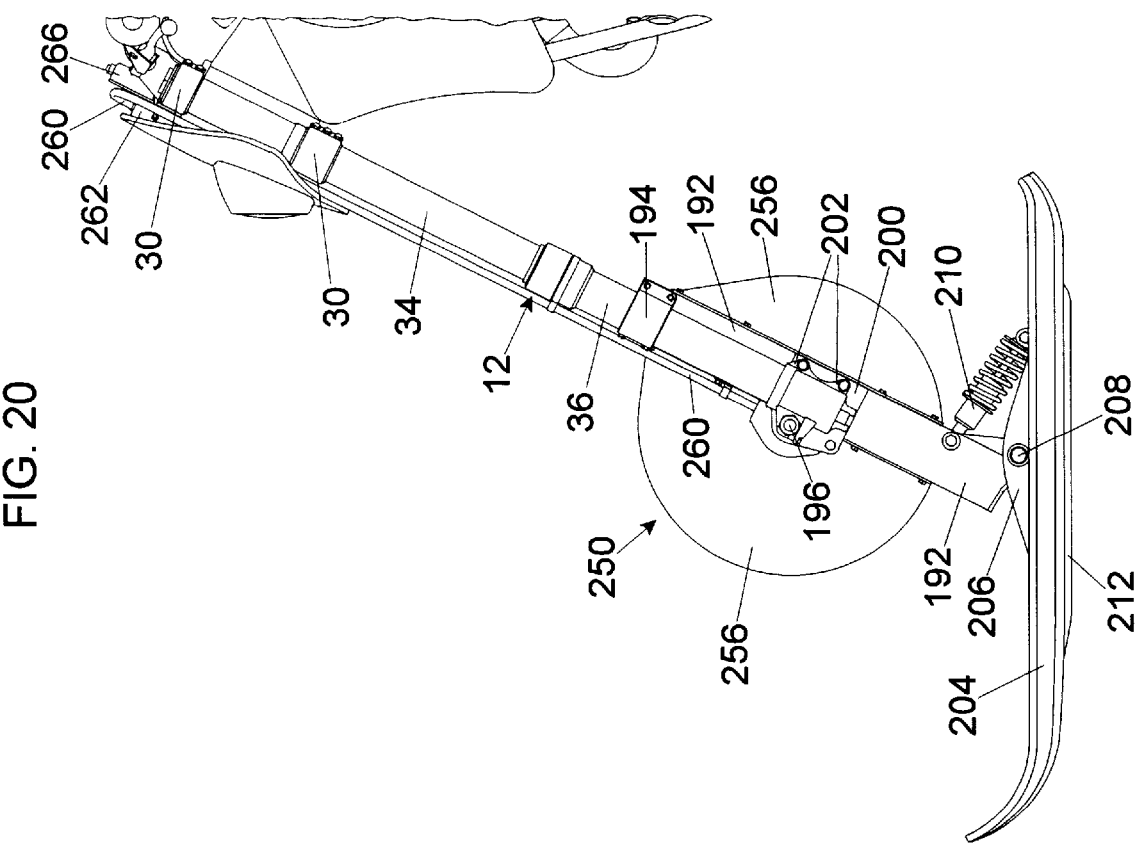

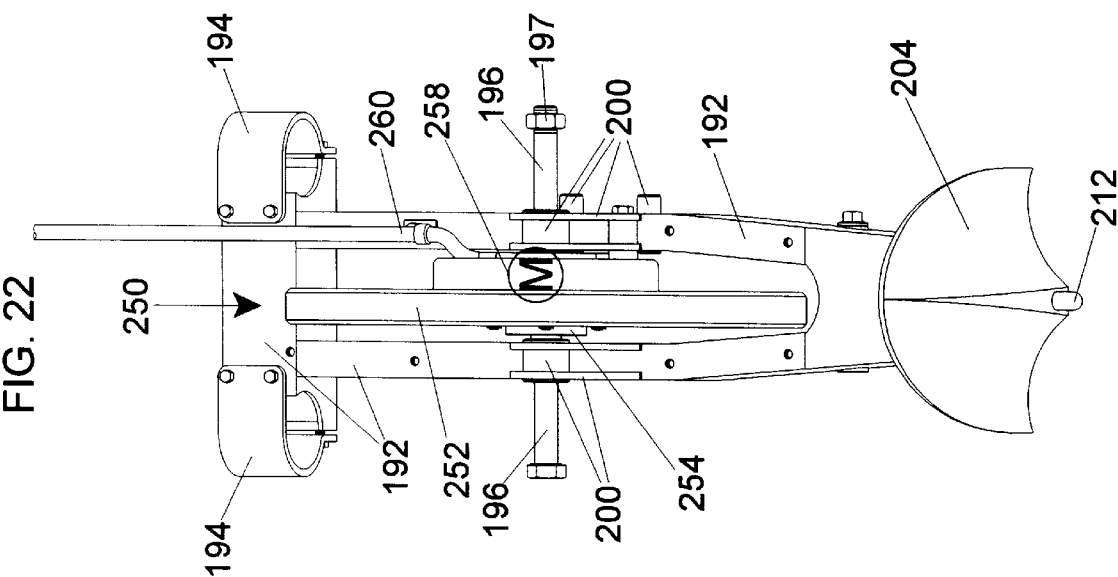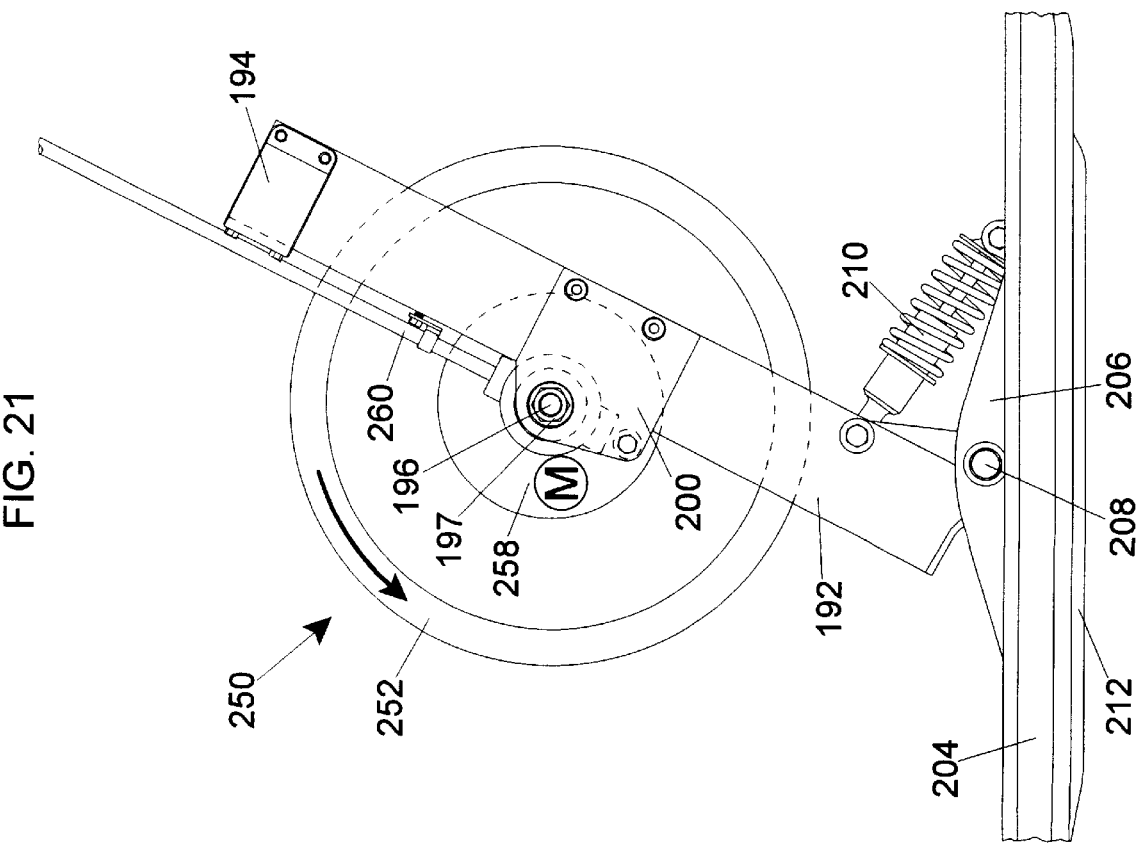

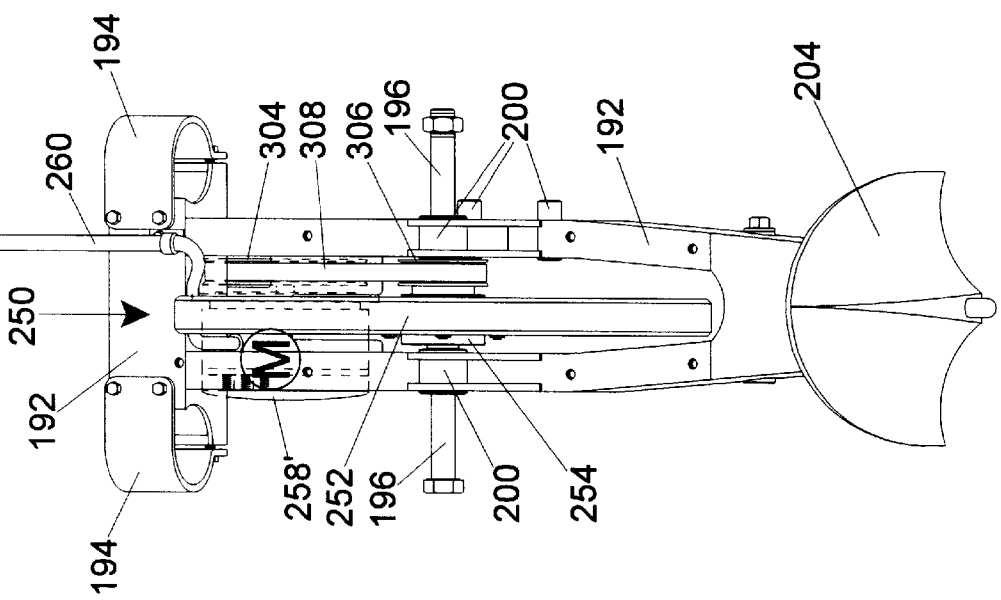
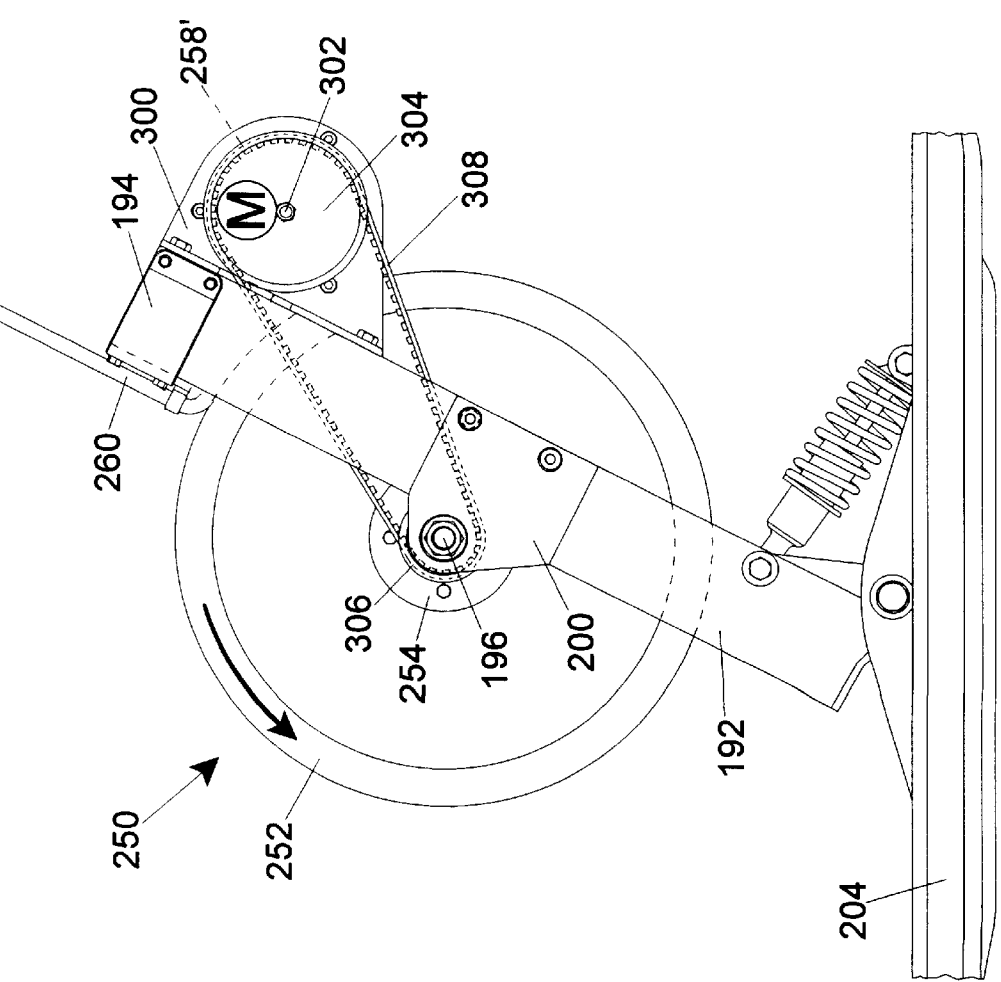

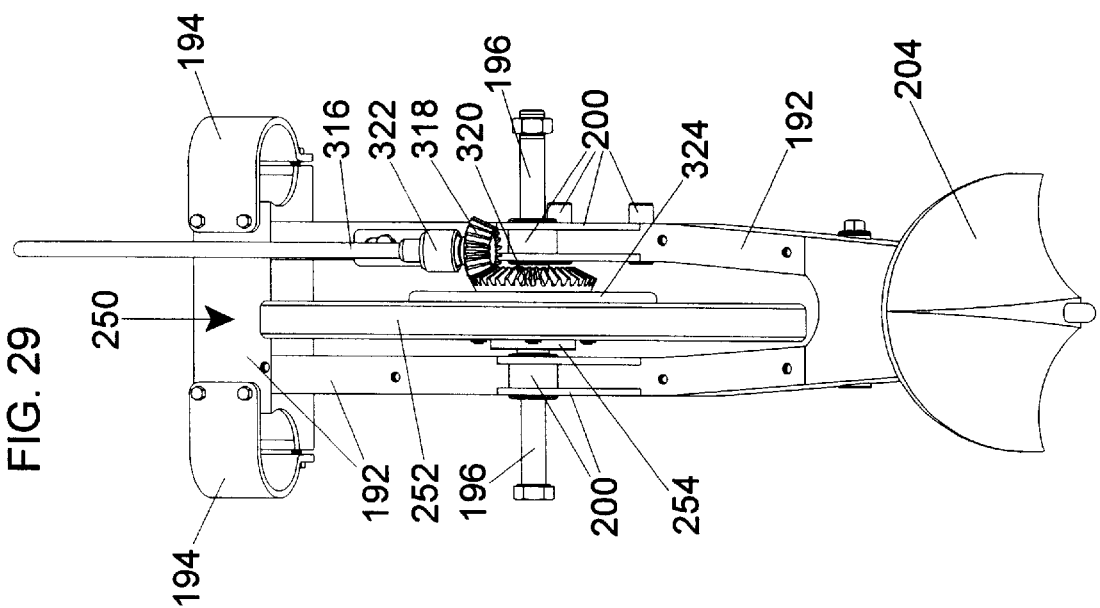
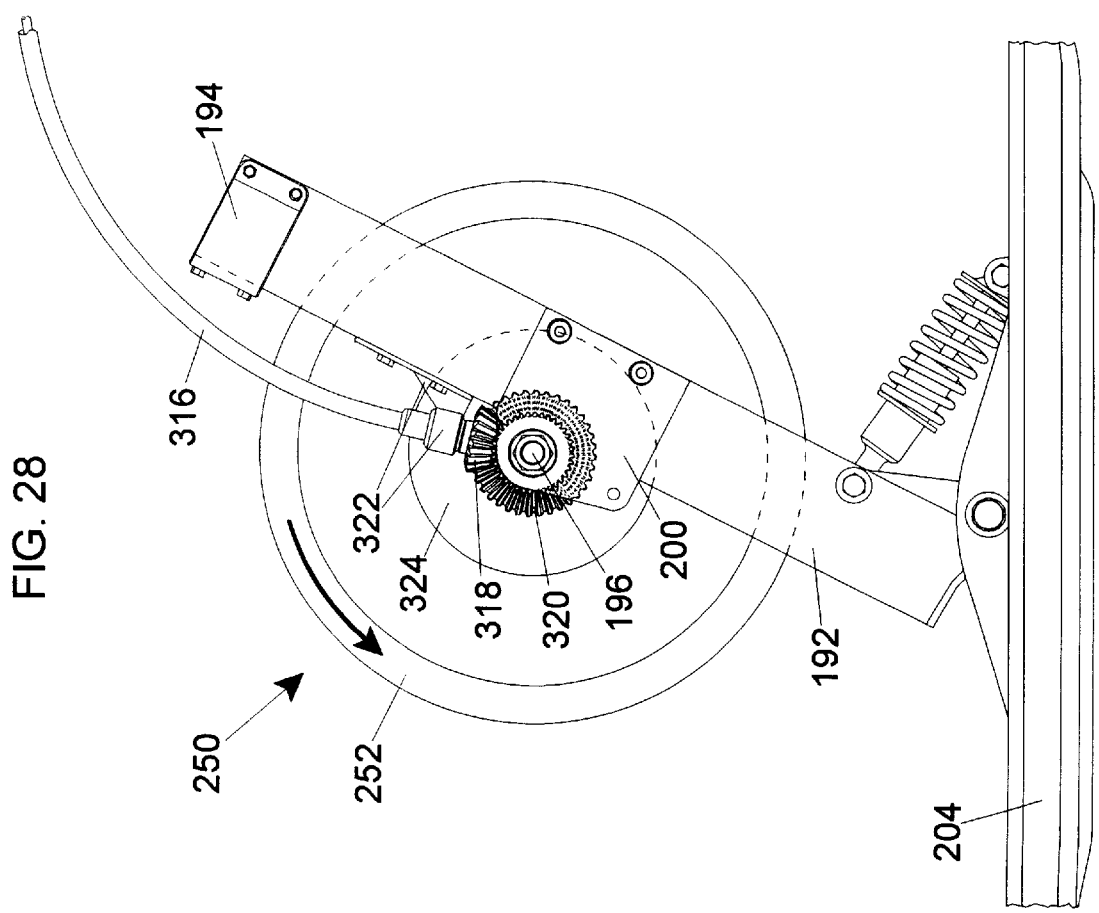

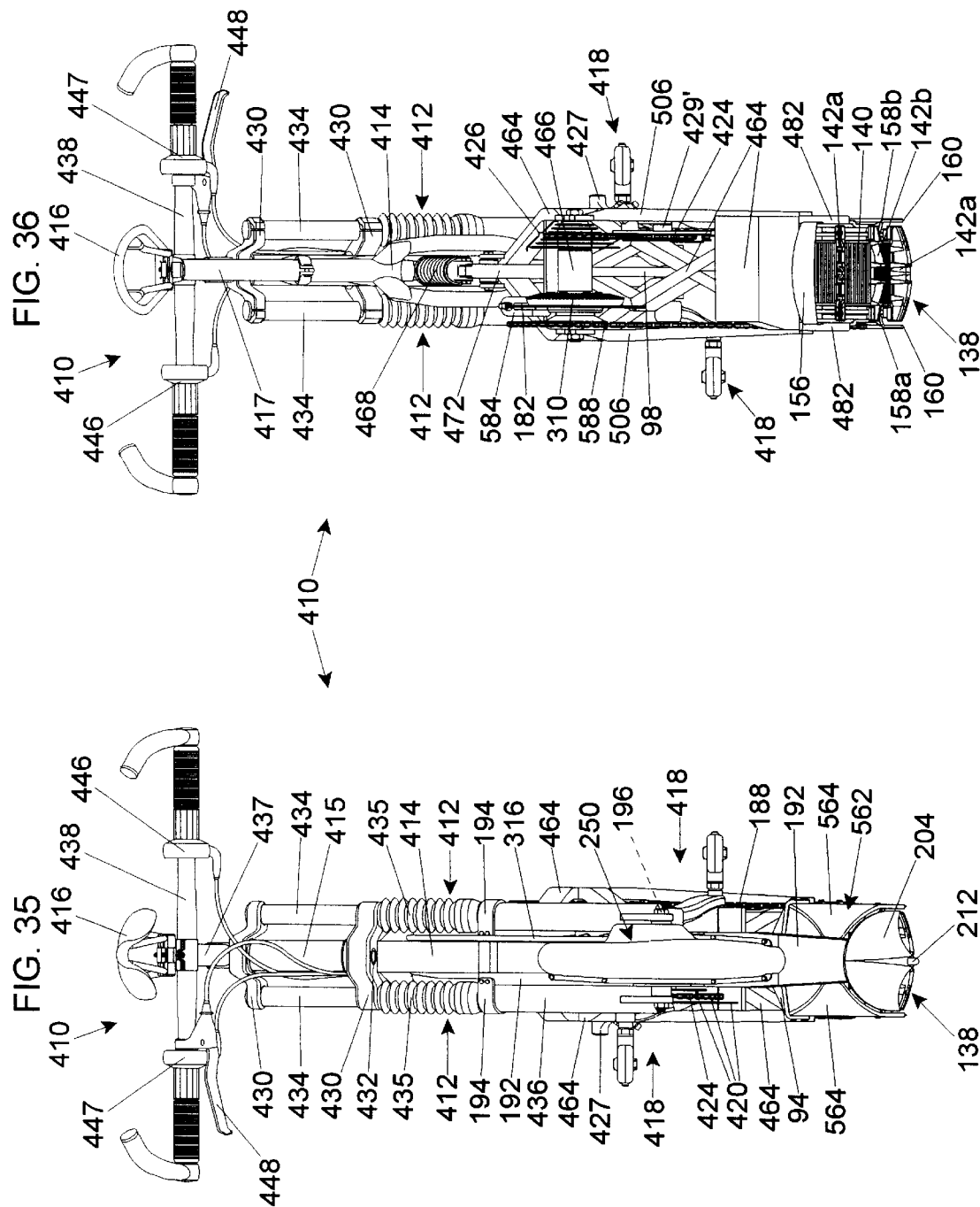

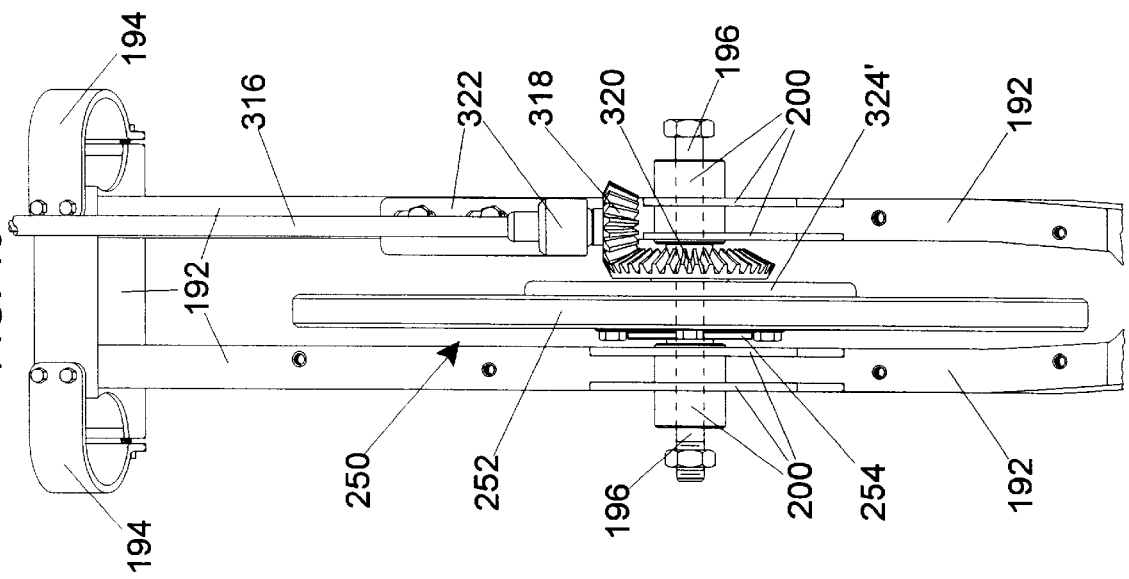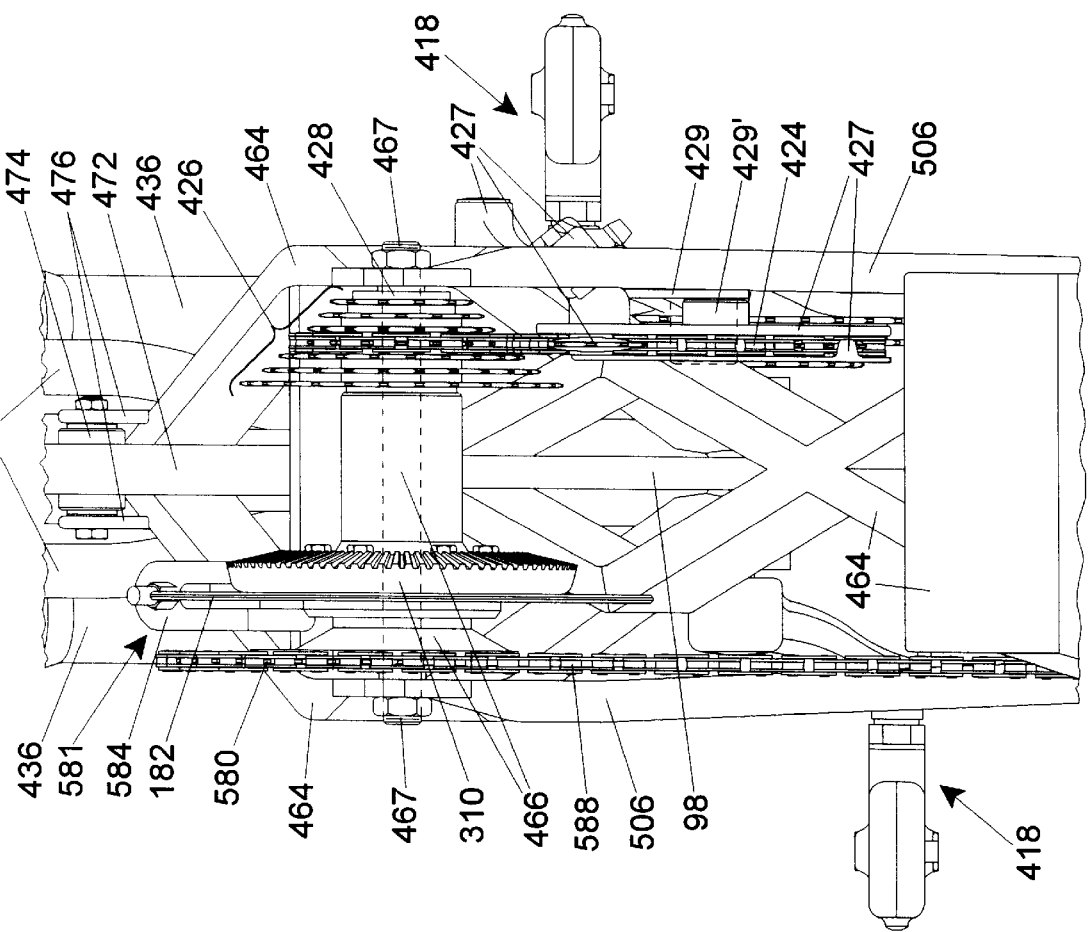

SNOW VEHICLE

FIELD OF THE INVENTION

The invention relates generally to a snow vehicle and, more particularly, to a cycle type snow vehicle designed for banked turning.

BACKGROUND OF THE INVENTION

A variety of vehicles have been designed for travel over snow, with the well known snowmobile type being by far the most prevalent and commercially successful. Snowmobiles have evolved into highly refined and capable vehicles for travel over snow and are used predominantly for recreation. Yet, these commercially available snowmobiles exhibit a number of undesirable features and characteristics that limit their agility and versatility. They are generally quite heavy, weighing typically from 400 to 600 pounds, and require powerful motors to provide power-to-weight ratios sufficient for high performance in highly variable power-sapping snow conditions and for the wide furrows they plow through the snow. A snowmobile typically has two outboard steering skis and a relatively wide, flat track. The outrigger positioning of the skis and the wide flat track constrain the snowmobile to travel flat upon the snow and inhibit banked or leaned turning. These features also tend to limit the steepness of slope that the snowmobile can traverse, since the snowmobile can easily slide sideways when traveling across a steep slope. When cornering on hard packed snow, a snowmobile cannot be easily banked to achieve tight-radius cornering, and the operator must move his or her body far to the inside of the turn to avoid tipping or side slipping the snowmobile.

A second much less common type of snow vehicle is the snow bike or snow cycle. These vehicles are generally smaller and lighter than snowmobiles. Snow cycle designs are usually based upon off-road motorcycles or scooters with the front wheel replaced by a ski and the rear wheel replaced by an endless loop traction belt, commonly called a track. Snow cycles are vehicles designed for banked turning like a motorcycle or bicycle, and are operated "in balance". Snow cycles typically have a single steering ski and a relatively narrow track located behind and in line with the single ski. In turns, a snow cycle is leaned sideways in the direction of the turn such that the sum of gravitational and centrifugal forces acting on the vehicle and operator bears centrally on the contact areas between the snow and the ski and between the snow and the track. In this way, the snow cycle and rider remain in balance through the turn. When traversing slopes, a snow cycle maintains a vertical position such that the gravitational forces acting on the snow cycle and operator intersect the approximate center of the contact areas between the snow cycle ski and the snow and between the track and the snow.

Motor-driven snow cycles are described in U.S. Pat. Nos. 5,474,146, 4,613,006 and 4,442,913. None of these snow cycles have achieved notable commercial success. The snow cycles described in the '006 and '913 patents have minimal suspension travel between the ski and the vehicle main frame and between the track support and the main frame. The ability of their tracks to incline and decline relative to their front skis is also limited, reducing the compliance of their tracks to varying terrain and limiting traction. While the snow cycle described in the '146 patent exhibits improved suspension travel and traction over the earlier snow cycles, it does so by using a track carriage that extends rearward from the snow cycle, making the snow cycle longer than the snow cycles referenced in the '006 and '913 patents. Positioning the track so far rearward from the snow cycle center of gravity limits the braking effectiveness of the track for slowing and stopping the snow cycle.

Human powered snow cycles or "snow bicycles" are also banking snow vehicles. In snow bicycles, a single ski in front and an endless-loop track in back replace the bicycle wheels. Drive power from the operator's legs is transferred from a pedal crank through a chain and sprocket drive train to the track. Snow bicycles are described in U.S. Pat. Nos. 5,423,559 and 5,102,153. The vehicles described in these patents exhibit all of the same limitations as conventional motor driven snow cycles. In addition, the absence of shock absorbers or some other type of suspension between the tracks and the frames of these snow bicycles limits traction and results in an uncomfortable ride over rough terrain.

SUMMARY OF THE INVENTION

The present invention is directed to a cycle type snow vehicle that offers improved agility and maneuverability in snow conditions ranging from powder snow to hard packed snow and ice and over varying terrain topography. The snow cycle is designed to emulate the steering and balancing characteristics of motorcycles and bicycles to make it easier and more natural for the operator to ride and control. Unlike conventional snow cycles that deliver power to the front of the track, the snow cycle of the present invention delivers power to the back of the track. The track extends forward from the drive wheel to position the track substantially under the snow cycle for improved propulsion and braking traction. The scissors-type configuration of the swingarm and track also helps reduce the overall length of the snow cycle. A novel track carriage suspension improves tractional compliance of the track to the snow surface over varying terrain topography by the use of a mechanical linkage. A gyroscopic stabilizer and steering aid coupled to the front steering fork helps the snow cycle handle and balance more like a motorcycle or bicycle. The track design utilizes a flat belt to enhance edging and support in soft snow. Traction paddles that are quite stiff with paddle tips having laterally convex curvature are deployed to allow the snow cycle to be easily leaned or banked on hard packed snow or ice. The traction paddles are formed with block-shaped features having side surfaces that help reduce side slipping of the track when the snow cycle is banked in turning or is traversing steep slopes. Ice runners with ice piercing edges are deployed adjacent to the track edges to dig into ice or hard-pack snow to further inhibit side-slipping when the snow cycle is steeply banked on ice and hard-pack snow.

The snow vehicle of the present invention includes a frame, a ski, an elongated steering member, an arm, a track carriage, a drive wheel, and an endless loop track. The steering member has an upper portion connected to the frame and a lower portion mounting the ski. The steering member, such as the front fork of a motorcycle or bicycle, is connected to the frame so that it rotates about a steering axis like the front fork and wheel of a motorcycle or bicycle. The forward portion of the arm is mounted to the frame. The rearward portion of the track carriage is mounted to the rearward end of the arm. A rotatable drive wheel is mounted to the rearward portion of the track carriage. The track is coupled to and extends forward from the drive wheel and circulates in a fixed path around the track carriage. In one embodiment, the snow vehicle includes a motor operatively coupled to the drive wheel to drive the track and propel the vehicle over the snow. In another embodiment, the vehicle includes a pedal crank operatively coupled to the drive wheel for human-powered propulsion over the snow.

In one embodiment of both the motor-powered and the human-powered snow cycles, the arm is a swing arm that is hinged at its forward end to the snow cycle main frame. The back of the track carriage is hinge mounted to the rear of the swing arm. This hinged mounting is implemented, for example, by an axle that extends between the prongs of a forked swing arm. The rear of the track carriage and the drive wheel are supported on the axle. This hinge mounting and positioning of the track carriage beneath the swing arm in a scissors-type configuration enables the track carriage to move vertically under the snow cycle, and allows the track carriage to incline and decline to follow the snow surface to maintain traction upon the snow. In one version of this embodiment, the combined mass of the vehicle and operator is cushioned upon both the front and back of the track carriage by a single shock absorber combined with a force-distributing bell crank. The force-distributing bell crank distributes the vehicle suspension force from the shock absorber to the back of the track carriage through the swing arm and to the front of the track carriage through a connecting rod. Additionally, the bell crank can pivot to allow the track carriage to incline and decline without a change in the force exerted upon the bell crank pivot by the shock absorber.

In another embodiment of the snow vehicle, a snow compacting ramp is attached to the front of the track carriage. The ramp is positioned forward of the track and it is inclined upward away from the track to progressively compress the snow ahead of the track for improved traction and to prevent snow from packing in front of the track.

In another embodiment, the snow vehicle includes a gyroscopic stabilizer and steering aid. The stabilizer consists of a gyroscope mounted or coupled to the steering member and, preferably, an electric drive motor to spin the gyroscope. The spinning gyroscope tends to stabilize the ski in its steered direction by generating forces in response and opposition to forces that tend to deflect the ski from its steered direction. The gyroscope also automatically initiates the re-balancing of the snow vehicle when it becomes deflected and tipped out of balance by generating an instantaneous steering torque in response to the deflection. This response torque steers the ski in the direction toward which the vehicle is being tipped and the forward motion of the snow cycle brings the ski back under the center of the vehicle, helping to bring the vehicle back upright and in balance.

Unless clearly and unambiguously stated otherwise, "a" something as used herein refers to one or more of that something. For example, "an arm" in claim 1 means one or more arms and "a drive wheel" in claim 1 means one or more drive wheels.

DESCRIPTION OF THE DRAWINGS

FIG. 2 is a front view of the snow cycle of FIG. 1.

FIG. 3 is a rear view of the snow cycle of FIG. 1.

FIG. 8 is an exploded view of the track carriage of FIG. 7.

FIG. 9 is a sectional view of the track carriage of FIG. 6 along the section line 9—9 in FIG. 6.

FIG. 10 is a sectional view of the track carriage of FIG. 6 along the section line 10—10 in FIG. 6.

FIG. 11 is a sectional view of the track carriage of FIG. 6 along the section line 11—11 in FIG. 6.

FIG. 13 is an enlarged side view of the snow compacting ramp assembly of the snow cycle of FIG. 1.

FIG. 14 is an enlarged side view of the intermediate hub, disc brake, and drive chains of the snow cycle of FIG. 1

FIG. 15 is a top rear view of the intermediate hub and the swing arm pivot connection to the main frame of the snow cycle of FIG. 1., as viewed from the view line 15–15 indicated in FIG. 14.

FIG. 19 is a side view of the rear portion of the snow cycle of FIG. 1 illustrating a fourth alternate track suspension embodiment using a single shock absorber.

FIG. 20 is a side view of the front portion of the snow cycle of FIG. 1, illustrating the telescoping steering fork, extension frame, ski and ski pivot bracket, and the enclosed gyroscopic stabilizer and steering aid.

FIG. 21 is a side view of an electric motor-driven embodiment of the gyroscopic stabilizer and steering aid, steering extension frame, and ski. For clarity of illustration, this view is shown with the gyroscope covers removed and without the telescoping steering fork attached.

FIG. 22 is a front view of the gyroscopic stabilizer and steering aid, steering extension frame, and ski of FIG. 21.

FIG. 23 is a side view of an alternate electric motor drive embodiment of the gyroscopic stabilizer and steering aid with steering extension frame and ski. For clarity of illustration, this view is shown with the gyroscope covers removed and without the telescoping steering fork attached.

FIG. 24 is a front view of the gyroscopic stabilizer and steering aid, steering extension frame, and ski of FIG. 23.

FIG. 28 is a side view of a mechanical drive embodiment of the gyroscopic stabilizer and steering aid, steering extension frame, and ski. This view illustrates the driven end of a flexible shaft and driven-end bevel gears of a mechanical transmission coupling the intermediate hub to the gyroscope. For clarity of illustration, this view is shown with the gyroscope covers removed and the telescoping steering fork removed.

FIG. 29 is a front view of the gyroscopic stabilizer and steering aid, steering extension frame, and ski of FIG. 28.

FIG. 35 is a front view of the snow bicycle of FIG. 34.

FIG. 36 is a rear view of the snow bicycle of FIG. 34.

FIG. 39 is an enlarged rear view of the swing arm frame and intermediate hub of the snow bicycle of FIG. 34 along the view line 39—39 of FIG. 38.

FIG. 40 is an enlarged front view of the gyroscope and driven-end bevel gears of the snow bicycle of FIG. 35. For clarity of illustration, this view is shown with the gyroscope covers removed and without the telescoping steering fork attached.

DETAILED DESCRIPTION OF THE INVENTION

SNOW CYCLE STRUCTURE

Figure 1:
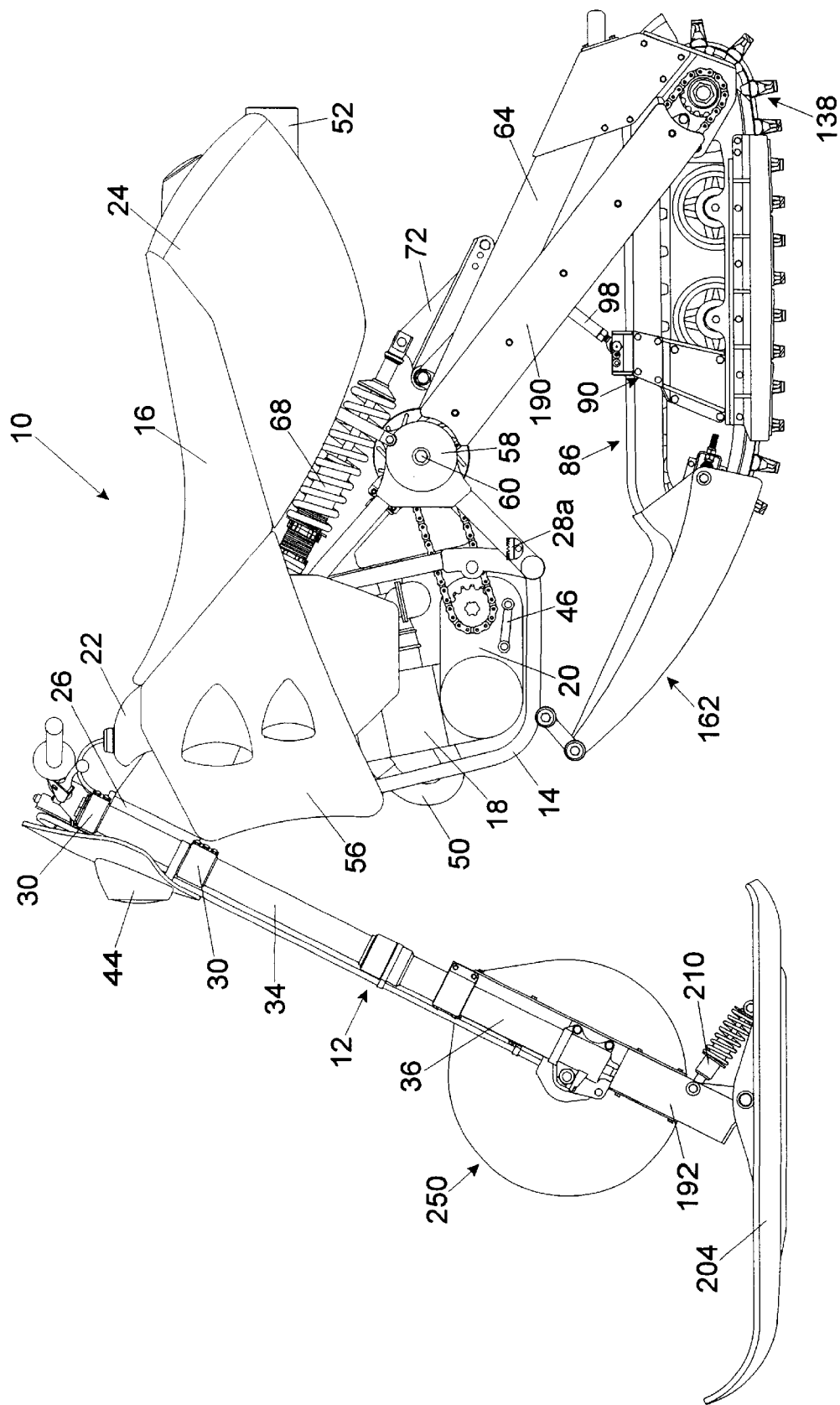
FIG. 1 is a side view of one embodiment of the snow cycle of the present invention.
Figure 4:
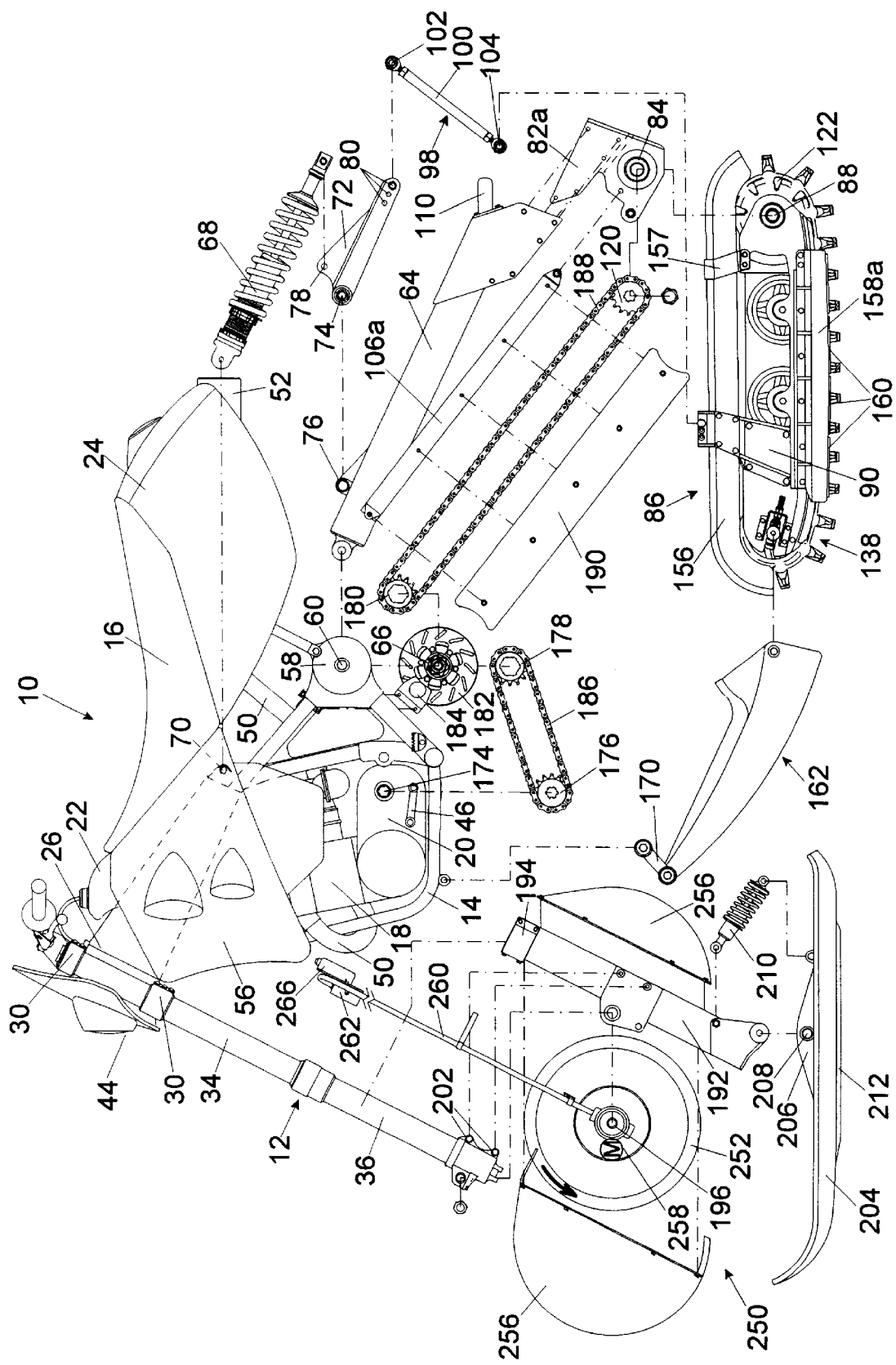
FIG. 4 is an exploded assembly side view of the snow cycle of FIG. 1

FIGS. 1–3 illustrate from the side, front and rear, respectively, a motor driven cycle type snow vehicle designated generally by reference number 10. FIG. 4 is an exploded assembly side view of snow cycle 10. Snow cycle 10 may include many parts typical of a conventional off-road motorcycle. For example, and referring to FIGS. 1–4, snow cycle 10 includes a telescoping steering fork 12, a main frame 14, a saddle 16, a gasoline motor 18, a transmission 20, a fuel tank 22, a body 24, and a head tube 26. Steering fork 12 is an elongated steering member that is supported by and rotates in head tube 26. Each prong of steering fork 12 is typically constructed as a combination of telescoping upper and lower members, referred to herein as fork tubes 34 and fork sliders 36. Fork tubes 34 and a head pipe 32 (visible only in FIG. 2) are clamped in position by upper and lower triple clamps 30. Head pipe 32 rotates in head tube 26. Fork tubes 34 slide in and out of fork sliders 36. Springs and hydraulic damping mechanisms inside the fork tubes and fork sliders provide spring support and shock absorption to cushion the front end of snow cycle 10 upon a ski 204. A handlebar 38 is attached to the top of upper triple clamp 30. As best viewed in FIGS. 2 and 3, a clutch control lever 40 is attached to the left hand side of handlebar 38 and a throttle control 42 is mounted on the right hand side of handlebar 38. A headlight 44 is mounted to steering fork 12 to point in the steered direction of the snow cycle. A gearshift control lever 46 connecting to transmission 20 is positioned forward of left footrest 28a. A brake lever pedal 48 (visible in FIGS. 2 and 3) is positioned forward of right footrest 28b. An exhaust pipe 50 exits the front of gasoline motor 18, routes alongside the gasoline motor, and attaches to the front of a muffler 52. A pair of motor cooling radiators 54 (visible in FIG. 2) mount to the forward portion of main frame 14, and are enclosed on the sides by a pair of radiator shrouds 56.

Track Suspension. Snow Ramp and Drive Train

Figure 5:
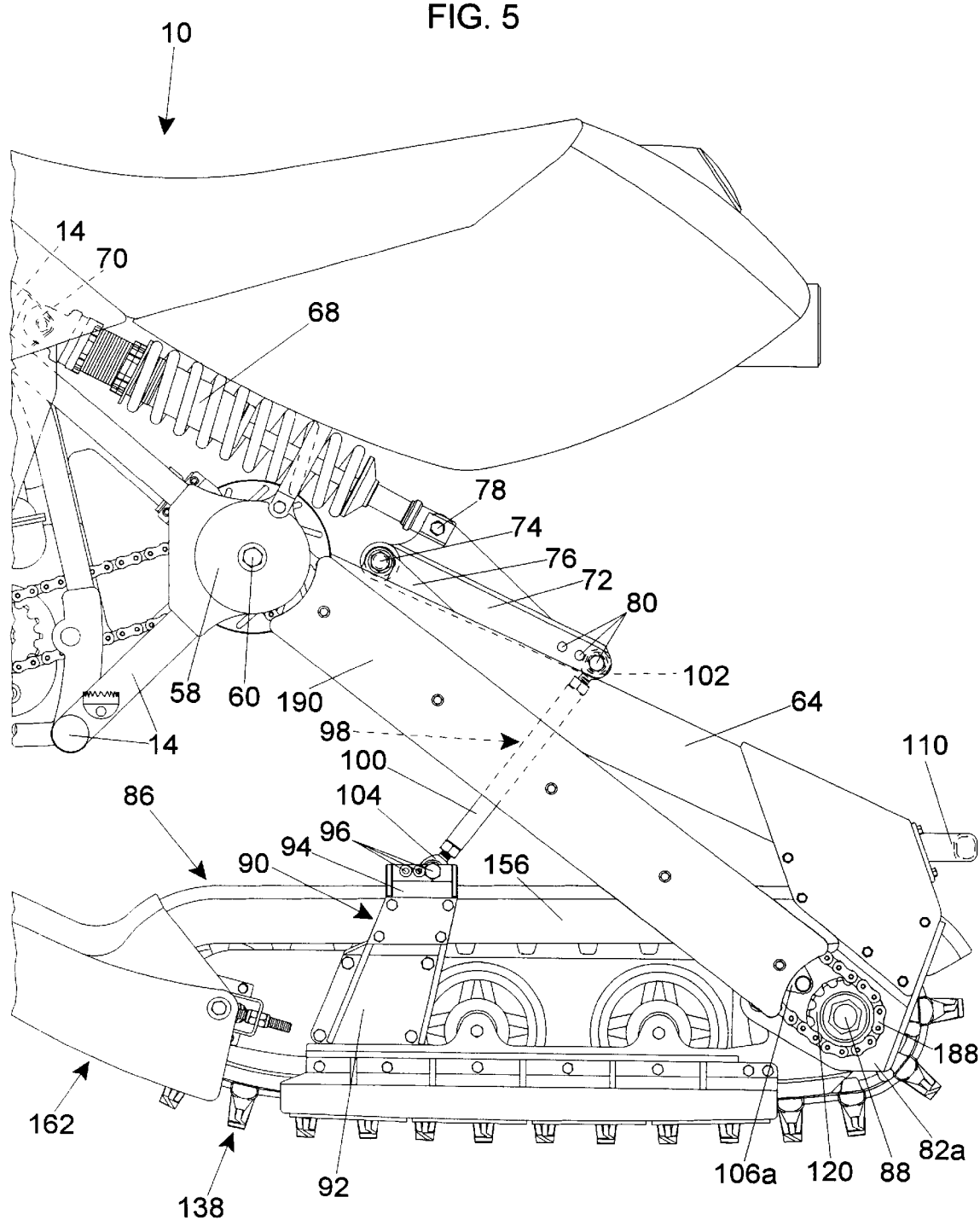
FIG. 5 is an enlarged side view of the rear portion of the snow cycle of FIG. 1.

Referring now also to FIGS. 5, 14 and 15, a swing arm pivot axle 60 is attached to main frame 14 at left and right swing arm pivot mounts 58. Swing arm pivot axle 60 extends through and is supported by two swing arm support bosses 62 (visible in FIG. 15). Swing arm support bosses 62 are attached to and part of main frame 14. Swing arm pivot axle 60 serves as a stationary non-rotating axle on which a swing arm 64 pivots. An intermediate hub 66 that rotates on ball bearings is also mounted on swing arm pivot axle 60.

Referring to FIGS. 4 and 5, a left track carriage pivot bracket 82a and a right track carriage pivot bracket 82b bolt to the left and right sides, respectively, of the lower rear portion of swing arm 64. Brackets 82 mount a pair of track carriage pivot bearings 84 (shown in FIGS. 4 and 8). A cogwheel axle 88 extends through track carriage pivot bearings 84. A track carriage 86 pivots relative to swing arm 64 on cogwheel axle 88. Swing arm 64 also includes left and right swing arm braces 106. Left swing arm brace 106 attaches to the left side of the forward upper end of swing arm 64 and extends back and downward to attach to left track carriage pivot bracket 82a. Right swing arm brace 106 (not visible) attaches below the forward upper end of the right side of swing arm 64 and mounts to right track carriage pivot bracket 82*b*. Swing arm braces 106 strengthen the combined structure comprising swing arm 64, left and right swing arm braces 106, and left and right track carriage pivot brackets 82. The combined swing arm structure comprising swing arm 64, left and right swing arm braces 106, and left and right track carriage pivot brackets 82 forms a stiff cantilever suspension arm that pivots vertically around swing arm pivot axle 60. A grab handle 110 attaches to the rear of swing arm 64 and facilitates lifting and dragging the snow cycle.

Figure 6:
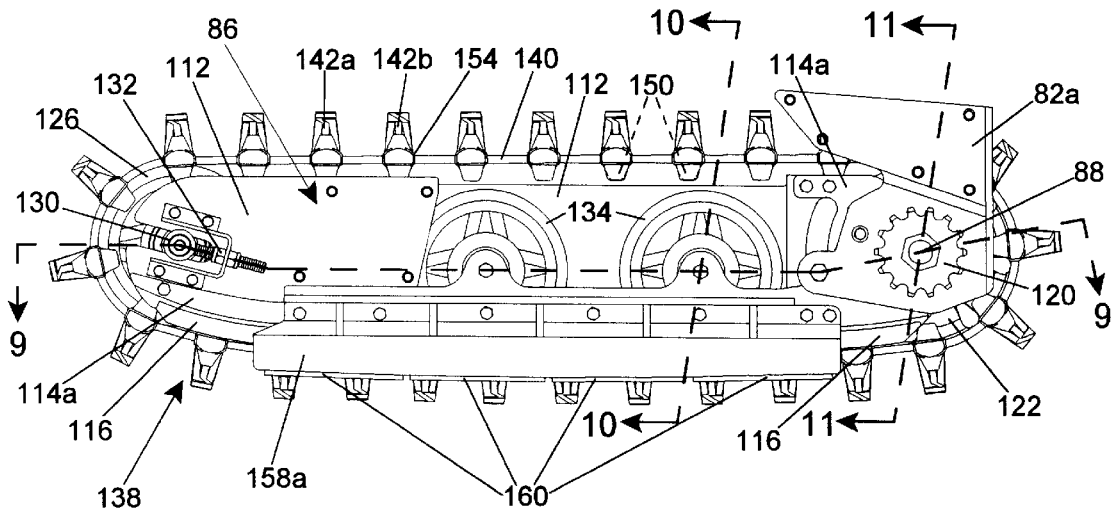
FIG. 6 is a detail side view of the track carriage of the snow cycles of FIG. 1 and FIG. 34. This view shows the track carriage removed from the snow cycle swing arm frame. The track shield, track carriage suspension frame and snow compacting ramp are removed, and are not shown in this view.
Figure 7:
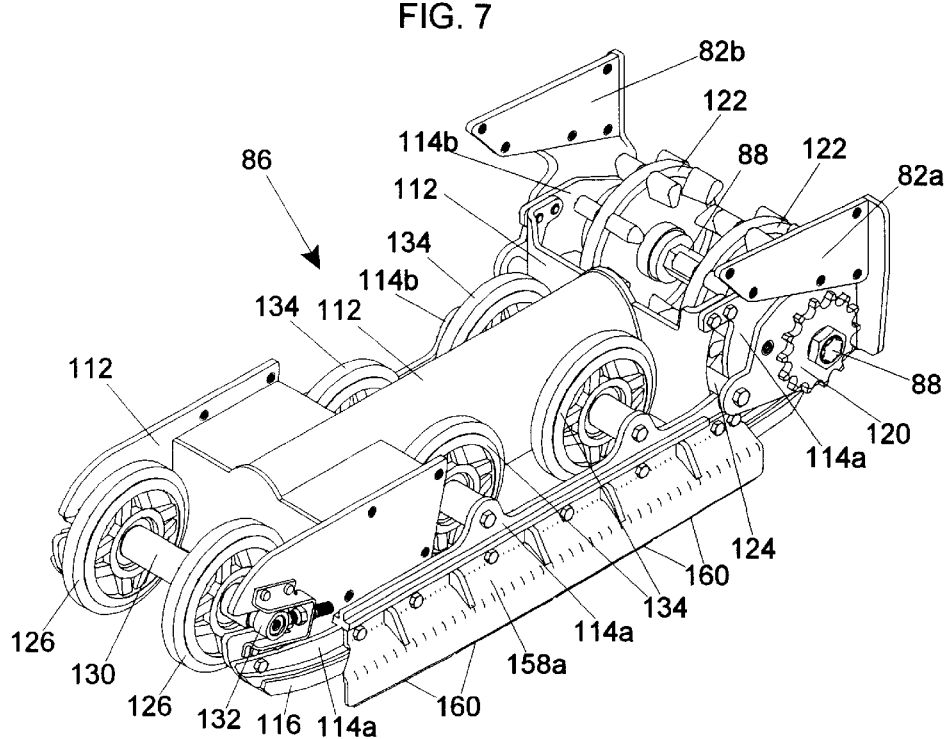
FIG. 7 is an isometric view of the track carriage of FIG. 6.

Referring now to FIGS. 6–8, track carriage 86 attaches pivotably at cogwheel axle 88 to the rear of the combined swing arm structure and pivots vertically under swing arm 64. An endless-loop track 138 is carried by track carriage 86 and circulates around the periphery of the track carriage. The swing arm structure and pivot connections to track carriage 86 allow the track carriage to move scissors-fashion vertically under swing arm 64 while maintaining a level orientation, inclining, or declining to enable track 138 to maintain traction with the terrain below the snow cycle.

The construction of track carriage 86 is illustrated in FIGS. 6–11. Track carriage 86 includes a track carriage frame 112, a left track slide rail 114a attached to the left side of track carriage frame 112, a right track slide rail 114*b* attached to the right side of track carriage frame 112, and a pair slide runners 116 mounted along the bottoms of track slide rails 114. Slide runners 116 are, preferably, manufactured from a durable high-density plastic having good friction and wear properties. A left ice runner support 158*a* is mounted to left slide rail 114*a*, and a right ice runner support 158b is mounted to right slide rail 114*b*. Ice runners 160 are attached to the lower edges of ice runner supports 158. Ice runners 160 should be made of tungsten carbide alloy or another suitably hard material to provide sharp, durable, ice-piercing edges.

Cogwheel axle bearings 118 (visible in FIGS. 8, 9, and 11) mount in slide rails 114. Cogwheel axle 88 is supported by and rotates in cogwheel axle bearings 118 and also mounts and rotates in track carriage pivot bearings 84. This structure allows cogwheel axle 88 to function as a hinge pivot between track carriage 86 and the combined swing arm structure comprising swing arm 64, braces 106, and brackets 82. A cogwheel axle sprocket 120 is mounted to the left end of cogwheel axle 88. Two drive wheels, called cogwheels 122, are mounted to the central portion of cogwheel axle 88. A swing arm pivot brace rod 124 (visible in FIGS. 7–9) is mounted between track carriage pivot brackets 82 to help maintain the correct spacing and alignment of track carriage pivot bearings 84.

Two guide wheels 126 are mounted to and rotate on a fixed guide wheel axle 130. Guide wheel axle 130 is mounted into left and right track tension adjusters 132 that are attached to each side of the forward portion of track carriage frame 112. The position and alignment of guide wheel axle 130 in track carriage frame 112 may be adjusted by, for example, the externally threaded rods and adjusting nuts illustrated in FIGS. 6–9 as track tension adjusters 132. Idler wheels 134 are mounted to and rotate on fixed idler wheel axles 136. The ends of Idler wheel axles 136 are mounted to the middle portions of track slide rails 114. Rotation of guide wheels 126 and idler wheels 134 on their respective axles is facilitated by bearings 128.

As illustrated in FIGS. 6 and 9–11, track 138 circulates around track carriage frame 112, and is movably guided and supported by drive cogwheels 122, guide wheels 126, idler wheels 134, and slide runners 116. Driving and braking forces are delivered to track 138 by the engagement of cogwheels 122 with cogwheel lugs 150. Tensioning and alignment of track 138 upon track carriage 86 is accomplished by the positioning of guide wheels 126 using track tension adjusters 132.

Figure 12:
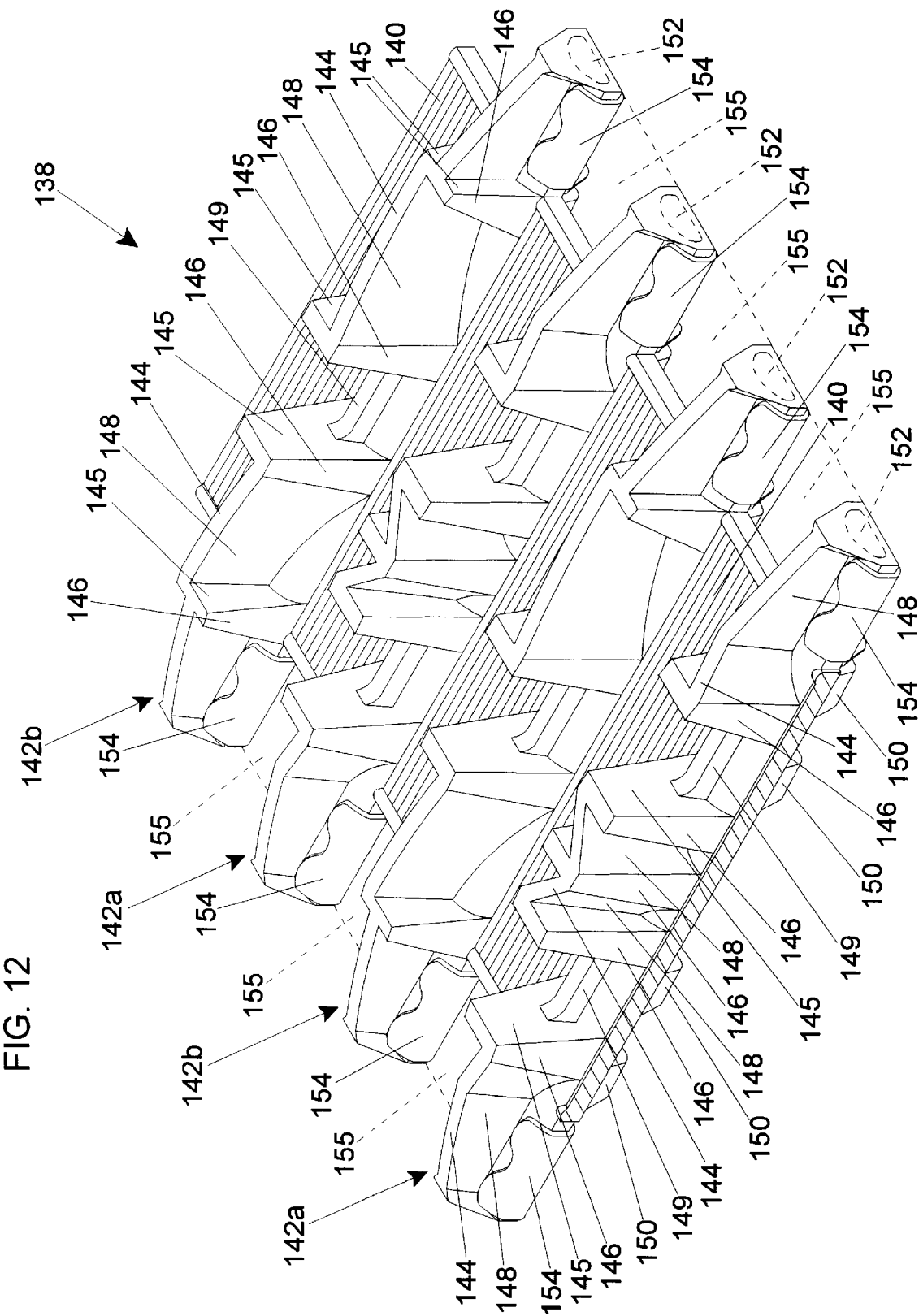
FIG. 12 is an isometric view of a sectioned portion of the track of the snow cycles of FIG. 1 and FIG. 34 illustrating the track belt, traction paddles and slide bearing clips.

The components of track 138 are illustrated in FIG. 12, and are also visible in FIGS. 9–11. Referring to FIG. 12, track 138 includes a track belt 140, design A traction paddles 142*a*, design B traction paddles 142*b*, cogwheel lugs 150, reinforcing rods 152, and slide bearing clips 154. Track belt 140 is formed in an endless loop, and may be made of any flexible reinforced rubber compound or similarly strong flexible material such as that used for conventional snowmobile tracks. Traction paddles 142 and track cogwheel lugs 150 are, preferably, also made of a strong flexible rubber compound molded to track belt 140. Traction paddles 142 include a multitude of traction paddle blocks 146. Blocks 146 have a generally rectangular cross section and are tapered in both cross-sectional dimensions from base to tip. Traction paddle blocks 146 provide a multitude of broad side surfaces 145 that serve as lateral snow traction surfaces. Traction paddle webs 148 extend between selected traction paddle blocks 146 to form snow traction surfaces for vehicle propulsion and braking. Reinforcing rods 152 extend laterally across track belt 140 at the bases of traction paddles 142, and are encased by the same material from which traction paddles 142 are formed. Traction paddles 142 and reinforcing rods 152 extend laterally beyond the sides of track belt 140, leaving track belt openings 155 between the ends of adjacent traction paddles. Reinforcing rods 152 are made of fiberglass, carbon fiber, or other suitable rigid, strong, lightweight material. Slide bearing clips 154 are clamped around the rubber-encased ends of reinforcing rods 152 to provide durable bearing and guide surfaces to bear upon slide runners 116. Slide bearing clips 154 should be made of steel or some other suitably wear resistant material.

A track suspension is desirable to support and cushion snow cycle 10 and the operator upon track carriage 86. In one embodiment of a track suspension for snow cycle 10 illustrated in FIGS. 1, 4 and 5, a shock absorber 68 is mounted pivotably to a frame suspension mount 70 of main frame 14, and to a bell crank first arm pivot 78 of a bell crank 72. As shown in FIGS. 4 and 5, a bell crank fulcrum pivot 74 attaches to a swing arm suspension mount 76 on swing arm 64 such that bell crank 72 can pivot upon swing arm 64. Shock absorber 68 is operatively coupled to swing arm 64 through bell crank 72. Shock absorber 68 is also operatively coupled to the forward end track carriage 86 through bell crank 72, a connecting rod 98, and a track carriage suspension frame 90. Suspension frame 90 comprises left and right side brackets 92 and a top bracket 94 and serves as a suspension mount for the front of track carriage 86. Side brackets 92 attach to the sides of track carriage frame 112, and top bracket 94 spans across the top of track 138 and a track shield 156, and attaches to left and right side brackets 92. Track shield 156 attaches to top bracket 94 and a track shield support 157 (visible in FIG. 4 only) and covers the upper run of track 138. Connecting rod 98 includes a shaft 100, an upper rod end 102 which can be adjustably screwed in to or out of shaft 100, and a lower rod end 104 which can likewise be adjustably screwed in to or out of shaft 100. Lower rod end 104 of connecting rod 98 mounts selectively into one of pivot connections 96 in top bracket 94. Upper rod end 102 of connecting rod 98 mounts selectively into one of bell crank second arm pivot connections 80. The length of connecting rod 98 can be adjusted, for example, by screwing the threaded sections of upper rod end 102 and lower rod end 104 into or out of shaft 100. The track loading distribution and track suspension characteristics can be modified by adjusting the length of connecting rod 98 and/or by selectively changing pivot connection 80 and/or pivot connection 96 to which connecting rod 98 attaches. Bell crank 72 apportions the suspension force from shock absorber 68 to swing arm 64 and to the forward end of track carriage 86 through connecting rod 98 and suspension frame 90. The suspension force apportioned to the swing arm urges it pivotally downward around swing arm pivot axle 60. The suspension force apportioned to the forward end of track carriage 86 urges the track carriage pivotally downward around cogwheel axle 88 that functions as the pivot connection between track carriage 86 and swing arm 64. The suspension forces of shock absorber 68 are thus distributed to both the rearward and forward ends of track carriage 86 in a predetermined proportion to affect a pre-determined longitudinal loading distribution along the length of the ground-contacting run of track 138. Snow cycle 10 and the operator are thus cushionably supported upon the ground-contacting run of track 138.

Figure 16:
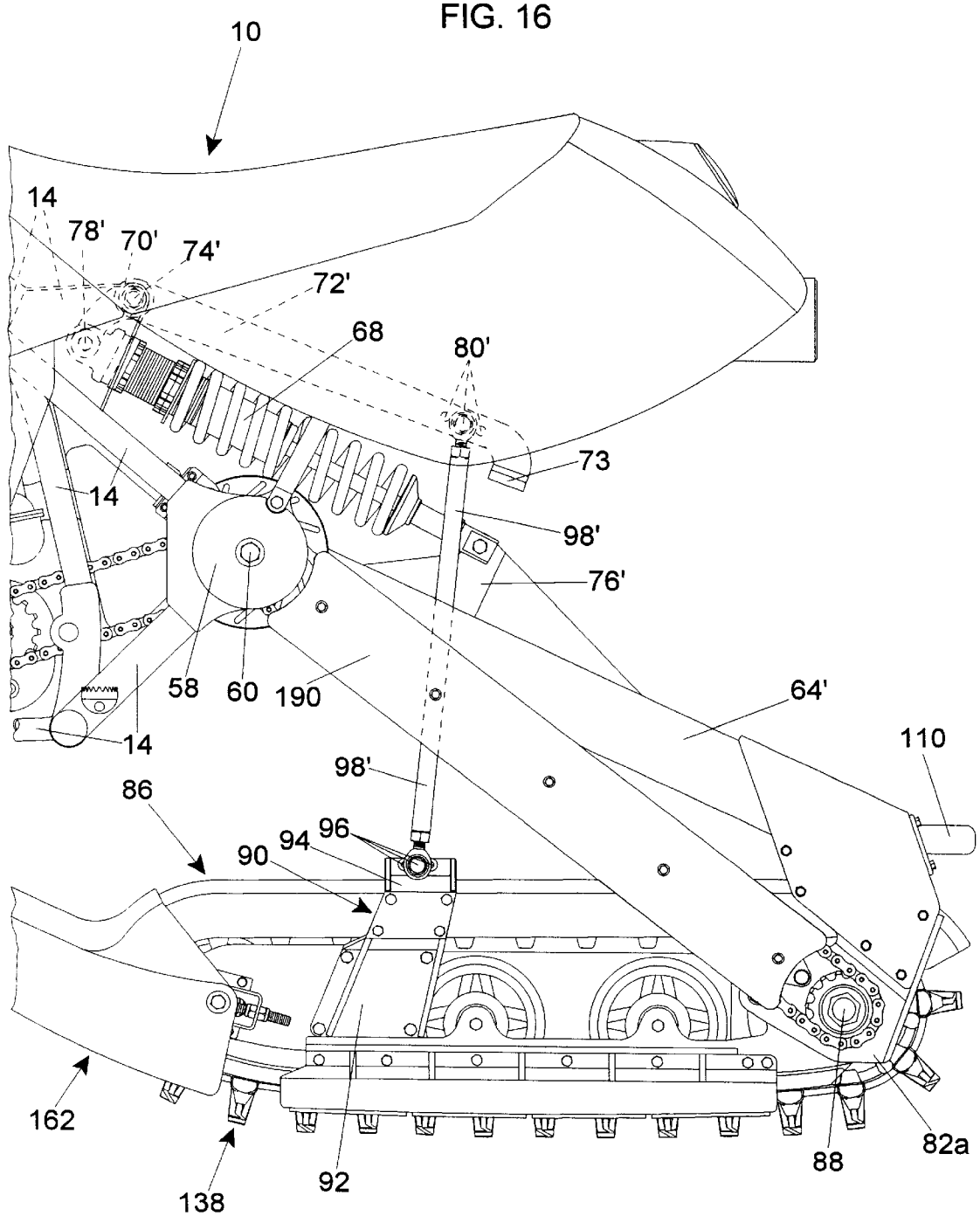
FIG. 16 is a side view of the rear portion of the snow cycle of FIG. 1 illustrating an alternate embodiment the track suspension having a single shock absorber, a bell crank, and a connecting rod.

An alternate embodiment of a track carriage suspension using a single shock absorber, a bell crank, and a connecting rod is illustrated in FIG. 16. As shown in FIG. 16, shock absorber 68 is pivotally connected between a swing arm suspension mount 76' of a swing arm 64 and a bell crank first arm pivot 78' of a bell crank 72'. A fulcrum pivot 74' of bell crank 72' mounts rotatably to a frame suspension mount 70' of main frame 14. Two connecting rods 98' are used, with the upper ends of connecting rods 98' connecting on opposite sides of bell crank 72' to one of a set of bell crank second arm pivot connections 80'. Connecting rods 98' extend downward on opposite sides of swing arm suspension mount 76' and shock absorber 68 and the lower ends of connecting rods 98' connect selectively into one of the pivot connections 96 of a track carriage suspension frame 90. Only one of connecting rods 98' is visible in FIG. 16, the right side connecting rod 98' being behind and obscured by the left side connecting rod 98' in this view. Bell crank 72' apportions suspension force from shock absorber 68 through swing arm 64 to the rearward end of track carriage 86 and through connecting rods 98' and suspension frame 90 to the forward end of track carriage 86. The suspension force is apportioned to establish a predetermined loading distribution along the length of the ground-contacting run of track 138. Bell crank 72' of this embodiment additionally has a suspension stop bumper 73 that contacts the top of suspension mount 76' to prevent the forward end of track carriage 86 from pivoting below and away from swing arm 64 further than is desirable.

Figure 17:
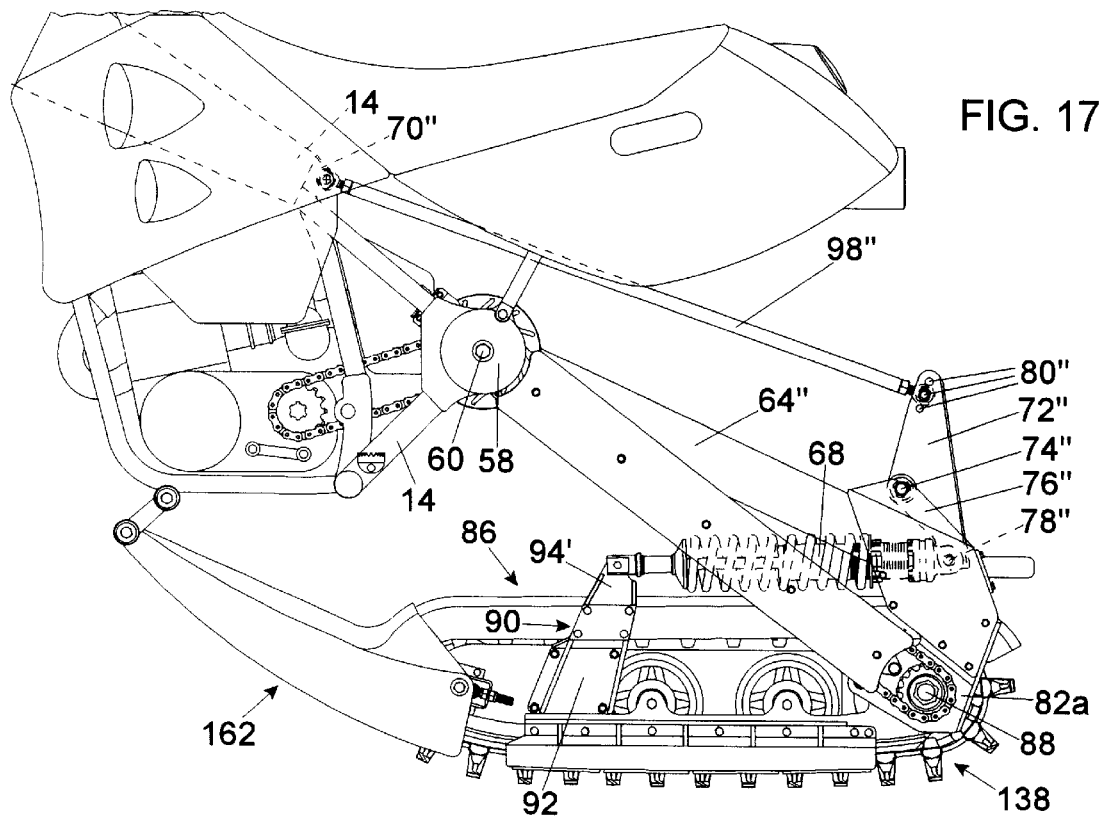
FIG. 17 is a side view of the rear portion of the snow cycle of FIG. 1 illustrating a second alternate track suspension embodiment having a single shock absorber, a bell crank, and a connecting rod.

A third configuration of a track carriage suspension comprising a single shock absorber, bell crank and connecting rod is shown in FIG. 17. A fulcrum pivot 74" of a bell crank 72" mounts to a swing arm suspension mount 76" on the lower rearward portion of a swing arm 64. Shock absorber 68 connects pivotably between a top bracket 94' of suspension frame 90 and a first arm pivot 78" of bell crank 72". A connecting rod 98" connects pivotably between a frame suspension mount 70" of main frame 14 and one of a set of second arm pivot connections 80" of bell crank 72". Shock absorber 68 applies suspension cushioning force between track carriage suspension frame 90 and first arm pivot 78" of bell crank 72". This force urges track carriage 86 downward around its hinge connection with track carriage pivot brackets 82 at cogwheel axle 88, and simultaneously urges bell crank 72" around bell crank fulcrum pivot 74" in a counter-clockwise direction as viewed in FIG. 17. Bell crank 72" transmits this force to second arm pivot connection 80" with connecting rod 98", creating a compression force through connecting rod 98" to frame suspension mount 70". The force couple established in bell crank pivot connection 80" and fulcrum pivot 74" urges swing arm 64 downward around swing arm pivot axle 60. Bell crank 72" apportions the cushioning force from shock absorber 68 between swing arm 64 and the forward end of track carriage 86, and between main frame 14 and swing arm 64. Suspension forces from shock absorber 68 are thus distributed in pre-determined proportion to the rearward and forward ends of track carriage 86, thereby cushioning the weight of snow cycle 10 and the operator upon track carriage 86 while establishing a pre-determined longitudinal loading distribution between track 138 and the snow.

Three different ways have been described and illustrated in FIGS. 5, 16 and 17 for a single shock absorber, a force-distributing bell crank and a connecting rod to be used in combination as a track carriage suspension for snow cycle 10. Considering the shock absorber, bell crank, and connecting rod in pivotally-connected combination, but separated from snow cycle 10, there remain three open pivots. These three pivots comprise the bell crank fulcrum pivot, a shock absorber end pivot, and a connecting rod end pivot. There are six different ways or combinations in which these three open pivot connections can be individually and exclusively connected into suspension pivot mounts on main frame 14, swing arm 64, and track carriage suspension frame 90. Three of these six possible connection combinations have been described and illustrated in FIGS. 5, 16, and 17. There exist three other pivot connection combinations of the six possible combinations that enable the forces from a single shock absorber to be distributed by the bell crank in pre-determined proportion to the rearward and forward ends of the track carriage. It is believed the three remaining connection combinations are less practical than those that have been described and illustrated, and so they are not shown or described in detail, but are summarized as follows:

The shock absorber connected pivotably between the track carriage and the bell crank first arm; the bell crank fulcrum connected pivotably to the snow cycle main frame; and the connecting rod connected pivotably between the bell crank second arm and the swing arm.

The shock absorber connected pivotably between the swing arm and the bell crank first arm; the bell crank fulcrum connected pivotably to the track carriage; and the connecting rod connected pivotably between the bell crank second arm and the snow cycle main frame.

The shock absorber connected pivotably between the main frame and the bell crank first arm; the bell crank fulcrum connected pivotably to the track carriage; and the connecting rod connected pivotably between the bell crank second arm pivot and the swing arm.

Figure 18:
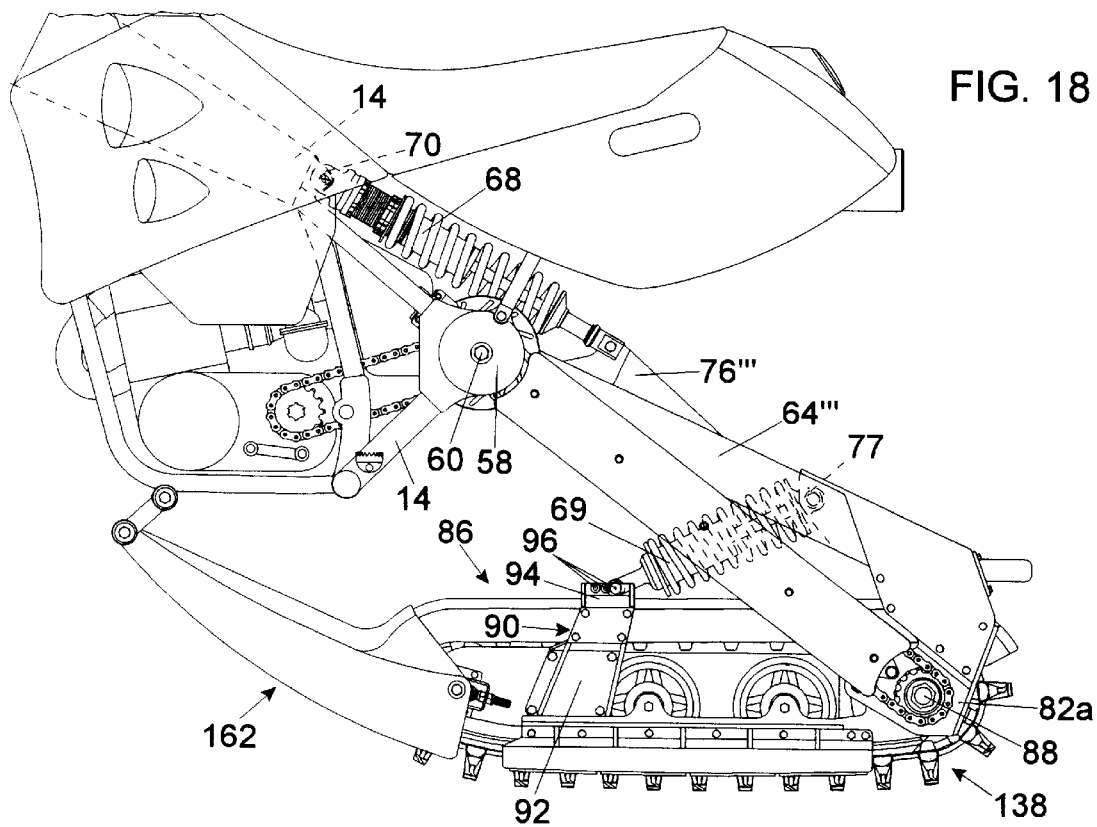
FIG. 18 is a side view of the rear portion of the snow cycle of FIG. 1 illustrating a third alternate track suspension embodiment using two shock absorbers.

One embodiment of a track suspension for snow cycle 10 that uses two shock absorbers is illustrated in FIG. 18. Shock absorber 68 and a second shock absorber 69 each provides both spring and damping cushioning forces using, for example, a coil spring and a hydraulic damper. Shock absorber 68 is connected between frame suspension mount 70 and a swing arm suspension mount 76''', and urges a swing arm 64 pivotally downward around swing arm pivot axle 60. Second shock absorber 69 is connected pivotably between a lower swing arm suspension mount 77 of swing arm 64 and one of pivot connections 96 in top bracket 94. The force of second shock absorber 69 is applied between swing arm 64 and suspension frame 90 to urge track carriage 86 pivotally downward around the pivot connection on cogwheel axle 88 between track carriage 86 and track carriage pivot brackets 82. The cushioning forces of shock absorbers 68 and 69 are distributed to the rearward and forward ends of track carriage 86 to establish a predetermined loading distribution along the length of the ground-contacting run of track 138. Snow cycle 10 and the operator are thus cushionably supported upon the ground-contacting run of track 138.

A track suspension embodiment using a single shock absorber is shown in FIG. 19. A frame suspension mount 70''' is located on a portion of main frame 14' that extends rearward under saddle 16. Track carriage suspension frame 90 is attached to a track carriage frame 112' at a location further rearward compared to the location of suspension frame 90 on track carriage frame 112 of the previously-described embodiments. Suspension frame 90 is also mounted in a reversed orientation in this embodiment. A shock absorber 68' connects pivotally between frame suspension mount 70''' and one of pivot connections 96 of top bracket 94 to cushionably support snow cycle 10 and the operator upon track carriage 86.

Referring now to FIGS. 2, 4, and 13, a snow compacting ramp assembly 162 is pivotally attached to the front of track carriage 86 and to the bottom of main frame 14. As shown in FIG. 13, ramp assembly 162 includes a ramp frame 164, a ramp 166 secured to the bottom of ramp frame 164, a snow cover 168 enclosing the top of the ramp assembly, and a pair of ramp pivot links 170. Preferably, ramp 166 is made from ultra-high molecular weight plastic to provide a low friction ramp surface that is durable, fracture resistant, and abrasion resistant. Ramp frame 164 is slightly wider than track carriage 86 and extends around the forward sides of track carriage 86 and attaches pivotally to the ends of guide wheel axle 130 to form a hinge between ramp assembly 162 and track carriage 86. The rearward end of ramp 166 is located at approximately the same height as the front of the lower run of track belt 140 of track 138. The front of ramp frame 164 pivots on the lower ends of pivot links 170. The upper ends of pivot links 170 hinge to a pair of ramp bosses 172 mounted on the sides of the lower portion of main frame 14. The front of ramp frame 164 is supported by pivot links 170 and is constrained in movement to an arc around ramp bosses 172 in close proximity to the bottom of main frame 14. Ramp assembly 162 can incline and decline and move forward and rearward as necessitated by the suspension motion of track carriage 86 relative to main frame 14.

The power transmission system of snow cycle 10 will now be described with reference to FIGS. 4, 5, 14 and 15. Drive power for track 138 is provided by gasoline motor 18, and is delivered through transmission 20 to a transmission output shaft 174 that mounts a transmission output shaft sprocket 176. As best viewed in FIG. 15, intermediate hub 66 is supported by and rotates on swing arm pivot axle 60. A primary intermediate sprocket 178 is attached to the inside end of intermediate hub 66. A secondary intermediate sprocket 180 is attached to the outside end of intermediate hub 66. A hydraulic disc brake 181 includes a brake disc 182 attached to the middle of intermediate hub 66 and a hydraulic brake caliper 184 that is mounted to main frame 14. Brake caliper 184 straddles brake disc 182 and forces brake pads against the sides of brake disc 182 during braking of snow cycle 10. A primary drive chain 186 wraps transmission output shaft sprocket 176 and primary intermediate sprocket 178 in an endless loop and delivers drive power to intermediate hub 66. A secondary drive chain 188 wraps secondary intermediate sprocket 180 and cogwheel axle sprocket 120 in an endless loop and delivers drive power and braking torque from intermediate hub 66 to cogwheel axle 88. A secondary chain guide/cover 190 (shown in FIGS. 1–5, but removed in FIGS. 14 and 15 for illustration clarity) encloses the upper and lower runs of secondary drive chain 188, and is attached to left swing arm brace 106a.

Steering Ski, Suspension, and Gyroscopic Stabilizer and Steering Aid

The front suspension, steering ski, and gyroscopic stabilizer and steering aid will be described. Referring first to FIGS. 2, 4, and 20, ski 204 is connected to steering fork 12 through a steering extension frame 192. A gyroscopic stabilizer and steering aid 250 is mounted to extension frame 192. For convenience, gyroscopic stabilizer and steering aid 250 is sometimes referred to simply as stabilizer 250. Extension frame 192 is clamped or otherwise attached to the lower portion of steering fork 12. Extension frame 192 allows the use of a conventional motorcycle steering fork. A longer steering fork may be used, if desired, instead of the combined steering fork 12 and extension frame 192 shown in the drawings. Also, a monolithic elongated steering member could be substituted for steering fork 12, in which case stabilizer 250 could mount to the side of the monolithic steering member.

Refer now also to FIGS. 21 and 22 that show from the side and the front extension frame 192, ski 204, and stabilizer 250 removed from telescoping steering fork 12 for illustration clarity. As illustrated in FIG. 20, fork slider clamps 194 wrap around the outsides of the upper middle portions of fork sliders 36 and bolt to the top of extension frame 192, clamping the extension frame firmly to the fork sliders. A gyro axle 196 is mounted to and extends between the end of each prong of steering fork 12. Preferably, gyro axle 196 is threaded on one end to facilitate clamping the bottom of fork sliders 36 using a threaded axle nut 197 just like the front wheel axles of some motorcycles are clamped to the motorcycle fork sliders. Gyro axle 196 extends between fork sliders 36 through holes in left and a right mounting brackets 200 welded to the mid portions of the left and right members of extension frame 192, serving to rigidly attach extension frame 192 to telescoping steering fork 12. As visible in FIG. 4 and FIG. 20, motorcycle brake mounts 202 fabricated on the back of the lower end of left fork slider 36 are bolted to left mounting bracket 200 to provide additional strength and rigidity to the attachment of extension frame 192 to telescoping steering fork 12.

Ski 204 is mounted to a ski pivot bracket 206. A ski pivot axle 208 mounts in ski pivot bracket 206 and extends through and rotates in the bottom of extension frame 192. The resulting pivot allows ski 204 to incline and decline to follow the terrain topography while constraining the ski to be steered. A ski biasing shock absorber 210 is pivot mounted between extension frame 192 and the rear portion of ski pivot bracket 206. A ski wear runner 212 is attached to the bottom center of ski 204.

One embodiment of stabilizer 250 is illustrated in FIGS. 4, 20–22, and 25–27. Stabilizer 250 is positioned between the prongs of steering fork 12 mounted within extension frame 192. Stabilizer 250 includes a gyroscope 252, an electric motor 258, an electronic motor controller 262 and a control box 266. Gyroscope 252 is mounted to a gyro hub 254 (visible in FIG. 22) that rotates on gyro axle 196 and spins in a rotational direction indicated by the curved arrow shown on the side of gyroscope 252 in FIGS. 4 and 21. Motor 258 is operatively mounted to gyroscope 252 and to extension frame 192, and applies torque between extension frame 192 and gyroscope 252 to spin the gyroscope in the direction indicated. As viewed in FIGS. 20 and 25, controller 262 and control box 266 are attached to upper triple clamp 30 forward of handlebar 38. A motor wiring cable 260 exits motor 258 and attaches along the front of extension frame 192 and left fork slider 36 to guide a reinforced and stiffened section of motor wiring cable 260 to controller 262. Stabilizer 250 should be enclosed and protected by, for example and visible in FIGS. 4 and 20, a pair of covers 256 that attaches to extension frame 192.

Figure 25:
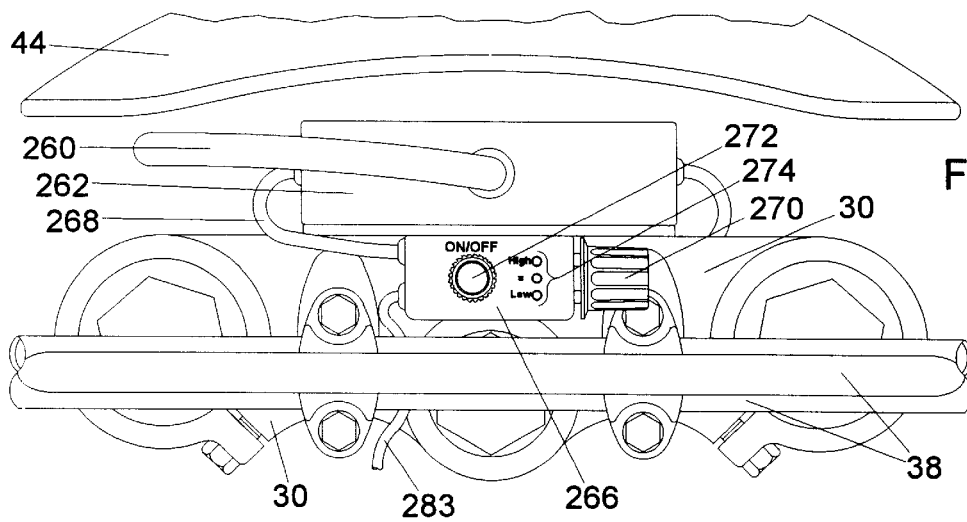
FIG. 25 is a top view of the gyroscope motor controller and control box with operator controls, all mounted to the upper triple clamp forward of the handlebar.

Mechanical power to spin gyroscope 252 is generated by motor 258 substantially in proportion to the electric power delivered to motor 258. Controller 262 controls the supply of electric power to motor 258. Controller 262 is powered from an electrical generator system that is driven from and integral with gasoline motor 18. Referring now to FIG. 25, controller 262 represents generally any commercially available d-c motor controller that is compatible with motor 258 and with the electrical generator system of snow cycle 10. For example and illustrated in FIG. 25, a pulse-width modulation d-c motor controller may be used as controller 262, such as the Eagle Series 12 volt, 40 amp PWM motor controller manufactured by 4QD, 30 Reach Road, Burwell, Cambridge shire, CB5, OAH, Great Britain. The speed control input of controller 262 can be supplied from external speed control circuits or devices in different ways. Control box 266 is also available from 4QD for the Eagle Series PWM controller. Control box 266 connects to controller 262 through a control cable 268, and includes a speed set knob 270, an on/off pushbutton switch 272, and a 3-L.E.D. speed indicator meter 274. As show in FIG. 25, control box 266 is mounted to upper triple clamp 30 forward of handlebar 38 to allow the controls to be easily reached by the snow cycle operator.

Figure 26:
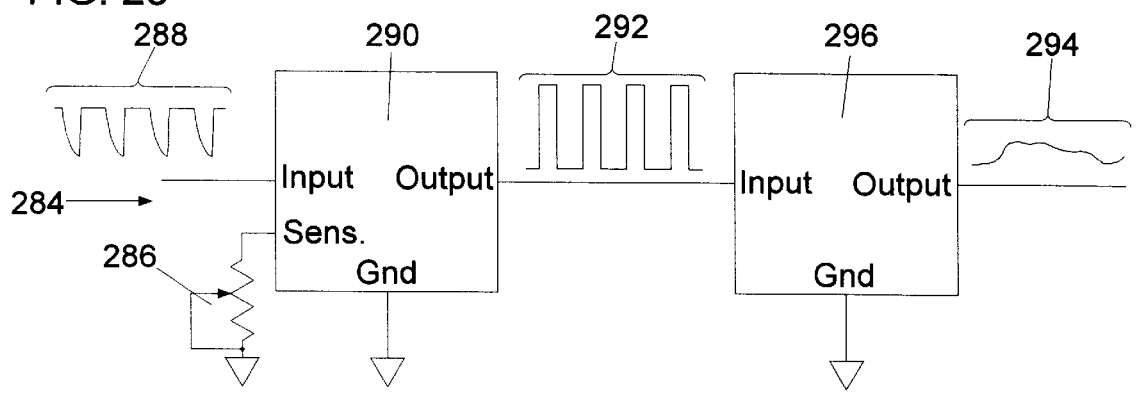
FIG. 26 is a circuit diagram of a servo input circuit for the gyroscope motor controller of FIG. 25. Electrical voltage waveforms are shown for clarification of the electronic signal processing.

FIG. 26 is a circuit diagram of an electronic servo input circuit 284 of an optional servo control system for servoing the rotational velocity of electric motor 258 to the speed of snow cycle 10. This servo control system includes an electronic tachometer 282 attached to the side of brake caliper 184 (visible in FIG. 27), servo input circuit 284, and controller 262. Tachometer 282 senses the rotational velocity of intermediate hub 66 by sensing the rotational velocity of brake disc 182, and delivers a tachometer signal 288 through a tachometer cable 283 to servo input circuit 284 enclosed in control box 266. Servo input circuit 284 includes a one-shot 290 and a low pass filter 296. Servo input circuit 284 converts tachometer signal 288 to a low frequency voltage signal 294 that is transmitted to controller 262 through control cable 268. Controller 262 drives motor 258 to a rotational velocity that is in approximate proportion to the rotational velocity of intermediate hub 66. In this embodiment, speed set knob 270 attaches to a gain potentiometer 286 (shown in FIG. 26) that controls the gain of servo input circuit 284.

An alternate embodiment of an electric motor driven gyroscopic stabilizer and steering aid 250 is shown in FIGS. 23 and 24. In this embodiment, an electric motor 258' appears differently than motor 258 as presented in FIGS. 4, 21, and 22. Motor 258 is specially designed to attach integrally to the side of gyroscope 252 in the limited space between the gyroscope and extension frame 192. Alternately, motor 258' represents a commercially available electric motor that is more prevalent and economical than motor 258. Motor 258' is mounted to a motor mounting frame 300 that is attached to the upper rearward portion of extension frame 192. Motor 258' has electrical supply requirements very similar to those of motor 258, and can be supplied by the same controller options described for motor 258 and illustrated in FIGS. 25–27. The electrical power for motor 258' is supplied by controller 262 through wiring cable 260. Motor 258' is operatively coupled to gyroscope 252 using, for instance, a 1 to 2 drive-ratio pulley and belt system. A driving pulley 304 having twice the diameter of a driven pulley 306 is mounted to a motor shaft 302 of electric motor 258'. Driven pulley 306 is attached concentrically to gyro hub 254. An endless-loop belt 308 wraps driving pulley 304 and driven pulley 306. Torque generated by electric motor 258' is coupled to gyroscope 252 through driving pulley 304, belt 308, and driven pulley 306 to propel the gyroscope to twice the R.P.M., for example, of electric motor 258'.

Figure 30:
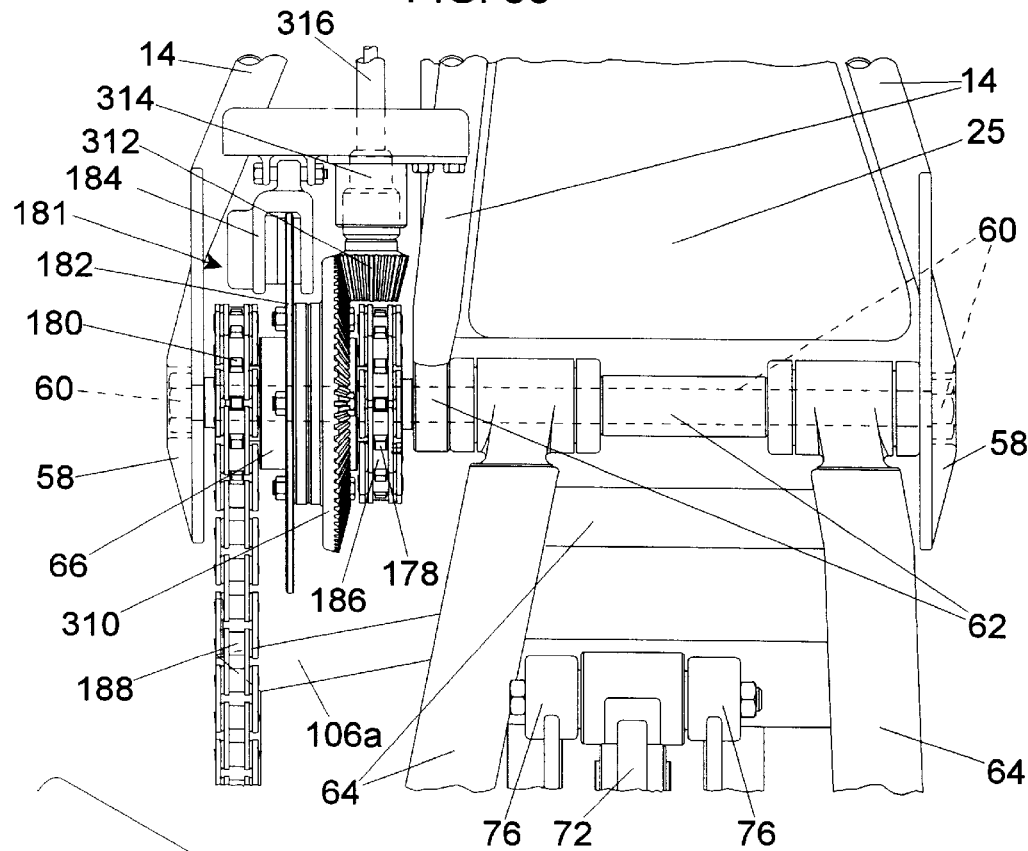
FIG. 30 is a top rear view of the intermediate hub and driving end of the mechanical gyroscope drive embodiment of FIGS. 28 and 29, illustrating the driving end bevel gears.

As an alternative to motor 258, power delivered from the drive train of snow cycle 10 could be used to spin gyroscope 252. One example of a mechanical drive for powering gyroscope 252 from the snow cycle drive train is shown in FIGS. 28–31. As shown in FIG. 30, a primary driving-end bevel gear 310 is concentrically attached to intermediate hub 66, and meshes with a secondary driving-end bevel gear 312 that is attached to and drives a flexible shaft 316. Flexible shaft 316 is similar in construction to the flexible shaft drives commonly used for grinding and shaping power tools that have handheld tool chucks driven through their flexible shafts by remote stationary electric motors. A bevel gear bearing and bracket 314 holds bevel gear 312 meshed with bevel gear 310. As shown in FIG. 30, for example, a 1 to 4 step-up drive ratio from bevel gear 310 to bevel gear 312 is employed to reduce the torque that must be transmitted by flexible shaft 316.

Figure 31:
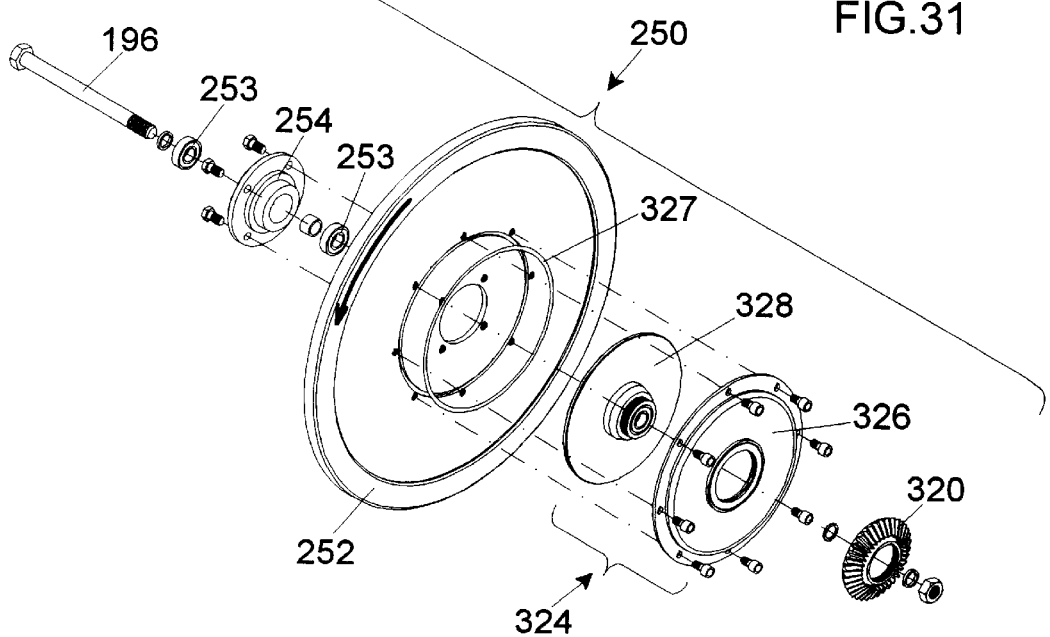
FIG. 31 is an exploded view of the gyroscope, viscous coupler and driven-end bevel gear of the mechanical drive embodiment of the gyroscopic stabilizer and steering aid of FIGS. 28 and 29.

The driven end of the mechanical drive for gyroscope 252 is illustrated in FIGS. 28, 29 and 31. Flexible shaft 316 attaches to and drives a primary driven-end bevel gear 318. As shown in FIGS. 28 and 29, a bevel gear bearing and bracket 322 holds bevel gear 318 properly meshed with a secondary driven-end bevel gear 320. A 2 to 1 step-down drive ratio is employed, for example, such that gyroscope 252 is driven to rotate substantially at one-half the R.P.M. of flexible shaft 316. The 1 to 4 step-up drive ratio at the driving end and the 2 to 1 step-down drive ratio at the driven end of this mechanical drive results in a 1 to 2 step-up drive ratio between intermediate hub 66 and gyroscope 252. Other drive ratios may be deployed as dictated by component design limits and design optimization of stabilizer 250.

Referring to FIGS. 29 and 31, a viscous coupler 324 is concentrically attached to the left side of gyroscope 252. Viscous coupler 324 is similar in construction and operation to the viscous couplers used as automobile radiator fan clutches in many late 1970's and early 1980's General Motors Corporation automobiles. Viscous coupler 324 includes a viscous coupler disc 328, a viscous coupler cover 326, a viscous coupler seal 327 and a suitable viscous fluid (not shown). Viscous coupler cover 326 attaches to the side of gyroscope 252, compressing viscous coupler seal 327 and sandwiching viscous coupler disc 328 with the suitable viscous fluid between the left side of gyroscope 252 and the interior side of the viscous coupler cover. Secondary driven-end bevel gear 320 is attached to and drives viscous coupler disc 328. Gyro hub 254 and viscous coupler disc 328 rotate upon gyro axle 196. Torque to spin gyroscope 252 is coupled from viscous coupler disc 328 through the suitable viscous fluid to the left side of gyroscope 252 and the interior side of viscous coupler cover 326.

Other mechanical power transmission options exist which could be adapted for transferring motive power from the snow cycle drive train to gyroscope 252 to spin the gyroscope, including hydraulic pumps and motors, pneumatic power transmission systems, belt drives, and other mechanical power transmission means too numerous to mention here. Gyroscope 252 could also be powered from a wheel or track that contacts the snow in proximity to ski 204, and imparts rotational power derived from the motion of snow cycle 10 over the snow to the gyroscope, causing it to spin at a rotational velocity substantially proportional to the speed of the snow cycle.

Figure 32:
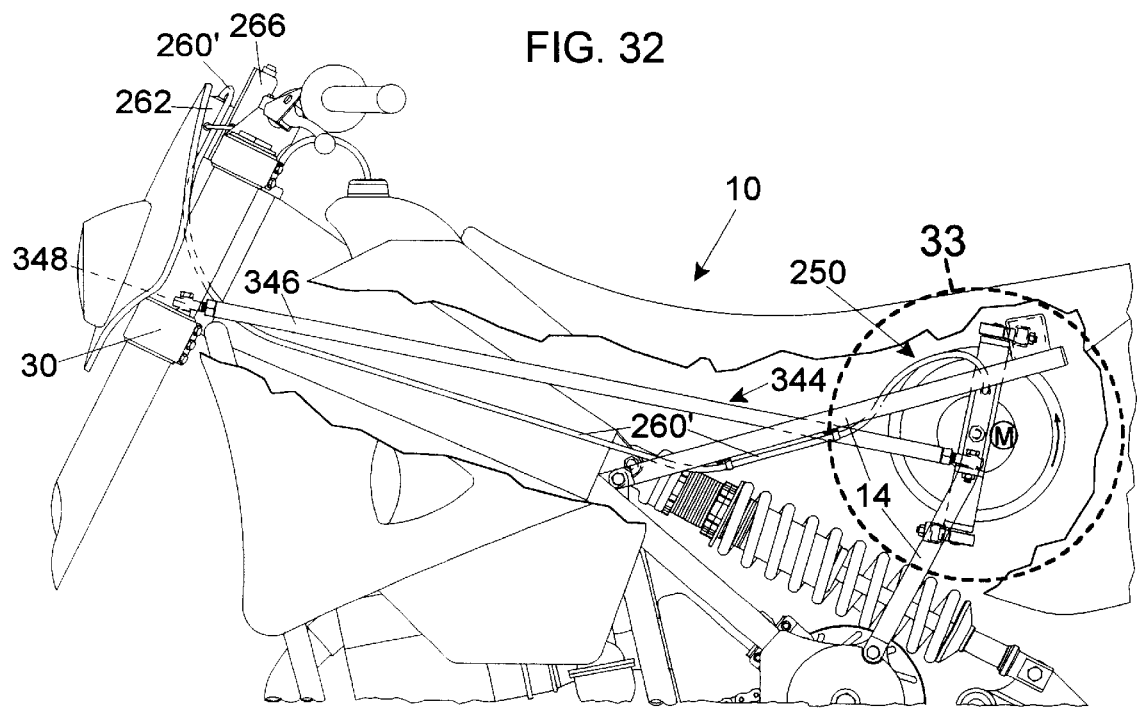
FIG. 32 is a side view of a portion of the snow cycle of FIG. 1 with an alternate embodiment of the gyroscopic stabilizer and steering aid. This view illustrates an electric motor driven gyroscope mounted in a rotatable gyroscope carriage suspended rearward in the snow cycle frame. For clarity of illustration, this view is shown with the gyroscope covers removed and portions of the snow cycle body, saddle, and gas tank cut away.
Figure 33:
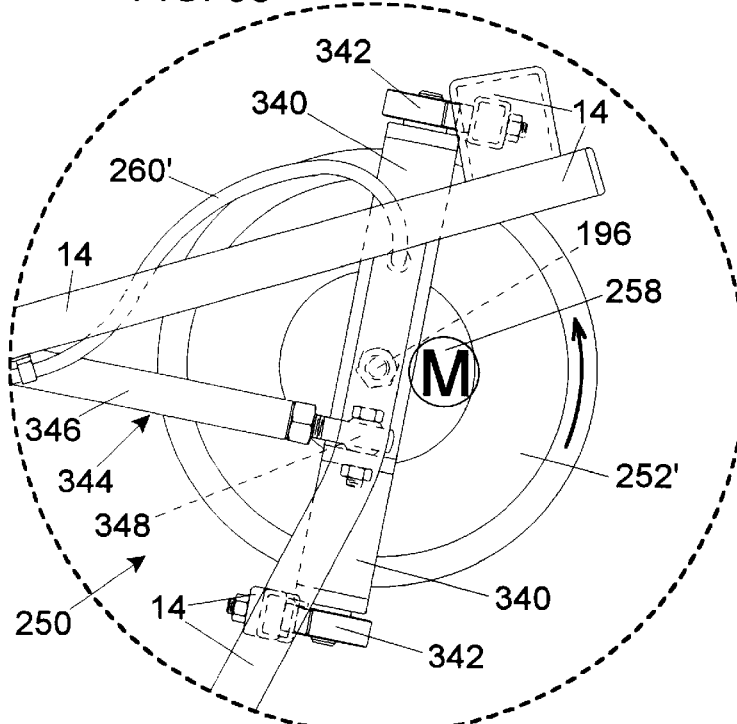
FIG. 33 is an enlarged side partial view of the gyroscopic stabilizer and steering aid of FIG. 32.

FIGS. 32 and 33 illustrate an alternate embodiment for stabilizer 250 that mounts a gyroscope 252' separate from steering fork 12 and extension frame 192. In this embodiment, gyroscope 252' spins on a gyro axle 196' that is mounted within a gyroscope carriage 340. Gyroscope 252' spins in a rotational direction indicated by the curved arrow shown on the side of gyroscope 252' in FIG. 33. Gyroscope carriage 340 is suspended in a pair of bearings 342 that attach to main frame 14. Bearings 342 allow gyroscope carriage 340 to pivot on the axis of rotation of bearings 342. A connecting rod 344 is made up of a shaft 346 and a rod end 348 at each end. The rearward end of connecting rod 344 is attached at one end to the side of gyroscope carriage 340 off-axis from the axis of rotation of the gyroscope carriage. The forward end of connecting rod 344 is attached to lower triple clamp 30 off-axis from the steering axis of rotation of steering fork 12. Connecting rod 344 couples steering and stabilization torques between steering fork 12 and gyroscope carriage 340. Electric motor 258 spins gyroscope 252' and is powered by electrical current delivered through wiring cable 260' from controller 262.

SNOW CYCLE OPERATION

In operation and referring to FIG. 1, snow cycle 10 is suspended and cushioned on ski 204 by telescoping steering fork 12, and on track carriage 86 by the combination of swing arm 64, shock absorber 68, bell crank 72, connecting rod 98 and suspension frame 90. The pivot connections of swing arm 64 to main frame 14 and to the back of track carriage 86 allow track carriage 86 to move up and down as the swing arm rotates in an arc around swing arm pivot axle 60. The pivot connection of track carriage 86 to swing arm 64 allows track carriage 86 to pivot vertically relative to the rearward end of swing arm 64. The combined motion of the swing arm and the track carriage allows the track carriage to remain level throughout the full range of track suspension travel and to incline or decline to maintain tractional contact with the terrain that snow cycle 10 is traversing over. Within practical limits, track carriage 86 is designed to minimize the size and mass of track 138 while maximizing the area of tractional contact between track 138 and the snow. This is accomplished by implementing a substantially fixed path for track 138 around drive cogwheels 122, guide wheels 126, idler wheels 134, and slide runners 116 as illustrated in FIG. 6. The diameters of drive cogwheels 122 and guide wheels 126 are selected to be substantially minimized, but not so small as to cause large power losses due to the flexing of track 138 as it moves around drive cogwheels 122 and guide wheels 126. As shown in FIGS. 7–10, the central structural member of track carriage frame 112 is, preferably, fabricated from thin-walled aluminum tubing having an elliptical cross-section, or some other similarly strong shaped light weight material that provides adequate torsional rigidity for track carriage 86 with a high torsional stiffness to weight ratio. This torsional rigidity minimizes the twisting of track carriage 86 when one side of track 138 is more heavily loaded than the other as occurs when the snow cycle is banked in turns or is traversing sloped terrain. Minimizing the twisting of track carriage 86 is desirable to minimize side-slippage of snow cycle 10, to improve directional stability of the snow cycle, and to maintain proper tension in track 138.

It is desirable to have the axis of the pivot connection between track carriage 86 and swing arm 64 congruent with the axis of rotation of cogwheel axle 88, and to have the axis of rotation of intermediate hub 66 congruent with the axis of the pivot between swing arm 64 and main frame 14. These congruent axes allow track carriage 86 and swing arm 64 to move through the full range of suspension travel while keeping the length of secondary drive chain 188 relatively constant. This eliminates the need for a dynamic chain tensioner for secondary drive chain 188, and reduces the transient stresses that could load chain 188 due to suspension movement of the track carriage and swing arm. The congruency of the axes of rotation with the suspension pivot axes could be approximate, or substantially congruent, where the center of rotation of cogwheel axle 88 is within, for example, 100 mm of the axis of the pivot connection between track carriage 86 and swing arm 64. Intermediate hub 66 could be mounted with an axis of rotation substantially congruent, within 100 mm for example, with the pivot axis of the attachment of swing arm 64 to mainframe 14.

Referring to FIG. 5, shock absorber 68 provides damped spring force between vehicle main frame 14 and first arm pivot 78 of bell crank 72. This suspension and cushioning force is geometrically distributed in predetermined proportion by bell crank 72 to the back of track carriage 86 through swing arm 64 and to the front of track carriage 86 through connecting rod 98 and suspension frame 90. The force from shock absorber 68 urges swing arm 64 rotatingly downward around swing arm pivot 60, thereby urging the back of track carriage 86 downward. The force from shock absorber 68 simultaneously urges bell crank 72 rotatingly downward around bell crank fulcrum pivot 74 on swing arm suspension mount 76, thereby urging the front of track carriage 86 downward through connecting rod 98 and suspension frame 90. The relative proportion of shock absorber cushioning force distributed to the back and to the front of track carriage 86 is determined by the dimensions, geometries and geometrical relationships of the components of the track carriage suspension. These dimensions, geometries and geometrical relationships include the relative spacing and positioning of swing arm pivot axle 60 and frame suspension mount 70 on main frame 14, the location of swing arm suspension mount 76 on swing arm 64, the lengths of and separation angle between the arms of bell crank 72, the length of connecting rod 98, and the location of pivot connections 96 on track carriage suspension frame 90. These same geometries and dimensions also determine the rates at which the suspension forces distributed to the back and the front of track carriage 86 increase as gravitational and inertial forces from the snow cycle and operator increasingly load track carriage 86, compressing shock absorber 68. To optimize the snow cycle's suspension performance and/or operator comfort, different proportions and rates of suspension force distribution to the back and front of track carriage 86 can be achieved by altering the geometrical and dimensional designs of thecomponents of the track carriage suspension. To a more limited degree, the track carriage suspension characteristics can be modified by adjusting the length of connecting rod 98, repositioning connecting rod 98 in bell crank second arm pivot connections 80 and pivot connections 96 of suspension frame 90, and/or by adjusting the preload spring compression of shock absorber 68. For example, a suspension force distribution causing surface pressures between track 138 and the snow at the back of track carriage 86 that are fifty percent higher than surface pressures at the front of track carriage 86 could be set up. This would be desirable to enable track 138 to progressively compact the snow as track carriage 86 moves over it, thereby enhancing the traction of track 138 upon the snow. It is believed that such lighter loading of the front of track 138 and snow compacting ramp 166 allows the snow compacting ramp and the track to more easily and quickly plane up onto the surface of soft snow. Other track loading distributions and track suspension characteristics may be desired for other operational suspension and traction characteristics, and can be accomplished through modifications to the component adjustments and geometrical designs.

It is desirable to minimize the mass of the snow cycle components that are not cushioned upon the track carriage by the track suspension. Uncushioned mass borne by the track carriage is subject to much higher acceleration forces due to impacts between track 138 and the terrain obstacles and undulations that the track encounters. The higher acceleration forces resulting from additional uncushioned mass must be borne by the idler wheels, idler wheel bearings, and slide runners. The life and reliability of these components are thus adversely affected. The track suspension embodiments of FIGS. 1–5 and 16 are desirable since only one shock absorber is required and the majority of the mass of the shock absorber and the bell crank are borne by the snow cycle main frame and the upper portion of the swing arm. The mass of these components is cushioned upon the track carriage by the track suspension.

For the single shock absorber and force-distributing bell crank embodiments of FIG. 16 and 17, the operation, performance, and adjustability of the suspension characteristics are practically identical to those described for the embodiment of the single shock absorber and force-distributing bell crank embodiment illustrated in FIGS. 1–5. The embodiment illustrated in FIG. 17 is less desirable since the mass of shock absorber 68 and bellcrank 72" is carried by track carriage 86 and the rear of swing arm 64", and is practically uncushioned mass.

The two shock absorber track carriage suspension illustrated in FIG. 18 differs somewhat in operation and performance from the single shock absorber/force-distributing bell crank/connecting rod embodiments of FIGS. 1–5, FIG. 16, and FIG. 17 in that the track carriage does not incline and decline as freely to follow terrain undulations. While the track carriage can incline and decline relative to the longitudinal axis of the snow cycle to maintain tractional contact with the snow, this is resisted by the spring and damper of second shock absorber 69. This embodiment places second shock absorber 69 between track carriage 86 and the lower-rear portion of swing arm 64, and so the mass of second shock absorber 69 is practically uncushioned.

The single shock absorber track suspension embodiment shown in FIG. 19 is perhaps the simplest of the embodiments herein described. This embodiment lacks some of the desirable suspension adjustment features of the track suspension embodiments shown in FIGS. 1–5, FIG. 16, and FIG. 17. To provide a comparable range of track suspension travel, shock absorber 68' must be substantially longer and have a substantially longer stroke than shock absorber 68 of the embodiments of FIGS. 1–5, FIG. 16, and FIG. 17.

Referring to FIGS. 2 and 13, as snow cycle 10 moves forward, ramp 166 slides over and compresses the snow ahead of track 138 to a height about equal to the front of the lower run of track 138. This prevents the snow from packing up in front of track 138, and begins the snow compacting process that is continued beneath the track. It is expected that this progressive compacting of the snow will pack the snowflakes and granules into a morecohesive mass beneath the track, thereby allowing the traction forces from the track to be more efficiently distributed to a greater mass of snow. As facilitated by ramp pivot links 170, ramp assembly 162 can incline or decline and translate back and forth relative to main frame 14. The pivot connection of ramp frame 164 to guide wheel axle 130 allows ramp assembly 162 to incline and decline relative to track carriage 86. This snow compacting ramp configuration allows track carriage 86 to move through the entire range of travel of the track suspension while holding the lower rear of ramp 166 in desired proximity to the forward end of the lower run of track 138. In this way, a snow compacting ramp having an adequately large ramp can be deployed in the limited space between the lower extremity of main frame 14 and the snow while allowing the full range of suspension motion of track carriage 86.

Figure 47:
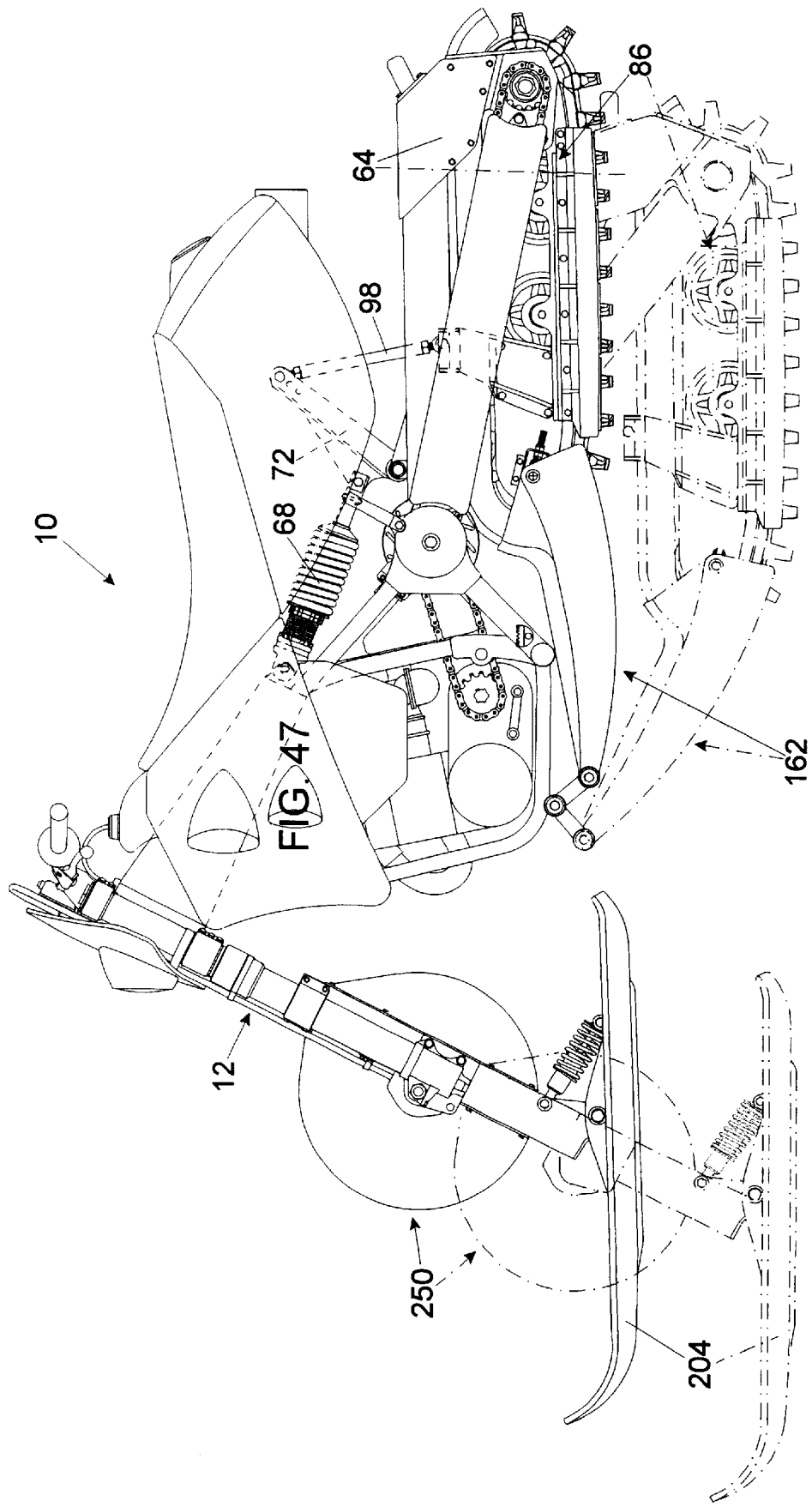
FIG. 47 is a side view of the snow cycle of FIG. 1 with the shock absorber and telescoping steering fork maximally loaded and compressed as would occur in high G-force loading of the snow cycle track suspension and telescoping steering fork. The unloaded, uncompressed positions of the track carriage, snow compacting ramp assembly, ski, extension frame and other associated components are illustrated using phantom lines.

FIG. 47 illustrates the full ranges of vertical motion of the track carriage suspension and the front ski suspension of snow cycle 10. FIG. 47 is a side view of the snow cycle of FIG. 1 with shock absorber 68 and telescoping steering fork 12 maximally loaded and compressed as would occur in high G-force loading of the snow cycle track suspension and telescoping steering fork. The unloaded suspension positions of track carriage 86, swing arm 64, snow compacting ramp assembly 162, ski 204, extension frame 192 and other associated components are illustrated using phantom lines.

Referring now to FIG. 12, track 138 is fabricated with traction paddles 142 that have blunt paddle tips 144 with laterally-convex profiles and stiff traction paddle blocks 146 with side surfaces 145. Paddle webs 148 extend between selected traction paddle blocks to form propulsion and braking snow traction surfaces. Blocks 146 strengthen the paddles and help prevent them from flexing excessively during extreme snow cycle acceleration and braking, thereby helping to maintain traction. Side surfaces 145 of blocks 146 dig in and press laterally against the snow to minimize side-slippage when the snow cycle is leaned in cornering or is traversing steep slopes. Reduced-height web sections 149 are deployed between selected blocks of traction paddles 142*a* and 142*b*. The openings created by these reduced height web sections increase the exposed area of side surfaces 145 of blocks 146 adjacent to reduced height web sections 149. This is intended to improve the track's resistance to side-slippage.

Figure 43:
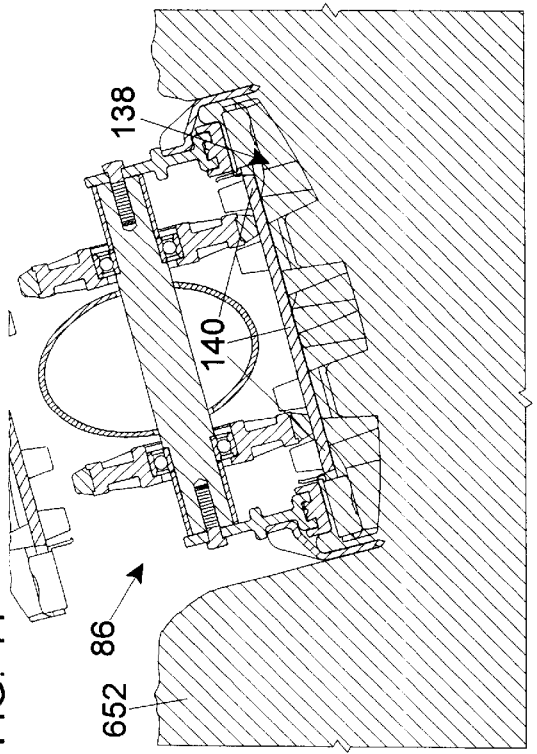
FIG. 43 is a sectional view of the track carriage and track of the snow cycle of FIG. 1, illustrating a banked turn on ice.

Blunt paddle tips 144 of traction paddles 142 cannot penetrate the surface of ice or very hard packed snow, and blunt paddle tips 144 bear the weight of the snow cycle on such hard surfaces. FIG. 43 illustrates this in a vertical sectional view of track carriage 86 and track 138 with snow cycle 10 banked on an ice surface 650. Various portions of the blunt paddle tips 144 contact the ice as the operator leans snow cycle 10 to differing angles. The convex curvature of blunt paddle tips 144 allows the operator to lean snow cycle 10 smoothly from side to side on hard surfaces such as ice or hard packed snow to keep snow cycle 10 in balance during turning of the snow cycle. The curved lateral profile of a motorcycle tire allows the motorcycle to be smoothly leaned from side to side in turning in much the same way. When snow cycle 10 is leaned more than about 14 degrees, for example and illustrated in FIG. 43, ice runners 160 cut and dig into the ice or hardpack snow surface. This helps inhibit side slipping of the snow cycle upon such a slippery surface.

Figure 44:
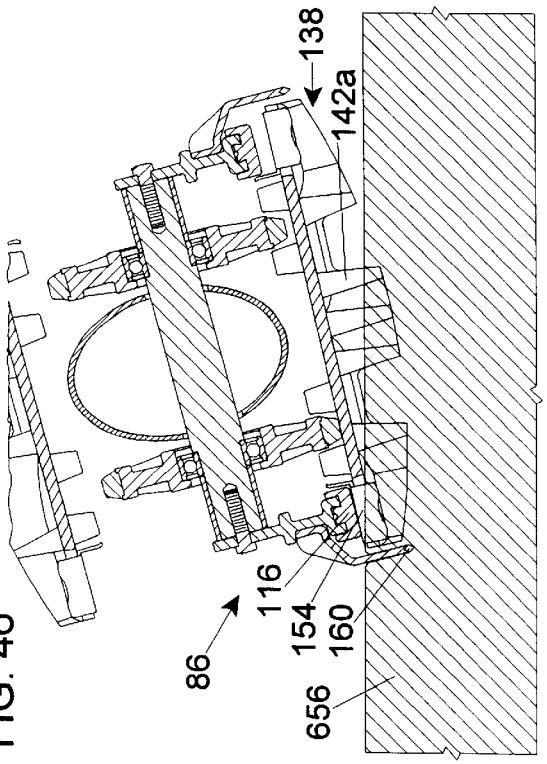
FIG. 44 is a sectional view of the track carriage and track of the snow cycle of FIG. 1, illustrating a banked turn in soft or powder snow.

FIG. 44 is a vertical sectional view of track carriage 86 and track 138 with snow cycle 10 banked on a soft powder snowbase 652. In soft or powder snow, the entire width and length of track 138 penetrate the snow surface and compress the soft snow. In soft snow, the majority of the weight borne by track 138 is distributed across the flat portions of track belt 140 between traction paddles 142. Even though track belt 140 is flat, it is expected the compressibility of soft snow will allow snow cycle 10 to be easily leaned and banked.

Figure 45:
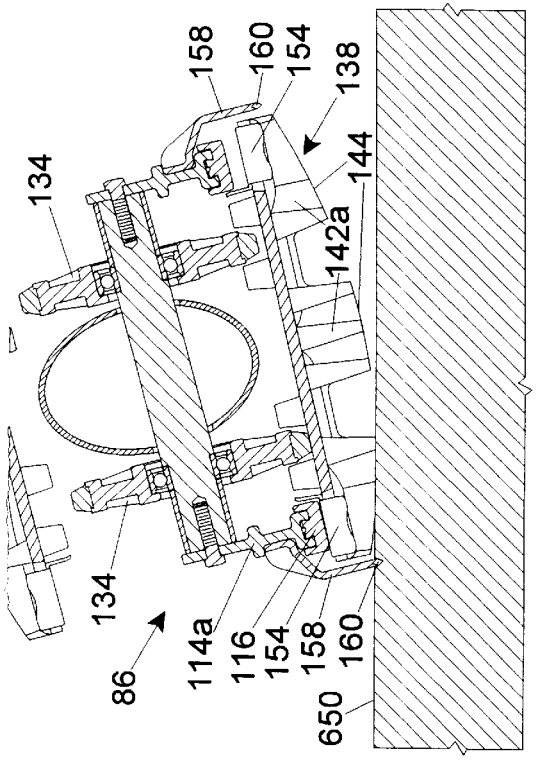
FIG. 45 is a sectional view of the track carriage and track of the snow cycle of FIG. 1, illustrating a banked turn on a hard-pack snow surface.

FIG. 45 shows a vertical sectional view of track carriage 86 and track 138 with snow cycle 10 banked on a densely-packed snowbase 654. Traction paddles 142 penetrate the surface of densely-packed snow and compress the snow under blunt paddle tips 144 only to the depth where the compressed snow beneath the blunt paddle tips supports the weight of snow cycle 10 and the operator. As shown in FIG. 12, traction paddles 142 have more of blocks 146 near the center of track 138 than at the edges of track 138. Additionally, the paddle blocks near the center of track 138 have larger tip areas than those near the edges of track 138. Because of this, the paddle blocks near the center of track 138 penetrate and compress densely-packed snow to a lesser depth than do the sparser and smaller blocks nearer the edges of track 138. These features enable the operator to more easily lean and balance snow cycle 10 in moderately dense snow conditions.

Figure 46:
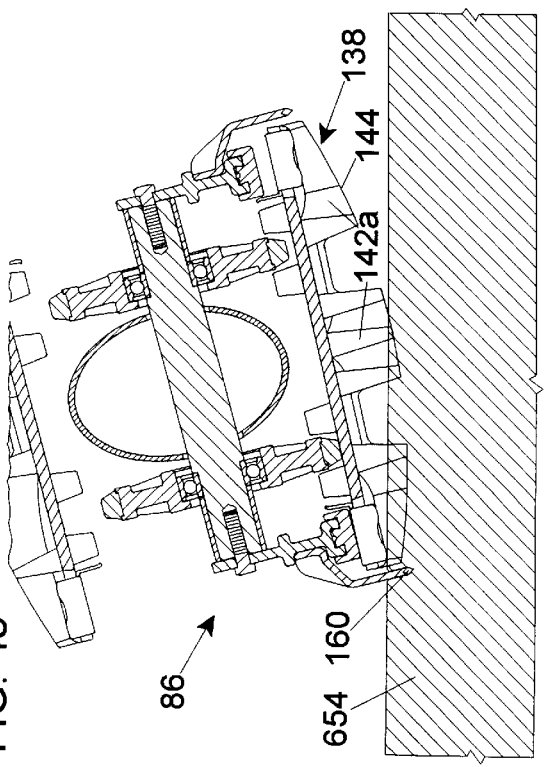
FIG. 46 is a sectional view of the track carriage and track of the snow cycle of FIG. 1, illustrating a banked turn on moderately packed snow.

Refer now to FIG. 46 that illustrates a vertical sectional view of track carriage 86 and track 138 with snow cycle 10 banked upon a moderately packed snowbase 656. A multitude of track belt openings 155 (visible in FIG. 12) between slide bearing clips 154 allow the end portions of traction paddles 142 adjacent track belt openings 155 and slide bearing clips 154 to penetrate the snow to the extent that slide bearing clips 154 on the low side of track 138 are below the surface of the snow. The rearward and forward sides of slide bearing clips 154 function as additional snow traction surfaces in moderately packed and soft snow conditions. Track belt openings 155 also allow snow flakes and ice granules to be introduced between slide bearing clips 154 and slide runners 116 as a lubricant between the bearing surfaces of the slide bearing clips and the slide runners.

As illustrated in FIGS. 43, 45 and 46, ice runners 160 cut into ice, hard packed snow and moderately dense snow to help minimize side slippage of the snow cycle during extreme banking.

Referring generally to FIGS. 20–33, gyroscopic stabilizer and steering aid 250 is mounted so as to orient gyroscope 252 to spin in a nominally upright plane aligned substantially with the vertical axis of snow cycle 10 and with the steered direction of ski 204. Gyro axle 196 is mounted or coupled to steering fork 12. The Gyroscope can also be mounted in a rotatable gyroscope carriage as illustrated, for example, in FIGS. 32–33. This separate mounting of the gyroscope requires that steering torque be coupled between the gyroscope carriage and the steering fork using, for example, connecting rod 344. The gyroscopic stabilizing effect produced by stabilizer 250 occurs when snow cycle 10 is moving forward and becomes tipped sideways out of balance. This sideways tipping of snow cycle 10 also tips gyroscope 252 sideways, and causes the gyroscope to generate a gyroscopic response torque that is perpendicular to the lengthwise axis of snow cycle 10 around which the snow cycle is tipping. This response torque is transferred through gyro axle 196 and is coupled to steering fork 12 and to ski 204. The gyroscope response torque is substantially proportional to the rotational moment of inertia of gyroscope 252, the rotational velocity (RPM) of gyroscope 252, and the angular velocity with which snow cycle 10 is tipping out of balance. The gyroscope response torque coupled to steering fork 12 and ski 240 urges the steering fork and ski to turn on the steering axis of steering fork 12 toward the direction that snow cycle 10 is tipping. The forward motion of snow cycle 10 then causes the ski to steer back under the center of gravity of snow cycle 10, tending to bring snow cycle 10 again upright and in balance. This re-balancing response generated by gyroscope 252 and coupled to ski 204 is instantaneous and independent of operator response, making snow cycle 10 easier to balance.

The steering aid benefit of stabilizer 250 results from this same gyroscopic response force by enabling the snow cycle operator to steer snow cycle 10 by intentionally tipping or leaning snow cycle 10 out of balance. This is accomplished by the operator placing more of his or her weight on footrest 28a or 28b that is on the side of the desired direction of the turn, or by pressing the operators lower torso sideways against snow cycle 10 in the direction of the desired turn. The resulting gyroscopic force from gyroscope 252 forces ski 204 to turn in the intended direction without the operator applying steering force to handlebar 38. These steering dynamics are an inherent aspect of motorcycle and bicycle operation. It is desirable to emulate these balance and steering dynamics in snow cycle 10 to make its operation seem natural and intuitive to an experienced motorcycle or bicycle rider.

Gyroscope 252 is propelled to a rotational velocity in approximate predetermined proportion to the speed of snow cycle 10 or to another predetermined rotational velocity to provide desired gyroscopic vehicle steering control and balancing characteristics.

One gyroscope constant-speed option using an electric motor and controller to spin the gyroscope is shown in FIG. 25. The rotational speed of motor 258 is controlled to a set speed that is proportional to the setting position of speed set knob 270. Speed set knob 270 turns a potentiometer (not visible) enclosed in control box 266. The potentiometer supplies a d-c signal voltage that is proportional to the setting of speed set knob 270 through control cable 268 to controller 262. Controller 262 generates a pulse width modulated voltage having an on/off duty cycle that is in substantial proportion to the setting of speed set knob 270, and transmits the pulse-width modulated voltage through wiring cable 260 to electric motor 258. Motor 258 is thereby powered to spin at a rotational velocity that is substantially proportional to the setting of speed set knob 270.

Figure 27:
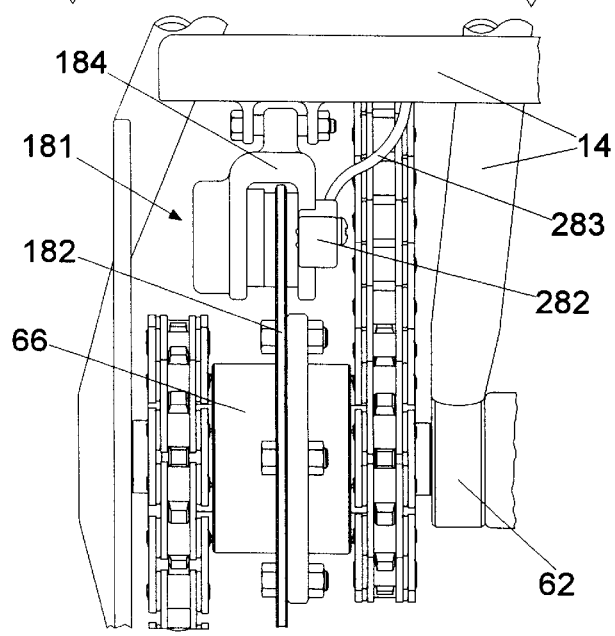
FIG. 27 is a top rear view of the intermediate hub and disc brake showing the electronic tachometer.

An electric motor speed control option that controls the gyroscope's rotational speed to be substantially proportional to the speed of snow cycle 10 is additionally illustrated in FIGS. 26 and 27. The control system includes electronic tachometer 282, servo input circuit 284 enclosed in control box 266, and controller 262. Electronic tachometer 282 is mounted to brake caliper 184 adjacent to brake disk 182 and senses the rotational speed of intermediate hub 66 by detecting the slotted holes dispersed radially on brake disc 182, thereby sensing the speed of the drive train of snow cycle 10. Electronic tachometer 282 supplies tachometer signal 288 to servo input circuit 284. Tachometer signal 288 has a pulse frequency proportional to the rotational speed of intermediate hub 66. Servo input circuit 284, represented by the circuit block diagram of FIG. 26, is housed in control box 266, and converts tachometer signal 288 to low frequency voltage signal 294. A one-shot 290 in servo input circuit 284 converts tachometer signal 288 into a pulse train 292. Pulse train 292 consists of electrical pulses of the same frequency as tachometer signal 288, but having pulse-widths that are determined by the adjustment of gain potentiometer 286. A low-pass filter 296 converts pulse train 292 to low frequency voltage signal 294. Voltage signal 294 has a varying voltage that is in substantial proportion to the rotational speed of intermediate hub 66, and ranges from approximately 0.5 volts when intermediate hub 66 is not spinning to about 4 volts when intermediate hub 66 is rotating at the maximum desired speed. Voltage signal 294 is transmitted through control cable 268 to controller 262. Controller 262 supplies motor 258 with a pulse-width modulated voltage having an on/off duty cycle substantially proportional to the voltage of voltage signal 294. Motor 258 causes gyroscope 252 to accelerate and spin at a rotational speed that is substantially in proportion to the on/off duty cycle of the pulse width modulation voltage supplied to electric motor 258. Gyroscope 252 is thereby driven by motor 258 to a rotational velocity that is substantially proportional to the speed of snow cycle 10.

Programmable servo control circuits could be used to more optimally control the rotational velocity of gyroscope 252. Such a control circuit might include tachometer sensors that sense both the snow cycle drive train speed and the rotational velocity of gyroscope 252. A microprocessor controller could be implemented and programmed to monitor both the speed of the gyroscope and the speed of the drive train, and use the present and historical values of these speeds to generate optimal pulse width modulated control voltages and currents for electric motor 258.

An alternate mounting for stabilizer 250 is illustrated in FIGS. 32 and 33 where gyroscope 252' is suspended within main frame 14 in a protected location. Mounting the gyroscope to main frame 14 rather than to extension frame 192 isolates the gyroscope from the impacts and abuse that a gyroscope mounted to extension frame 192 would receive. Gyroscope 252', shown in FIGS. 32–33, can be smaller and spin at a higher speed than the embodiment of gyroscope 252 shown in FIGS. 21–24, 28, and 29 because of the protection from impact and the isolation from physical shock and vibration that the main frame mounting location affords. The mechanical drive option for gyroscope 252 shown in FIGS. 28–31 spins gyroscope 252 at a rotational velocity that is substantially proportional to the speed of snow cycle 10. Nominally, the ratio of the gyroscope rotational velocity to the speed of intermediate hub 66 is fixed, being determined by the gear ratio of bevel gears 310 and 312 and the gear ratio of bevel gears 318 and 320. Intermediate hub 66 can be accelerated very quickly by gasoline motor 18 and can be decelerated and stopped almost instantaneously by disc brake 181. Because of this, it is desirable that some sort of torque-limiting device be inserted in the flexible shaft drive train between intermediate hub 66 and gyroscope 252 to limit the torque which flexible shaft 316 is required to transmit. Absent such a torque-limiting device, flexible shaft 316 could be subject to torque levels well beyond the practical design limits of the flexible shaft. Such a torque-limiting device could be, for example, viscous coupler 324 illustrated in FIGS. 28, 29 and 31. The viscous fluid that couples torque between viscous coupler disc 328 and gyroscope 252 allows the viscous coupler disc to slip relative to gyroscope 252 with the amount of slippage somewhat proportional to the torque being coupled. Viscous coupler 324 limits the torque that flexible shaft 316 transmits, but may also limit the acceleration and deceleration of gyroscope 252 as snow cycle 10 is accelerated and braked. It is anticipated that such slower acceleration and deceleration of gyroscope 252 would be almost imperceptible to the snow cycle operator, and would be functionally acceptable.

Referring again to FIG. 20, the rear of ski 204 is urged downward around ski pivot axle 208 by ski biasing shock absorber 210, thereby forcing the forward tip of the ski upward, allowing it to more easily plane up onto the surface of the snow. The force from shock absorber 210 also causes ski 204 to incline upward when snow cycle 10 becomes airborne to prevent the tip of ski 204 from burrowing into the snow upon landing. The damping provided by shock absorber 210 helps prevent ski 204 from oscillating around ski pivot axle 208 when the ski is airborne and helps reduce undesirable vibrations and oscillations of ski 204 when it is traversing choppy or uneven snow surfaces. Ski wear runner 212 attached to the bottom center of ski 204 enhances the directional stability of ski 204 and protects it from abrasion.

SNOW BICYCLE STRUCTURE

Figure 34:
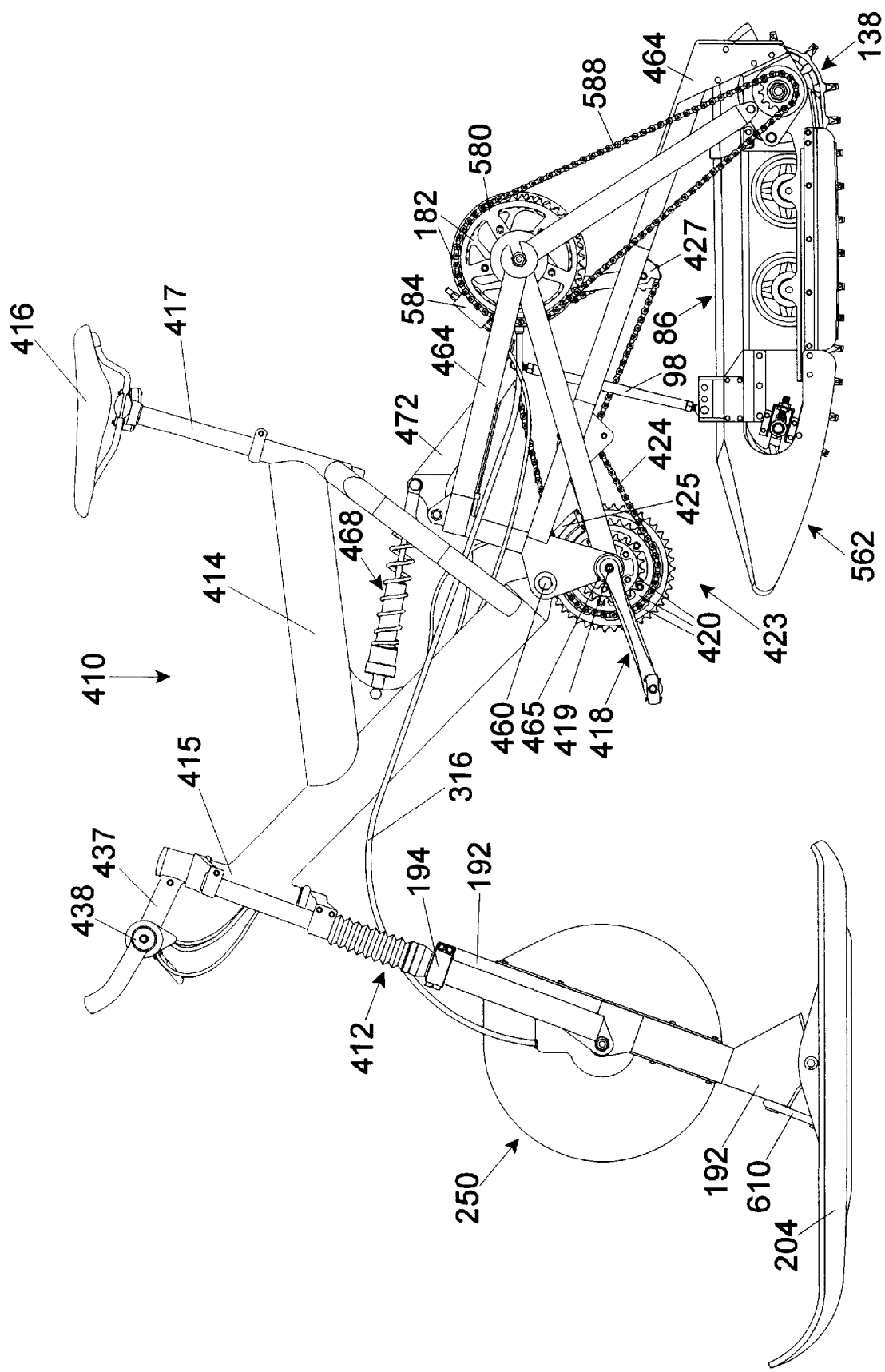
FIG. 34 is a side view of a human-powered snow bicycle according to the present invention.

FIGS. 34–36 illustrate from the side, front, and rear, respectively, a human-powered bicycle-type snow vehicle designated generally by the reference number 410. Snow vehicle 410 is referred to as snow bicycle 410 to differentiate it from motor-powered snow cycle 10. While snow bicycle 410 appears quite different from snow cycle 10, most of the components of snow bicycle 410 that are germane to the present invention are similar in appearance and have the same purpose and function as the corresponding components of snow cycle 10. To avoid redundancy of definition, and to enhance the comparisons of snow bicycle 410 to snow cycle 10, the same reference numbers are used for like components of the snow cycle and snow bicycle embodiments. Where component structure and appearance are significantly different, different reference numbers are used. If the function of a differently-appearing component of snow bicycle 410 is the same as the function of the corresponding component of snow cycle 10, the reference number is exactly 400 greater for the component in the snow bicycle embodiment.

Figure 37:
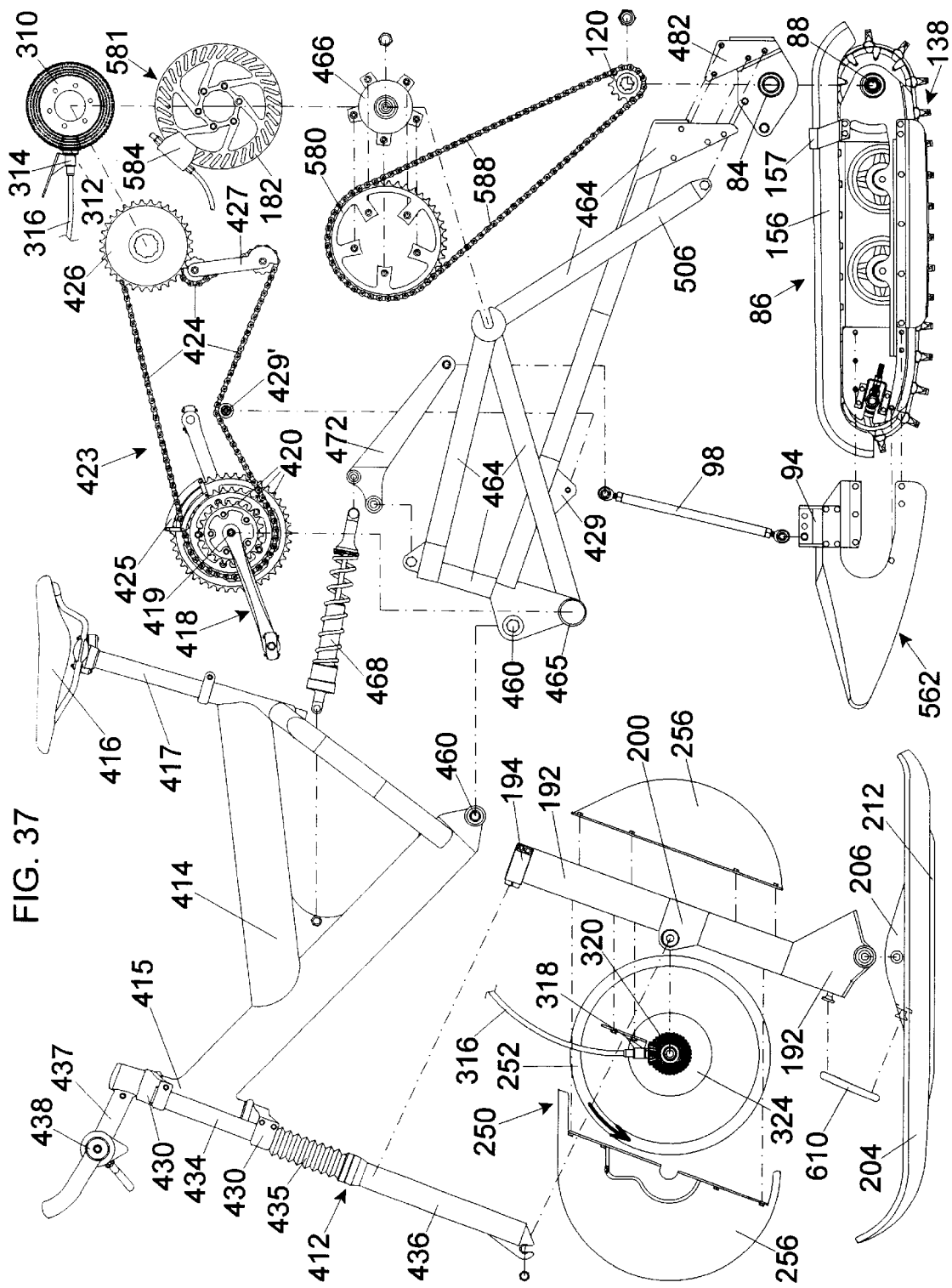
FIG. 37 is an exploded assembly side view of the snow bicycle of FIG. 34.

Snow bicycle 410 may include many of the parts and much of the structure of a typical full-suspension mountain bicycle. Referring also now to FIG. 37, snow bicycle 410 includes a main frame 414 with a steering head tube 415, a saddle 416, a seatpost 417, a pedal crank 418 mounted upon a crank axle 419, a handlebar 438, and a handlebar stem 437. Crank axle 419 rotates within a bottom bracket 465 of a swing arm frame 464. Also included is a bicycle drive train 423 that comprises a primary drive chain 424, a set of chainring sprockets 420 mounted to pedal crank 418, a front chain derailleur 425, a front derailleur shifter 446, a cogset 426, a rear derailleur 427, and a rear derailleur shifter 447. Derailleur shifters 446 and 447 are mounted to handlebar 438 and are visible in FIGS. 35 and 36. All of these components are of the general type and construction used in many mountain bicycles of current manufacture, and perform the same functions as they do in mountain bicycles. Because of this, the structure and operation of these components will not be further described.

Figure 38:
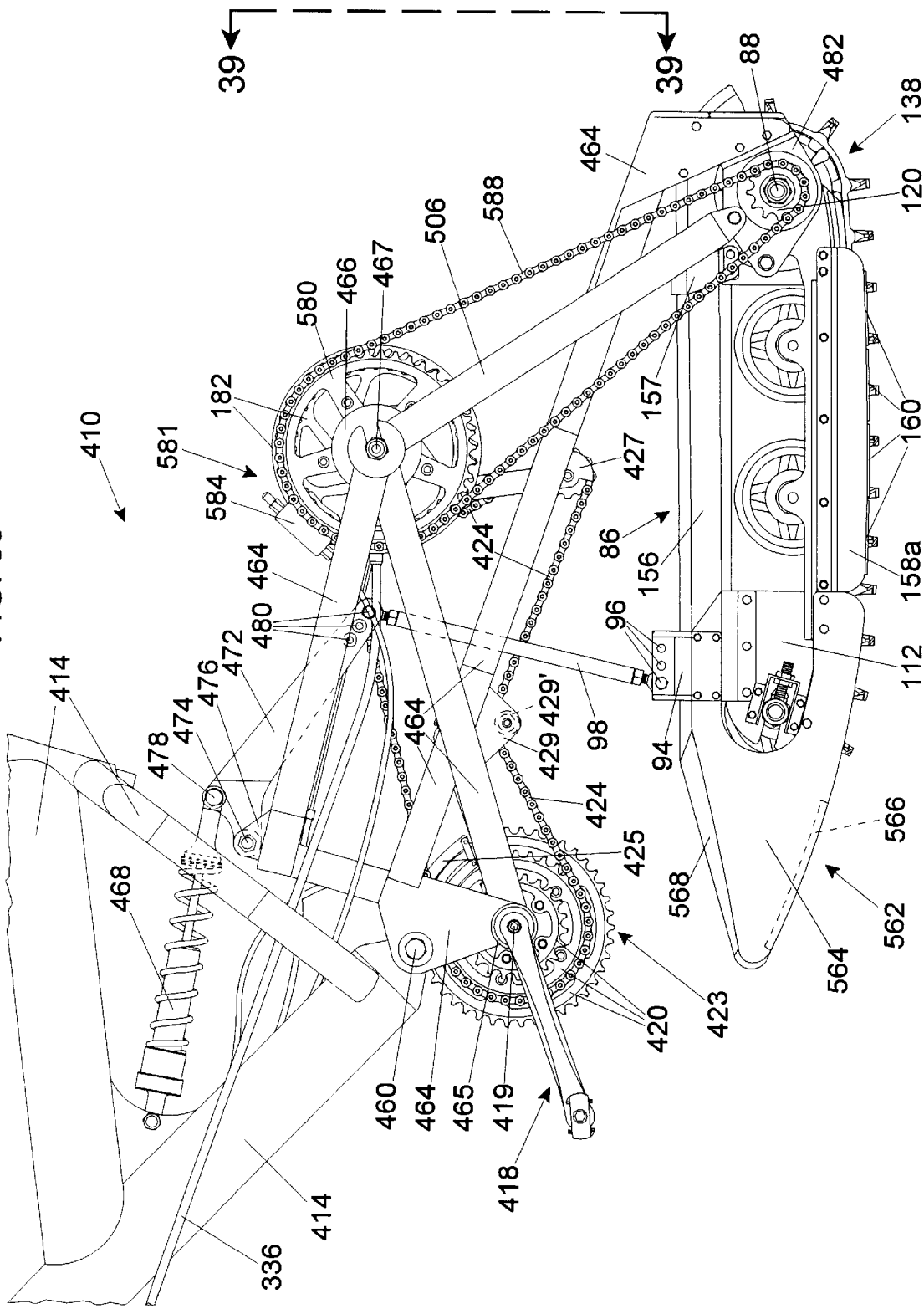
FIG. 38 is an enlarged side view of the rear portion of the snow bicycle of FIG. 34.

In comparing the structure of snow bicycle 410 to that of snow cycle 10, the snow bicycle illustrations of FIGS. 34–38 are comparable with the snow cycle illustrations of FIGS. 1–5, respectively. Swing arm frame 464 of snow bicycle 410 is different in structure but very similar in function to swing arm 64 of snow cycle 10. Swing arm frame 464 is attached to snow bicycle main frame 414 at a swing arm pivot 460. Track carriage 86 is basically the same in structure and function as track carriage 86 of snow cycle 10 illustrated in FIGS. 6–11, differing only in size and in some instances, width to height aspect ratio. Left and right track carriage pivot brackets 482 are slightly different in shape than track carriage pivot brackets 82 of snow cycle 10, but are identical in function. FIGS. 6–11 and the accompanying description of track carriage 86 already presented for snow cycle 10 apply also to the snow bicycle embodiment of track carriage 86. Referring now also to FIG. 38, track carriage pivot brackets 482 attach to swing arm frame 464 and to left and right swing arm braces 506. Cogwheel axle 88 rotates in bearings 84 mounted in pivot brackets 482 and serves as a hinge joint between track carriage 86 and swing arm frame 464. Swing arm frame 464 pivots vertically around swing arm pivot 460 on main frame 414, and track carriage 86 pivots vertically around the connection of cogwheel axle 88 to pivot brackets 482. The resulting scissors-type swing arm structure and pivot connections allow track carriage 86 to move vertically under swing arm frame 464 while maintaining a level orientation, inclining, or declining as needed to keep track 138 in tractional contact with the terrain below snow bicycle 410.

The track carriage suspension for snow bicycle 410 illustrated in FIG. 38 has the same in basic structure and function as the track carriage suspension of snow cycle 10 illustrated in FIG. 5. The descriptions of structure and operation presented for that track carriage suspension also apply conceptually to the track carriage suspension of snow bicycle 410. A shock absorber 468 is pivotally mounted between main frame 414 and a bell crank first arm pivot 478 of a bell crank 472. Bell crank 472 transmits and apportions suspension force from shock absorber 468 through a bell crank fulcrum pivot 474 to a swing arm frame suspension mount 476. The apportioned force urges swing arm frame 464 downward around swingarm pivot 460, forcing the rear portion of track carriage 86 downward. The suspension force from shock absorber 468 also urges bell crank 472 in a clockwise direction (as viewed in FIG. 38) around bell crank fulcrum pivot 474, thereby apportioning and transmitting suspension force through connecting rod 98 to a top bracket 94 mounted to a ramp frame 564 of a snow ramp assembly 562. Ramp frame 564 is attached to track carriage frame 112, and transmits the apportioned suspension force to the front of track carriage 86, urging it downward around the pivot connection on cogwheel axle 88 between pivot brackets 482 and track carriage 86. The suspension force of shock absorber 468 is thus apportioned and distributed to both the rearward and forward ends of track carriage 86 in a predetermined proportion to affect a predetermined loading distribution along the ground-contacting run of track 138. Like snow cycle 10, the length adjustment of connecting rod 98 and alternate pivot mounting locations for connecting rod 98 in a set of bell crank pivot connections 480 and in pivot connections 96 of top bracket 94 allow for limited adjustment of the front-to-rear loading distribution of track 138. Alternate track suspension embodiments already described and illustrated for snow cycle 10, including the four track suspension embodiments illustrated in FIGS. 16–19, are also, with appropriate modification, alternate embodiments of a track suspension for snow bicycle 410.

Referring to FIGS. 37–39, an intermediate hub 466 of snow cycle 410 appears somewhat different from intermediate hub 66 of snow cycle 10 in FIGS. 14 and 15, even though the basic structure and function are very similar. Intermediate hub 466 mounts and rotates on an intermediate hub axle 467 that attaches to the top center portion of swing arm frame 464. Bicycle drive train 423 couples pedal crank 418 to intermediate hub 466 just like a drive train of a common multi-speed bicycle couples the bicycle pedal crank to the rear wheel hub. Primary drive chain 424 of bicycle drive train 423 is routed through a chain hanger 429 that is attached to the underside of swing arm frame 464. A bearing-suspended chain idler wheel 429' is mounted within chain hanger 429, and allows primary drive chain 424 to circulate through the chain hanger with minimal friction.

Figure 41:
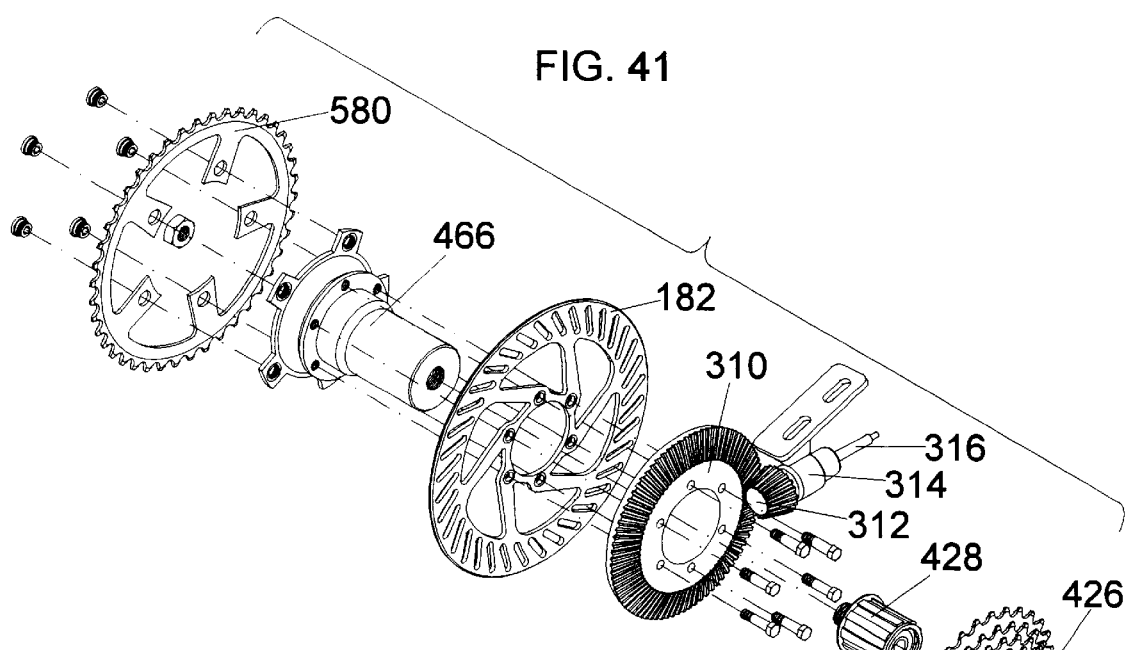
FIG. 41 is an exploded view of the intermediate hub, brake disc, gyroscope driving end bevel gears and chain sprockets of the snow bicycle of FIG. 34.

A disc brake 581 includes brake disc 182 and brake caliper 584, and is best viewed in FIGS. 37 and 39. Brake caliper 584 straddles brake disc 182 and mounts to swing arm frame 464. Brake caliper 584 forces brake pads against the sides of brake disc 182 when the operator actuates a brake lever 448 that is mounted to handlebar 438 (visible in FIGS. 35 and 36). Referring also now to FIG. 41, brake disc 182 attaches concentrically to the mid-portion of intermediate hub 466 and a secondary intermediate sprocket 580 attaches concentrically to the left side of intermediate hub 466. A secondary drive chain 588 wraps secondary intermediate sprocket 580 and cogwheel axle sprocket 120 in an endless loop and transmits drive power and braking torque from intermediate hub 466 to cogwheel axle 88. Primary driving-end bevel gear 310 is concentrically attached to intermediate hub 466 adjacent to brake disc 182.

Snow compacting ramp assembly 562, best viewed in FIGS. 37 and 38, comprises ramp frame 564, a snow compacting ramp 566 secured and a snow coverd ramp frame 564, and a snow cover 568 enclosing the top of ramp frame 564. The side members of ramp frame 564 extend around the forward end of track 138 and attach to the forward sides of track carriage frame 112. Ramp frame 564 holds ramp 566 in a fixed attitude relative to track carriage 86 with the lower rearward end of ramp 566 at approximately the same height as the front of the lower run of track 138. Top bracket 94 bridges over the top of track 138 and track shield 156, attaching to the tops of the rearward side members of ramp frame 564.

Referring now to FIGS. 35–37, the front steering and suspension components of snow bicycle 410 are practically identical in structure and function to those of snow cycle 10. A telescoping steering fork 412 comprising upper and lower triple clamps 430, a head pipe 432 (visible in FIG. 35 only), a pair of fork tubes 434, and a pair of fork sliders 436 has substantially the same external structure and function as telescoping steering fork 12 of snow cycle 1 0. The internal mechanism construction of snow bicycle telescoping steering fork 412 may differ from the internal mechanism construction of snow cycle telescoping steering fork 12. The illustrations of FIGS. 34–37 show steering fork 412 with a pair of optional accordian-stye protector boots 435 enclosing the midsections of fork tubes 434. The combined structure of steering extension frame 192, ski 204 and ski pivot bracket 206 has basically the same structure and function for snow bicycle 410 as the combined structure comprising these components for snow cycle 10 illustrated in FIGS. 1–4. In snow bicycle 410, an elastomeric spring 610 connects between extension frame 192 and the forward portion of ski pivot bracket 206. Elastomeric spring 610 lifts the front of ski 204, just as shock absorber 210 does in snow cycle 10. Elastomeric spring 610 is formed using rubber or other durable elastomer compound.

Gyroscopic stabilizer and steering aid 250 of snow bicycle 410 includes a mechanical drive transmission that is illustrated in FIGS. 39–42, and is very similar to the mechanical-drive gyroscope embodiment of snow cycle 10 shown in FIGS. 28–31. The description given for the structure and operation of the mechanical drive for gyroscope 252 of snow cycle 10 and illustrated in FIGS. 28–31 applies generally to the mechanical drive for gyroscope 252 of snow bicycle 410. Motive power for gyroscope 252 is delivered from intermediate hub 466 through a rotary power transmission that includes primary driving-end bevel gear 310, secondary driving-end bevel gear 312, flexible shaft 316, primary driven-end bevel gear 318, secondary driven-end bevel gear 320, a ratcheting freewheel 330, and a viscous coupler 324'. Referring to FIG. 41, bevel gear 310 attaches concentrically to intermediate hub 466. Bevel gear 312 is held meshed with bevel gear 310 by bearing and bracket 314 that attaches to swing arm frame 464. Referring also now to FIGS. 34, 37 and 40, flexible shaft 316 attaches at one end to bevel gear 312, and attaches at the other end to bevel gear 318. As shown in FIG. 40, bevel gear 318 meshes with bevel gear 320. Referring also to the exploded view of FIG. 42, Gyroscope 252 mounts to gyro hub 254 that rotates upon a gyro axle 196' using gyroscope bearings 253. Bevel gear 320 attaches concentrically to a freewheel pawl assembly 330a of ratcheting freewheel 330. Viscous coupler 324' includes a viscous coupler disc 328', a viscous coupler cover 326, a viscous coupler seal 327 and a suitable viscous fluid (not shown). A toothed freewheel hub 330b of ratcheting freewheel 330 is concentrically attached to viscous coupler disc 328'. Viscous coupler cover 326 attaches to the side of gyroscope 252, compressing viscous coupler seal 327 and sandwiching viscous coupler disc 328' with the suitable viscous fluid between the side of gyroscope 252 and the interior side of the viscous coupler cover. Freewheel pawl assembly 330a rotates upon gyro axle 196' and fits concentrically within toothed freewheel hub 330b so that the ratchet pawls of freewheel pawl assembly 330a engage the ratchet teeth of toothed freewheel hub 330b. Pawl assembly 330a transmits torque from bevel gear 320 to toothed freewheel hub 330b only in the rotational direction indicated by the curved arrow shown adjacent to hub 330b in FIG. 42.

Just as for snow cycle 10, other mechanical power transmission options for transmitting motive power from the drive train of snow bicycle 410 to gyroscope 252 exist and could be used for spinning gyroscope 252 of snow bicycle 410. Gyroscope drive mechanisms that extract motive power from the forward momentum of snow bicycle 410 could also be used to spin gyroscope 252.

SNOW BICYCLE OPERATION

In operation, referring to FIGS. 34–38 and comparing to the corresponding FIGS. 1–5 for snow cycle 10, snow bicycle 410 is very similar in operation to snow cycle 10. The obvious major difference is that snow bicycle 410 is human-powered, and snow cycle 10 is powered by a gasoline motor. Otherwise, the operational description for snow cycle 10 generally applies to snow bicycle 410.

Snow bicycle 410 includes a track suspension that is very similar to the track suspension of snow cycle 10 illustrated in FIGS. 1–5, and features similar structure, functionality, performance characteristics, and adjustability—albeit scaled to the size, weight, and performance requirements of a snow bicycle. Track carriage 86 and track 138 in the embodiment of snow bicycle 410 are identical in structure and function to track carriage 86 and track 138 of snow cycle 10, but are scaled in size and weight as suitable for a human-powered snow bicycle application. Traction paddles 142 of track 138 are proportionately smaller to be suitable to the requirements for snow bicycle use.

Snow compacting ramp assembly 562 of snow bicycle 410 is simpler in structure, lighter, and less costly than articulating snow compacting ramp assembly 162 of snow cycle 10. A non-articulating ramp is used since the vertical suspension travel of track carriage 86 below swing arm frame 464 and main frame 414 of snow bicycle 410 is substantially less than the vertical suspension travel of track carriage 86 below swing arm 64 and main frame 14 of snow cycle 10. It is believed that a smaller and shorter snow compacting ramp is adequate for snow bicycle use. Snow compacting ramp assembly 562 is rigidly attached to track carriage frame 112, and thus moves vertically, inclines, and declines with the suspension movement of track carriage 86. Ramp 566 slides over and compresses the snow ahead of track 138 to a height about equal to the front of the lower run of track 138, preventing snow from packing up in front of track 138.

The bicycle drive train 423 shown in FIGS. 37–39 has the same structure and operation that drive trains of most mountain bicycles of present manufacture have. A wide range of gearing ratios offered by bicycle drive train 423 enables the snow bicycle operator to select a gearing ratio suited to the incline of the terrain and the effort the operator wishes to expend in pedaling the snow bicycle. Chain hanger 429 is deployed to allow the full suspension articulation of track carriage 86 below swing arm frame 464 without interference between primary drive chain 424 and track shield 156. Chain hanger 429 also helps to maintain correct tension in primary drive chain 424 under the jarring that occurs when the snow bicycle traverses rough terrain. Snow bicycle 410 has only one snow traction device, namely track 138, and requires only one brake and brake actuator. A disc brake such as disc brake 581 is desirable to provide strong, reliable braking in snowy, icy and wet conditions.

Steering extension frame 192, ski 204, and ski pivot bracket 206 of snow bicycle 410 are practically identical in structure and operation to steering extension frame 192, ski 204, and ski pivot bracket 206 of snow cycle 10. The size, weight, and strength Of these components is reduced in the snow bicycle embodiment as is acceptable and desirable for a relatively lightweight human-powered vehicle. In snow bicycle 410, elastomeric spring 610 (visible in FIGS. 34 and 37) is used to urge the front of ski 204 upward, allowing it to more easily plane up onto the surface of the snow. The contraction force of elastomeric spring 610 also causes ski 204 to incline when snow bicycle 410 becomes airborne to help prevent the ski tip from burrowing into the snow upon landing.

Figure 42:
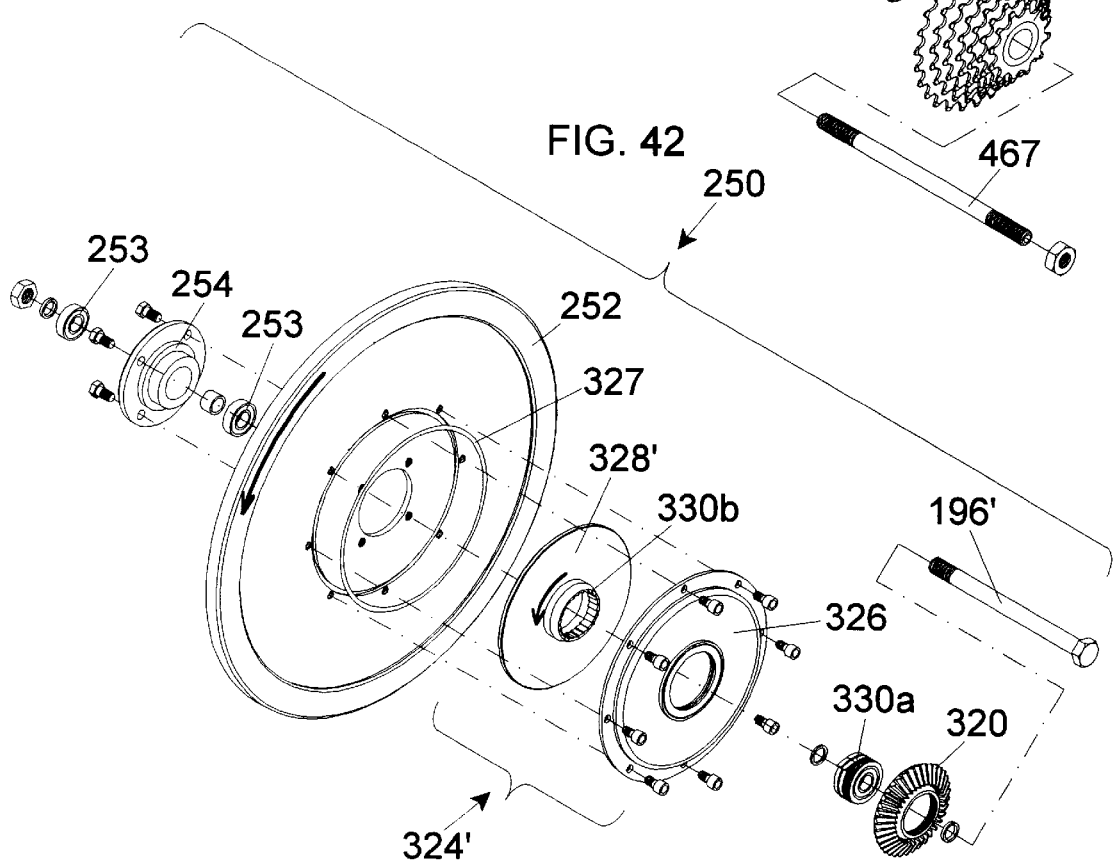
FIG. 42 is an exploded view of the gyroscope, viscous coupler, freewheel, and driven-end bevel gear of the gyroscopic stabilizer and steering aid of the snow bicycle of FIG. 34.

In the snow bicycle embodiment of stabilizer 250 illustrated in FIGS. 39–42, the stabilizer is driven from the snow bicycle drive train. Gyroscope 252 is driven to spin at an RPM, for example, that is nominally twice the RPM of intermediate hub 466. Referring to FIG. 42, freewheel 330 comprising pawl assembly 330a and toothed freewheel 330b is inserted between bevel gear 320 and viscous coupler 324'. Freewheel 330 transmits motive torque to gyroscope 252 only in one rotational direction to accelerate or maintain the rotational velocity of gyroscope 252. When the operator stops pedaling or brakes snow bicycle 410, freewheel 330 allows gyroscope 252 to spin freely and maintain rotational momentum, helping to preserve the energy expended in accelerating the gyroscope. It is particularly important in a human-powered snow bicycle to optimize the energy efficiency of stabilizer 250 to help minimize the effort expended by the human operator in powering both snow bicycle 410 and stabilizer 250. Stabilizer 250 of snow bicycle 410 is smaller and lighter than stabilizer 250 of snow cycle 10 as is adequate and appropriate for snow bicycle use.

The main frames for the snow vehicles described are made of welded metal tubing or some other structurally stable, preferably lightweight, material. Other structural components such as the swing arm, swing arm frame, track carriage frame and the snow compacting ramp frame are made of any suitable structurally stable material and cross section. Further, although only the principal bearings are specifically shown on the drawings and described above, it is desirable to use bearings, bushings and the like on all pivot connections and rotating hubs to reduce wear and facilitate the relative movement of the parts. It is expected that the ski will be manufactured from an ultra-high molecular weight plastic or other suitable structural material offering low friction with the snow, adequate durability, and good resistance to abrasion and wear.

Although the invention has been shown and described with reference to the foregoing embodiments, alternative embodiments may be made without departing from the spirit and scope of the invention as defined in following claims.

What is claimed is:

1. A snow vehicle, comprising:
   a frame;
   a swing arm having a forward portion and a rearward portion, the forward portion of the swing arm pivotally mounted to the frame;
   the swing arm having a swing arm suspension mount positioned along the swing arm;
   a track carriage having a rearward portion and a forward portion, the rearward portion of the track carriage pivotally mounted to the rearward portion of the swing arm;
   a track suspension having a bell crank coupled between the frame and the track carriage, the track suspension operative to cushionablY bias both the rearward portion of the track carriage and the forward portion of the track carriage downward from the frame;
   a drive wheel rotatably mounted to the rearward portion of the track carriage;
   a single endless loop track carried by the track carriage, the track drivingly engaged by and extending forward from the drive wheel; and
   a ski rotatably coupled to the frame.

2. The snow vehicle according to claim 1, wherein the ski is a single ski and the vehicle further comprises an elongated steering member operative to rotate about a steering axis, the steering member having an upper portion connected to the frame and a lower portion mounting the ski.

3. The snow vehicle according to claim 1, wherein the drive wheel has an axis of rotation displaced 100 millimeters or less from a pivot axis of the track carriage at the rearward portion of the swing arm.

4. The snow vehicle according to claim 1, further comprising a motor operatively coupled to the drive wheel.

5. The snow vehicle according to claim 1, further comprising a pedal crank operatively coupled to the drive wheel.

6. The snow vehicle according to claim 1, wherein the drive wheel has an axis of rotation coincident with the pivot axis of the track carriage to the swing arm.

7. The snow vehicle according to claim 1, further comprising a plurality of runners attached to the track carriage, the runners oriented lengthwise along outer edges of the track and extending below a lower surface of the track, the runners configured to engage snow and ice during leaning or tipping of the snow vehicle.

8. The snow vehicle according to claim 1, wherein the track suspension includes a mechanical linkage.

9. The snow vehicle according to claim 1, wherein the track suspension comprises a shock absorber.

10. The snow vehicle according to claim 9, wherein the shock absorber includes a spring.

11. The snow vehicle according to claim 9, wherein the shock absorber includes a hydraulic damper.

12. The snow vehicle according to claim 9, wherein the frame includes a frame suspension mount, the swing arm includes a swing arm suspension mount, and the track carriage includes a track carriage suspension mount at a location away from the location at which the track carriage mounts to the swing arm, the track suspension of the snow vehicle further comprising:
   a connecting rod having a first end and a second end;
   a bell crank having a fulcrum, a first arm and a second arm;
   the first end of the shock absorber pivotally connected to the first arm of the bell crank;
   the first end of the connecting rod pivotally connected to the second arm of the bell crank; and
   the bell crank fulcrum, the second end of the shock absorber, and the second end of the connecting rod each exclusively pivotally connected to one of the frame suspension mount, the swing arm suspension mount, or the track carriage suspension mount.

13. The snow vehicle according to claim 12, wherein the fulcrum of the bell crank connects to the swing arm suspension mount, the second end of the shock absorber connects to the frame suspension mount, and the second end of the connecting rod connects to the track carriage suspension mount.

14. The snow vehicle according to claim 12, wherein the fulcrum of the bell crank connects to the swing arm suspension mount, the second end of the shock absorber connects to the track carriage suspension mount, and the second end of the connecting rod connects to the frame suspension mount.

15. The snow vehicle according to claim 12, wherein the fulcrum of the bell crank connects to the frame suspension mount, the second end of the shock absorber connects to the swing arm suspension mount, and the second end of the connecting rod connects to the track carriage suspension mount.

16. The snow vehicle according to claim 12, wherein the fulcrum of the bell crank connects to the frame suspension mount, the second end of the shock absorber connects to the track carriage suspension mount, and the second end of the connecting rod connects to the swing arm suspension mount.

17. The snow vehicle according to claim 12, wherein the fulcrum of the bell crank connects to the track carriage suspension mount, the second end of the shock absorber connects to the swing arm suspension mount, and the second end of the connecting rod connects to the frame suspension mount.

18. The snow vehicle according to claim 12, wherein the fulcrum of the bell crank connects to the track carriage suspension mount, the second end of the shock absorber connects to the frame suspension mount, and the second end of the connecting rod connects to the swing arm suspension mount.

19. A snow vehicle according to claim 12, wherein the bell crank fulcrum has a pivot axis substantially parallel to a pivot axis of the connection of the shock absorber to the bell crank first arm and a pivot axis of the connection of the connecting rod to the second arm.

20. The snow vehicle according to claim 1, further comprising a snow compacting ramp attached to the track carriage, the ramp positioned forward of the track and inclined upward away from the track.

21. The snow vehicle according to claim 20, wherein the ramp is pivotally attached to the track carriage and the angle of incline between the ramp and the track carriage may vary.

22. The snow vehicle according to claim 20, wherein the ramp has a forward end movably supported by the frame, the ramp simultaneously pivotable and translatable relative to the frame.

23. A snow vehicle, comprising:
a frame;
a ski rotatably coupled to the frame;
a swing arm having an upper end and a lower end, the upper end of the swing arm pivotally mounted to the frame;
the swing arm having a swing arm suspension mount positioned along the swing arm;
a track carriage pivotally mounted to the lower end of the swing arm;
an endless loop track having a lower run beneath the track carriage and an upper run;
the track carriage bearing upon the lower run of the track;
a drive wheel drivingly engaging the track; and
a track suspension comprising a shock absorber, a connecting rod, and a bell crank, the bell crank having a fulcrum, a first arm and a second arm, the bell crank fulcrum attaching pivotally to the swing arm suspension mount, the shock absorber pivotally connected between the bell crank first arm and the frame, and the connecting rod pivotally connected between the bell crank second arm and the track carriage.

24. A snow vehicle, comprising:
a frame;
a ski rotatably coupled to the frame;
a swing arm having an upper end and a lower end, the upper end of the swing arm pivotally mounted to the frame;
the swing arm having a swing arm suspension mount positioned along the swing arm;
a track carriage pivotally mounted to the lower end of the swing arm;
an endless loop track having a lower run beneath the track carriage and an upper run;
the track carriage bearing upon the lower run of the track;
a drive wheel drivingly engaging the track; and
a track suspension comprising a shock absorber, a connecting rod, and a bell crank, the bell crank having a fulcrum, a first arm, and a second arm, the bell crank fulcrum attaching pivotally to the frame, the shock absorber pivotally connected between the bell crank first arm and the swing arm suspension mount;
the connecting rod pivotally connected between the bell crank second arm and the track carriage.

25. A snow vehicle, comprising:
a frame;
a swing arm having a forward portion and a rearward portion, the forward portion of the swing arm pivotally mounted to the frame;
the swing arm having a swing arm suspension mount positioned along the swing arm to pivotally attach a mechanical linkage;
a track carriage having a rearward portion and a forward portion, the rearward portion of the track carriage pivotally mounted to the rearward portion of the swing arm;
a track suspension operative between the frame and the track carriage;
the track suspension having a mechanical linkage pivotally connected to the suspension mount a drive wheel rotatably mounted to the rearward portion of the track carriage, the drive wheel having an axis of rotation that remains substantially parallel to an axis about which the swing arm pivots relative to the frame during all operation of the snow vehicle;
a single endless loop track carried by the track carriage, the track wrapping the drive wheel and drivingly engaged by and extending forward from the drive wheel; and
a ski rotatably coupled to the frame.

26. A snow vehicle, comprising:
a frame;
a ski rotatably coupled to the frame;
a swing arm having an upper end and a lower end, the upper end of the swing arm pivotally mounted to the frame;
the swing arm having a swing arm suspension mount positioned along the swing arm;
a track carriage pivotally mounted to the lower end of the swing arm;
an endless loop track having a lower run beneath the track carriage and an upper run;
the track carriage bearing upon the lower run of the track;
a drive wheel drivingly engaging the track; and
a track suspension comprising a shock absorber, a connecting rod, and a bell crank, the bell crank having a fulcrum, a first arm and a second arm, the bell crank fulcrum mounted pivotally to the swing arm suspension mount, the shock absorber pivotally connected between the bell crank first arm and the track carriage, and the connecting rod pivotally connected between the bell crank second arm and the frame.

27. A snow vehicle, comprising:
a frame and body, including a motor and an elongated steering member rotatable mounted to the frame;
a ski mounted to a lower end of the elongated steering member;
a track carriage with a front and a rear, the track carriage having at least one rotatable drive wheel coupled to the motor and at least one rotatable guide wheel, the drive wheel positioned at the rear of the track carriage and the guide wheel positioned at the front of the track carriage;
a swing arm having a forward end and a rearward end, the forward end pivotally connected to the frame and the rearward end pivotally connected to the rear of the track carriage within 100 millimeters of the axis of rotation of the drive wheel;
the swing arm having a swing arm suspension mount positioned along the swing arm;
a track suspension operative between the frame and the track carriage to cushionably support the frame upon the track carriage, the track suspension allowing the track carriage to move in a scissors fashion under the swing arm and the suspension mount; between the frame and both the front of the track carriage and the rear of the track carriage; and
a single endless loop track wrapping the guide wheel and the drive wheel, the track supported on the track carriage for rotation thereabout at the urging of the drive wheel.

28. The snow vehicle according to claim 27, further comprising a gyroscope rotatably mounted to the elongated steering member.

29. The snow vehicle according to claim 27, further comprising a snow compacting ramp attached to the track carriage, the ramp positioned forward of the track and inclined upward away from the track.

30. The snow vehicle according to claim 27, further comprising a plurality of runners attached to the track carriage, the runners oriented lengthwise along outer edges of the track and extending below a lower surface of the track, the runners configured to engage snow and ice during leaning or tipping of the snow vehicle.

31. A snow vehicle according to claim 27, wherein the elongated steering member is a suspension fork.

32. A snow vehicle, comprising:
- a frame, including an elongated steering member and a pedal crank;
- a ski mounted to a lower end of the elongated steering member;
- a track carriage with a front and a rear, the track carriage having at least one rotatable drive wheel coupled to the pedal crank and at least one rotatable guide wheel, the drive wheel positioned at the rear of the track carriage and the guide wheel positioned at the front of the track carriage;
- a swing arm having a forward end and a rearward end, the forward end pivotally connected to the frame and the rearward end pivotally connected to the rear of the track carriage within 100 millimeters of the axis of rotation of the drive wheel;
- the swing arm having a swing arm suspension mount positioned along the swing arm to pivotally attach a mechanical linkage;
- a track suspension operative between the frame and the track carriage to cushionably support the frame upon the track carriage, the track suspension allowing the track carriage to move in a scissors fashion under the swing arm and the suspension mount; between the frame and both the front and the rear of the track carriage; and
- a single endless loop track wrapping the guide wheel and the drive wheel, the track supported on the track carriage for rotation thereabout at the urging of the drive wheel.

33. The snow vehicle according to claim 32, further comprising a gyroscope rotatably mounted to the elongated steering member.

34. The snow vehicle according to claim 32, further comprising a snow compacting ramp attached to the track carriage, the ramp positioned forward of the track and inclined upward away from the track.

35. The snow vehicle according to claim 32, further comprising a plurality of runners attached to the track carriage, the runners oriented lengthwise along outer edges of the track and extending below a lower surface of the track, the runners configured to engage snow and ice during leaning or tipping of the snow vehicle.

36. A snow vehicle according to claim 32, wherein the elongated steering member is a steering fork.

* * * * *